United States Patent
Walker et al.

(10) Patent No.: US 9,661,043 B2
(45) Date of Patent: May 23, 2017

(54) PACKET RATE CONTROL AND RELATED SYSTEMS FOR INTERACTIVE MUSIC SYSTEMS

(71) Applicant: JamKazam, Inc., Austin, TX (US)

(72) Inventors: Peter A. Walker, Cedar Park, TX (US); David J. Wilson, Austin, TX (US); Robert Scott Comer, Austin, TX (US); Michael Seth Call, Austin, TX (US)

(73) Assignee: Jamkazam, Inc., Austin, TX (US)

( * ) Notice: Subject to any disclaimer, the term of this patent is extended or adjusted under 35 U.S.C. 154(b) by 92 days.

(21) Appl. No.: 14/641,549

(22) Filed: Mar. 9, 2015

(65) Prior Publication Data

US 2015/0256473 A1 Sep. 10, 2015

Related U.S. Application Data

(60) Provisional application No. 61/950,377, filed on Mar. 10, 2014.

(51) Int. Cl.
*H04L 29/06* (2006.01)
*H04L 29/08* (2006.01)
(Continued)

(52) U.S. Cl.
CPC .... *H04L 65/4076* (2013.01); *G06F 17/30772* (2013.01); *H04L 43/087* (2013.01);
(Continued)

(58) Field of Classification Search
None
See application file for complete search history.

(56) References Cited

U.S. PATENT DOCUMENTS 6,301,258 B1 * 10/2001 Katseff ................. H04J 3/0632
370/412
6,404,777 B1 * 6/2002 Hattori .................... H04L 43/00
370/231
(Continued)

OTHER PUBLICATIONS

Cristian, "Probabilistic Clock Synchronization", Distributed Computing, 13 pgs. (1989).
(Continued)

*Primary Examiner* — Tejis Daya
(74) *Attorney, Agent, or Firm* — Egan Peterman Enders Huston

(57) ABSTRACT

Packet rate control methods and related systems are disclosed for interactive music systems. In certain embodiments, an interactive music client system combines captured audio data from audio inputs with audio input data from one or more peer interactive music client systems within an interactive music session and outputs the combined audio data to an audio output subsystem. The interactive music client system further determines performance parameters associated with the interactive music sessions and adjusts audio input/output packets based upon the performance parameters. The performance parameters can include, for example, session packet rates or other parameters. Adjustments can include aggregating audio frames, reducing packet rates, and adjusting audio frames within a jitter queue receive buffer. The jitter queue receive buffer, for example, can be adjusted so that is contents are reduced towards zero and/or to zero within a predetermined time duration. Other variations can also be implemented.

28 Claims, 56 Drawing Sheets

(51) Int. Cl.
G06F 17/30 (2006.01)
H04L 12/26 (2006.01)
H04L 12/863 (2013.01)

(52) U.S. Cl.
CPC ............ *H04L 43/10* (2013.01); *H04L 47/621* (2013.01); *H04L 67/06* (2013.01); *H04L 67/104* (2013.01); *H04L 67/1074* (2013.01); *H04L 67/1097* (2013.01); *H04L 67/142* (2013.01); *H04L 67/32* (2013.01); *H04L 67/42* (2013.01); *H04L 65/60* (2013.01); *H04L 65/80* (2013.01); *H04L 67/16* (2013.01)

(56) References Cited

U.S. PATENT DOCUMENTS

| | | | | |
|---|---|---|---|---|
| 6,675,054 | B1* | 1/2004 | Ruberg | H04L 29/06 700/94 |
| 6,996,068 | B1* | 2/2006 | Sherlock | G01R 31/3167 370/248 |
| 7,313,593 | B1* | 12/2007 | Pulito | G06Q 10/10 370/260 |
| 7,349,330 | B1* | 3/2008 | Hayakawa | H04L 43/0829 370/229 |
| 7,477,601 | B1* | 1/2009 | Waclawsky | H04L 47/10 370/231 |
| 2003/0133440 | A1* | 7/2003 | Reynolds | H04L 29/06027 370/352 |
| 2003/0152093 | A1* | 8/2003 | Gupta | H04J 3/0632 370/412 |
| 2003/0202528 | A1* | 10/2003 | Eckberg | H04L 12/6418 370/412 |
| 2005/0207437 | A1* | 9/2005 | Spitzer | H04L 12/66 370/412 |
| 2006/0023706 | A1* | 2/2006 | Varma | G10L 19/167 370/389 |
| 2006/0149850 | A1* | 7/2006 | Bowman | G11B 27/10 709/231 |
| 2006/0199594 | A1* | 9/2006 | Gundu | G10L 19/167 455/452.2 |
| 2007/0110027 | A1* | 5/2007 | Yeh | H04L 12/6418 370/351 |
| 2008/0069127 | A1* | 3/2008 | Khalil | H04J 3/0632 370/412 |
| 2011/0038488 | A1* | 2/2011 | Humphreys | G10H 1/0083 381/80 |
| 2011/0191111 | A1* | 8/2011 | Chu | G10L 19/005 704/500 |
| 2011/0258322 | A1* | 10/2011 | Luzzatti | H04L 47/765 709/226 |
| 2011/0286468 | A1* | 11/2011 | Tomonaga | H04L 47/10 370/412 |
| 2012/0050456 | A1* | 3/2012 | Arnao | H04N 7/152 348/14.12 |
| 2013/0083203 | A1* | 4/2013 | Barrett | H04L 43/0829 348/180 |
| 2015/0089048 | A1* | 3/2015 | Jackson | H04L 47/25 709/224 |

OTHER PUBLICATIONS

Freescale Semiconductor, "Data Sheet: Technical Data", Document No. IMX6DQCEC, Rev. 2.3, 166 pgs. (2013).
Texas Instruments, "PCM3168A 24-Bit, 96-kHz/192-kHz, 6-In/8-Out Audio Codec With Differential Input/Output", 66 pgs. (Jan. 2016).
CIPIC International Laboratory, "Spatial Sound: An Introduction", College of Engineering, 2 pgs. (2014).
Carot and Werner, "Towards a Comprehensive Cognitive Analysis of Delay-Influenced Rhythmical Interaction," ICMC2009 (Aug. 2009).

* cited by examiner

PACKET RATE CONTROL AND RELATED SYSTEMS FOR INTERACTIVE MUSIC SYSTEMS

RELATED APPLICATIONS

This application claims priority to the following co-pending provisional application: U.S. Provisional Patent Application Ser. No. 61/950,377, filed Mar. 10, 2014, and entitled "SYSTEMS AND METHODS FOR INTERACTIVE MUSIC," which is hereby incorporated by reference in its entirety.

This application is also related in subject matter to the following concurrently filed applications: U.S. patent application Ser. No. 14/641,514, entitled "DISTRIBUTED RECORDING SERVER AND RELATED METHODS FOR INTERACTIVE MUSIC SYSTEMS;" U.S. patent application Ser. No. 14/641,521, entitled "DISTRIBUTED METRONOME FOR INTERACTIVE MUSIC SYSTEMS;" U.S. patent application Serial No. 14/641,532, entitled "CAPABILITY SCORING SERVER AND RELATED METHODS FOR INTERACTIVE MUSIC SYSTEMS;" U.S. patent application Serial No. 14/641,564, entitled "TRACK BASED MUSIC MANAGEMENT SERVER AND RELATED METHODS FOR INTERACTIVE MUSIC SYSTEMS;" and U.S. patent application Serial No. 14/641,585, entitled "NETWORK CONNECTION SERVERS AND RELATED METHODS FOR INTERACTIVE MUSIC SYSTEMS;" each of which is hereby incorporated by reference in its entirety.

TECHNICAL FIELD

The disclosed embodiments relate to network-based systems for music sessions and associated audio transmissions among network connected systems.

BACKGROUND

Musicians often collaborate in music sessions where each musician is present within a recording studio and a session recording is made. Musicians also collaborate to create session recordings where sub-groups of musicians separately record their portion or tracks of the music recording at the recording studio, and the studio then combines the recordings for form a master recording. Musicians also collaborate in music sessions in less formal environments, such as home studios and garages. With the growth of network connected systems, efforts have been made to provide collaborative music sessions through network connections and the internet. However, these efforts suffer from latency and other network connectivity issues that degrade the experience of the users to an extent that interactive collaboration or a group session cannot effectively be achieved.

SUMMARY

Packet rate control methods and related systems are disclosed for interactive music systems. In certain embodiments, an interactive music client system generates captured audio data, receives audio input packets one or more peer interactive music client systems within an interactive music session, processes the audio input packets to generate audio input data, combines the audio input data with the captured audio data, and outputs the combined audio data to an audio output subsystem. The interactive music client system further determines performance parameters associated with the interactive music sessions and adjusts audio output packets or the audio input packets based upon the performance parameters. The performance parameters can include, for example, session packet rates, and input/output packet rates can be adjusted based upon the session packet rates. Adjustments can include aggregating audio frames, reducing packet rates, and adjusting audio frames within a jitter queue receive buffer. The jitter queue receive buffer, for example, can be adjusted so that is contents are reduced towards zero and/or to zero within a predetermined time duration. Different features and variations can be implemented, as desired, and related systems and methods can be utilized, as well.

For one embodiment, an interactive music client system is disclosed that includes an audio capture subsystem coupled to one or more audio inputs and configured to generate captured audio data, an audio output subsystem, a network interface, and one or more processing devices configured to process the captured audio data to generate audio output packets, to send the audio output packets through the network interface to one or more peer interactive music client systems within an interactive music session, to receive audio input packets through the network interface from the one or more peer interactive music client systems, to process the audio input packets to generate audio input data, to combine the audio input data with the captured audio data, and to output the combined audio data to the audio output subsystem. The one or more processing devices are further configured to determine performance parameters associated with the interactive music sessions and to adjust one or more of the audio output packets or the audio input packets based upon the performance parameters.

In additional embodiments, the performance parameters include session packet rates for the interactive music session, and the one or more processing devices are further configured to make adjustments to at least one of the audio output packet rate or the audio input packet rate based upon the session packet rates. In further embodiments, the one or more processing devices are configured to aggregate audio frames to lower the audio output packet rate. In still further embodiments, the one or more processing devices are further configured to send one or more request to the one or more peer interactive music client systems to reduce packet rates to lower the audio input packet rate. In other embodiments, the one or more processing devices are further configured to remove the packet rate adjustments based upon subsequent changes in the session packet rates.

In further embodiments, the performance parameters include jitter associated with processing of the audio input packets; the interactive music client system further includes a jitter queue receive buffer configured to store the audio input packets; and the one or more processing devices are further configured to access audio input packets from the jitter queue receive buffer to process the audio input packets to generate audio input data. In additional embodiments, the one or more processing devices are further configured to adjust contents of the jitter queue receive buffer based upon input/output (IO) mismatch with one or more peer interactive music client systems.

In still further embodiments, the one or more processing devices are further configured to adjust contents of the jitter queue receive buffer such that the jitter queue receive buffer are reduced towards zero within a predetermined time duration. In additional embodiments, the one or more processing devices are further configured to adjust contents of the jitter queue receive buffer such that the jitter queue receive buffer becomes empty at least once within a predetermined time duration. In further embodiments, the one or more processing devices are further configured to discard one or more audio input packets from the jitter queue receive buffer if the jitter queue receive buffer does not become empty at least once within the predetermined time duration. Further, the one or more processing devices can be configured to use an audio volume associated with the audio input packets to select the one or more audio input packets to discard. Still further, the one or more processing devices can be configured to select the one or more audio input packets to discard using one or more of the following: randomly selected packets within the jitter queue receive buffer, proportionally spaced packets within the jitter queue receive buffer, or consecutive packets within the jitter queue receive buffer. In still further embodiments, the one or more processing devices are further configured to adjust the predetermined time duration if no audio input packets are available to be accessed from the jitter queue receive buffer at least once within the predetermined time duration.

For another embodiment, a method to adjust packet rates for an interactive music client system is disclosed that includes receiving one or more audio inputs, generating captured audio data for the one or more audio inputs, processing the captured audio data to generate audio output packets, sending the audio output packets to one or more peer interactive music client systems within an interactive music session, receiving audio input packets from the one or more peer interactive music client systems, processing the audio input packets to generate audio input data, combining the audio input data with the captured audio data, outputting the combined audio data to the audio output subsystem, determining performance parameters associated with the interactive music sessions, and adjusting one or more of the audio output packets or the audio input packets based upon the performance parameters.

In additional embodiments, the performance parameters include session packet rates for the interactive music session, and the method further comprises making adjustments to at least one of the audio output packet rate or the audio input packet rate based upon the session packet rates. In further embodiments, the method includes aggregating audio frames to lower the audio output packet rate. In still further embodiments, the method includes sending one or more request to the one or more peer interactive music client systems to reduce packet rates to lower the audio input packet rate. In other embodiments, the method includes removing the packet rate adjustments based upon subsequent changes in the session packet rates.

In further embodiments, the performance parameters comprise jitter associated with processing of the audio input packets; and the method further includes storing the audio input packets in a jitter queue receive buffer, accessing audio input packets from the jitter queue receive buffer, and processing the audio input packets to generate audio input data. In additional embodiments, the method also includes adjusting contents of the jitter queue receive buffer based upon input/output (IO) mismatch with one or more peer interactive music client systems.

In still further embodiments, the method includes adjusting contents of the jitter queue receive buffer such that the jitter queue receive buffer are reduced towards zero within a predetermined time duration. In additional embodiments, the method includes adjusting contents of the jitter queue receive buffer such that the jitter queue receive buffer becomes empty at least once within a predetermined time duration. In further embodiments, the method includes discarding one or more audio input packets from the jitter queue receive buffer if the jitter queue receive buffer does not becomes empty at least once within the predetermined time duration. Further, the method can include using an audio volume associated with the audio input packets to select the one or more audio input packets to discard. Still further, the method can include selecting the one or more audio input packets to discard using one or more of the following: randomly selected packets within the jitter queue receive buffer, proportionally spaced packets within the jitter queue receive buffer, or consecutive packets within the jitter queue receive buffer. In still further embodiments, the method includes adjusting the predetermined time duration if no audio input packets are available to be accessed from the jitter queue receive buffer at least once within the predetermined time duration.

Network-based distributed interactive music systems and related methods are also disclosed. The disclosed embodiments achieve reduced network latency and other advantageous features that provide a positive user experience for music sessions using a network-based distributed interactive music system. In part, the disclosed embodiments provide real-time platforms and related methods for interactive and collaborative music performance and production. The interactive music systems allow individuals at different physical locations that are as simple as different rooms in one location to locations potentially hundreds miles apart, in real-time to play, produce and share music by doing so across the internet, local area network, and/or other network connections. The disclosed systems and methods further provide a number of different components that can be used individually or in combination to provide the disclosed aspects and features for the interactive music systems and methods described herein. Different features and variations can be implemented, as desired, and related systems and methods can be utilized, as well.

For one additional embodiment, an interactive music client system is disclosed that includes an audio capture subsystem coupled to one or more audio inputs and to output captured audio data, one or more processing devices coupled to receive the captured audio data and to process the captured audio data to generate audio output packets including audio output data associated with one or more interactive music sessions, and a network interface coupled to receive the audio output packets and to send the audio output packets to one or more peer interactive music client systems through a network.

In further embodiments, the interactive music client system further includes one or more storage systems coupled to the one or more processing devices to store data associated with one or more interactive music sessions. In additional embodiments, the network interface is further coupled to receive audio input packets containing audio input data from one or more peer interactive music client systems through a network, and the one or more processing devices are further coupled to receive the audio input packets and to process the audio input packets to generate audio input data. In other embodiments, the interactive music client system further includes an audio output subsystem to output audio output signals associated with the audio input data. In still further embodiments, the one or more processing devices are further configured to perform at least one of following: to communicate with one or more server systems and one or more peer interactive music client systems to determine a session link score for the interactive music client system, to register with one or more server systems for a music session, to record one or more tracks associated with a music session, to adjust an input packet rate or an output packet rate for audio packets, to store input audio frames in a jitter buffer and discard one or more frames based upon periodic time windows, to send one or more music cues to one or more other interactive music client systems within a music session, to adjust audio processing based upon virtual location placement within a music session, to communicate with one or more other interactive music client systems within a music session to provide a distributed metronome, or to provide an output queue for one or more other interactive music client systems within a music session and adjust a rate for the audio output data for each output queue.

For one further embodiment, an interactive music server system is disclosed that includes a network interface coupled to receive network packets through a network from one or more interactive music client systems associated with one or more interactive music sessions and one or more processing devices coupled to receive the network packets, to process the network packets, and to output network packets to the interactive music client systems through the network using the network interface.

In additional embodiments, the interactive music server system includes one or more storage systems coupled to the one or more processing devices to store data associated with one or more interactive music sessions. In still further embodiments, the one or more processing devices are further configured to perform at least one of the following: to communicate with interactive music client systems to determine session link scores for the interactive music client systems, to register interactive music client systems for music sessions, to provide a registry for music sessions or interactive music client systems or both, to receive and store recorded tracks associated with a music session and allow these recorded tracks to be downloaded to interactive music client systems participating in the music session, to stream live broadcasts for music sessions, or to provide access to and download of previously recorded music sessions including different recorded tracks within the recorded music sessions.

Different or additional features, variations, and embodiments can be implemented, if desired, and related systems and methods can be utilized, as well.

DESCRIPTION OF THE DRAWINGS

It is noted that the appended drawings illustrate only example embodiments and are, therefore, not to be considered as limiting of the scope of the inventions, for the inventions may admit to other equally effective embodiments.

DETAILED DESCRIPTION

Network-based interactive music systems and related methods are disclosed. The disclosed embodiments achieve reduced network latency and other advantageous features that provide a positive user experience for music sessions using a network-based interactive music system. In part, the disclosed embodiments provide real-time platforms and related methods for interactive and collaborative music performance and production. The interactive music systems allow individuals at different physical locations that are as simple as different rooms in one location to locations potentially hundreds miles apart, in real-time to play, produce and share music by doing so across the internet, local area network, and/or other network connections. The disclosed systems and methods further provide a number of different components that can be used individually or in combination to provide disclosed aspects and features for the interactive music systems and methods described herein. Different features and variations can be implemented, as desired, and related systems and methods can be utilized, as well.

Figure 1:
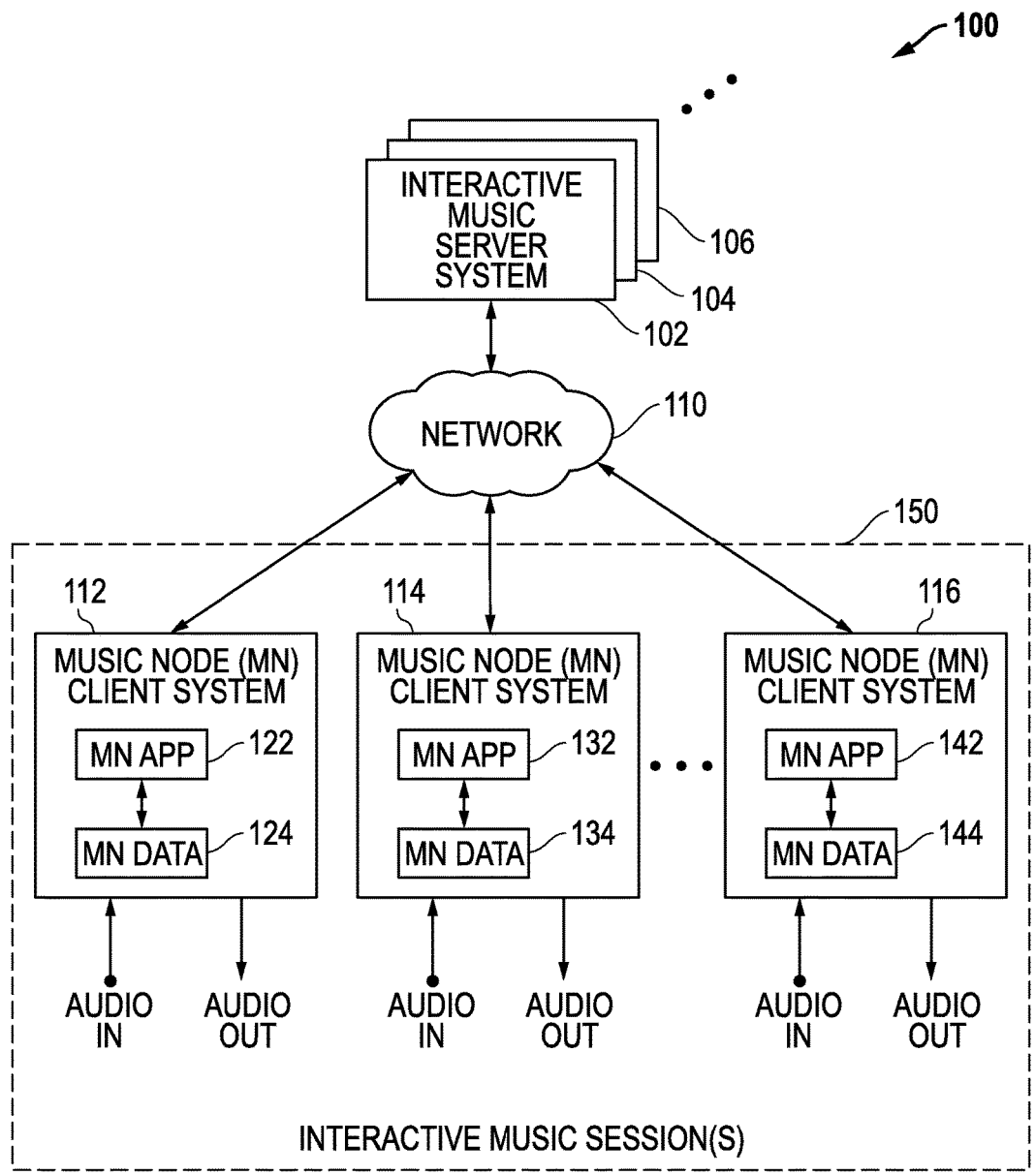
FIG. 1 is a block diagram of an example embodiment for a network-based distributed interactive music system.

FIG. 1 is a block diagram of an example embodiment for a network-based interactive music system 100. Music nodes (MN) 112, 114 . . . 116 are client systems for the interactive music system 100 that have one or more network connections to a network 110. These music nodes (MN) 112, 114 . . . 116 are part of one or more interactive music session(s) 150. The music nodes (MN) 112, 114 . . . 116 in part run music node applications (MN APP) 122, 132 . . . 142, respectively, that implement the various functional features described herein. The music nodes (MN) 112, 114 ... 116 also in part use storage systems 124, 134 ... 144 to store MN related data, such as audio recordings and other data as described below. The music nodes (MN) 112, 114 ... 116 also receive one or more audio inputs (AUDIO IN) and produce one or more audio outputs (AUDIO OUT), as described in more detail herein. The interactive music server system(s) 102, 104, 106 ... provide server-based services and management for the interactive music system 100 and/or the interactive music session(s) 150, as described herein. In part, for example, the interactive music server system(s) 102, 104, 106 ... manage session setup and tear down for music sessions for the music nodes (MN) 112, 114 ... 116 participating in interactive music sessions. The server system(s) 102, 104, 106 ... also in part use storage systems to store MN, session, and service related data such as audio recordings and other data as described below.

It is noted that the music node applications 122, 132 ... 142 can be downloaded from the interactive music server system(s) 102, 104, 106 ... through network 110 and installed on the music nodes (MN) 112, 114 ... 116. The music node applications 112, 132 ... 142 can also be loaded onto the music nodes (MN) 112, 114 ... 116 separate from the network 110, if desired. Further, The music nodes (MN) 112, 114 ... 116 can be any of a wide variety of information handling systems including one or more electronic devices or systems that participate in the interactive music system 100 and/or the interactive music session(s) 150. Each server system 102, 104, 106 ... can also be any of a wide variety of information handling systems including one or more electronic devices or systems that provide the server-based services for the interactive music system 100 and/or interactive music session(s) 150. The data storage systems can also be a wide variety of devices or components that are configured to store data within a non-transitory data storage medium.

It is also noted that the network 110 can be any variety of wired or wireless network connections and devices through which network communications occur among the music nodes (MN) 112, 114 ... 116; the server system(s) 102, 104, 106 ... ; and/or other network connected systems, devices, or components. The network 110 can include the internet, internal intranets, local area networks (LANs), wide area network (WANs), personal area networks (PANs), wireless networks, wired networks, home networks, routers, switches, firewalls, network interface cards, network interface controllers, and/or any other network communication system, device, or component that provides wired and/or wireless communication connections between electronic systems. Further, these network communication elements can be internal to and/or external from the music nodes (MN) 112, 114 ... 116; the server system(s) 102, 104, 106 ... ; and/or other network connected systems, as desired.

Example embodiments for music nodes (MNs) and the server system(s) are further described with respect to FIGS. 2A-2D, FIGS. 3A-D, FIGS. 4A-D and FIGS. 5A-B. Operational features and embodiments are further described below with respect to FIGS. 6A-E, 7A-C, 8A-C, 9A-B, 10A-D, 11A-B, 12A-B, 13A-B, and 14. Further, APPENDIX A below and FIGS. 15A-B, 16, 17, 18A-B, 19, 20A-B, 21A-C, and 22A-C describe additional embodiments and example details including MN registration, network communications, control messages, and other aspects for the interactive music system and for the NAAS (Network as a Service) server systems that provide lower latency network communications for music sessions. APPENDIX B below and FIGS. 23A-B, 24, 25, 26, 27A-C, 28A-B, 29, and 30A-B provide further example embodiments for the interactive music system including further example embodiments related to music nodes (MNs) and the server system(s). APPENDIX C below provides example APIs (application program interfaces) that can be utilized.

It is noted that the networks described herein can be wired and/or wireless networks that include one or more devices (e.g., routers, switches, firewalls, gateways, interface devices, network servers, etc.) that provide for network communications between network-connected computing devices, including internet communications. As such, it is understood that the network data transfer of frames and packets as described can be implemented using any of a wide variety of techniques, including wired and/or wireless communications between one or more computing systems or devices. It is further noted that the data or file storage systems described herein can be any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums.

It is also noted that the functional blocks, modules, operations, features, and processes described herein for the disclosed embodiments can be implemented using hardware, software, or a combination of hardware and software, as desired. In addition, one or more processing devices running software and/or firmware can also be used to implement the disclosed embodiments. It is further understood that one or more of the operations, tasks, functions, features, or methodologies described herein (e.g., including those performed by the MNs 112, 114 ... 116; the server system(s) 102, 104, 106 ... ; and the NAAS server systems 1602) may be implemented, for example, as hardware, software, or a combination of hardware and software, including program instructions that are embodied in one or more non-transitory tangible computer readable mediums (e.g., memory) and that are executed by one or more processors, controllers, microcontrollers, microprocessors, hardware accelerators, and/or other processing devices to perform the operations and functions described herein.

It is also noted that the processing devices described herein can include hardware, software, firmware, or a combination thereof. In one embodiment, the components of the processing devices may form in part a program product with instructions that are accessible to and executable by processing circuitry to perform the functions of the processing devices described herein. The instructions for the program product may be stored in any suitable storage media that is readable by the processing devices, and the storage media may be internal and/or external to the processing devices.

In addition, integrated circuits, discrete circuits, or a combination of discrete and integrated circuits can be used, as desired, to perform the functionality described herein. Further, programmable integrated circuits can also be used, such as FPGAs (field programmable gate arrays), ASICs (application specific integrated circuits), and/or other programmable integrated circuits. In addition, one or more processing devices running software or firmware can also be used, as desired. For example, computer readable instructions embodied in a tangible medium (e.g., data storage devices, FLASH memory, random access memory, read only memory, programmable memory devices, reprogrammable storage devices, hard drives, floppy disks, DVDs, CD-ROMs, and/or any other tangible storage medium) could be utilized to store instructions that cause computer systems, programmable circuitry (e.g., FPGAs), processors, and/or other processing devices to perform the processes, functions, and capabilities described herein.

It is further noted that the MNs 112, 114 . . . 116; the server system(s) 102, 104, 106 . . . ; NAAS server systems 1602 described below; and/or other electronic computing devices described herein can be implemented using one or more information handling systems that include one or more processing devices (e.g., processor, controller, microcontroller, microprocessor, digital signal processor, and/or other processing device) for executing and otherwise processing instructions, and for performing additional operations (e.g., communicating information) in response thereto. Each such electronic computing device is formed in part by various electronic circuitry components that are configured to perform the device operations. Further, an information handling system may include any instrumentality or aggregate of instrumentalities operable to decode, encode, compute, determine, process, transmit, receive, store, display, communicate, detect, record, reproduce, or utilize any form of information or data for business, scientific, control, or other purposes. For example, an information handling system may be a personal computer (e.g., desktop or laptop), tablet computer, mobile device (e.g., personal digital assistant (PDA) or smart phone), server computer (e.g., blade server or rack server), a network storage device, or any other suitable electronic device and may vary in size, shape, performance, and functionality. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (10) devices, such as a keyboard, a mouse, a touch screen video display, a non-touch screen video display, and/or other devices or components. The information handling system may also include one or more buses operable to transmit communications between the various hardware components and/or to external devices or systems.

Music Node (MN)—Client System

A music node (MN) is one or more electronic devices or systems that in part provide audio input/output and related processing for one or more users of the interactive music system. The music node (MN) operates in part as a client system with respect to the server system described below. For one embodiment, the music node includes one or more of the following components: audio capture input subsystem, audio play output subsystem, audio encoder, audio decoder, video input system, user interface and control subsystem, file storage system, and a network interface. Different and/or additional components could also be included, if desired, and variations could be implemented while still providing a music node for the interactive music system embodiments described herein. It is also noted that operation at low latency is desired for the overall user experience, and low latency is preferably less than 15 milliseconds delay between audio packets captured and sent from on MN and received and processed by another MN.

Figure 2A:
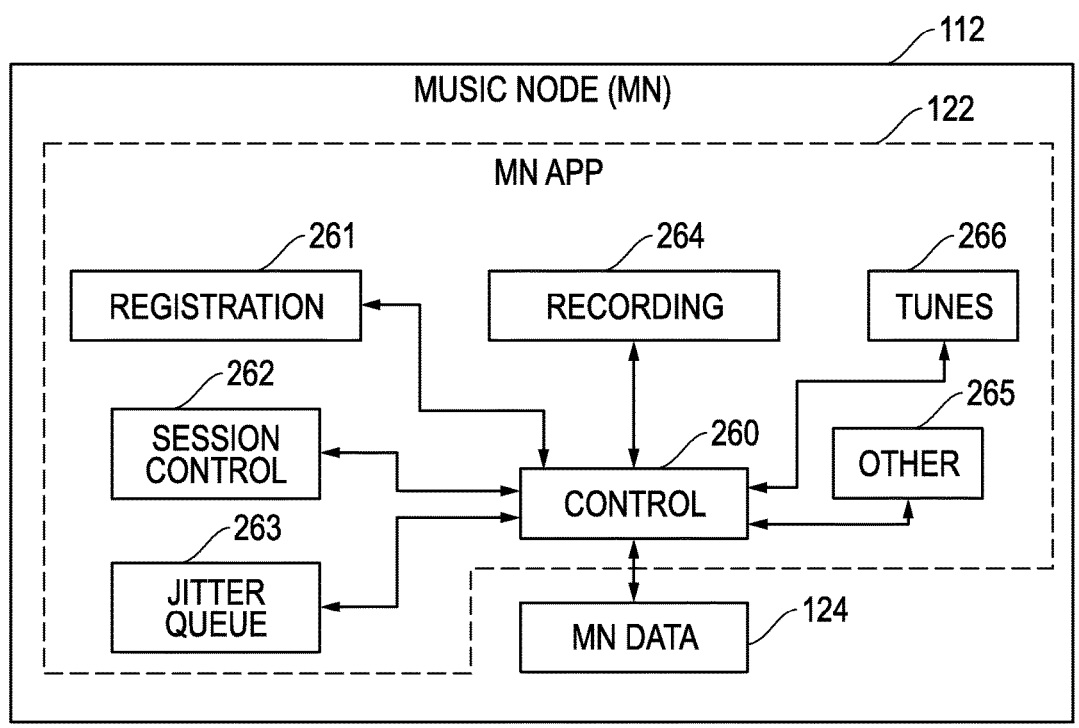
FIG. 2A is a block diagram of an example embodiment for a music node (MN).

FIG. 2A is a block diagram of an example embodiment for music node (MN) 112. The music node (MN) application 122 includes one or more different functional modules 260, 261, 262, 263, 264, 265, and/or 266 to provide the features of the music nodes as described in more detail below. For example, a registration module 261 is configured to communicate with the server system(s) to provide registration features for the MN 112. A session control module 262 is configured to provide session control options to allow users to control their session experience. A jitter queue module 263 is configured to provide control of the audio frame queue used to communicate with other MNs within a created session through the network 110. A recording module 264 is configured to store recordings of audio inputs received by the MN 112 both locally and through the network 110. A tunes module 266 is configured to provide features associated with the packaged tunes service described below. Other modules 265 can also be provided, as desired. The control module 270 provides overall control for the MN 112 and coordinates the operations of the other functional blocks. As also described herein, the MN application 122 also uses and stores MN data 124, as needed, for its operations. It is further noted that the other music nodes (MN) 114 . . . 116 can be configured similarly to music node (MN) 112 or could be implemented differently, as desired. As such, a wide variety of music node (MN) implementations could be used together within the interactive music systems 100 and as part of one or more music sessions 150.

Figure 2B:
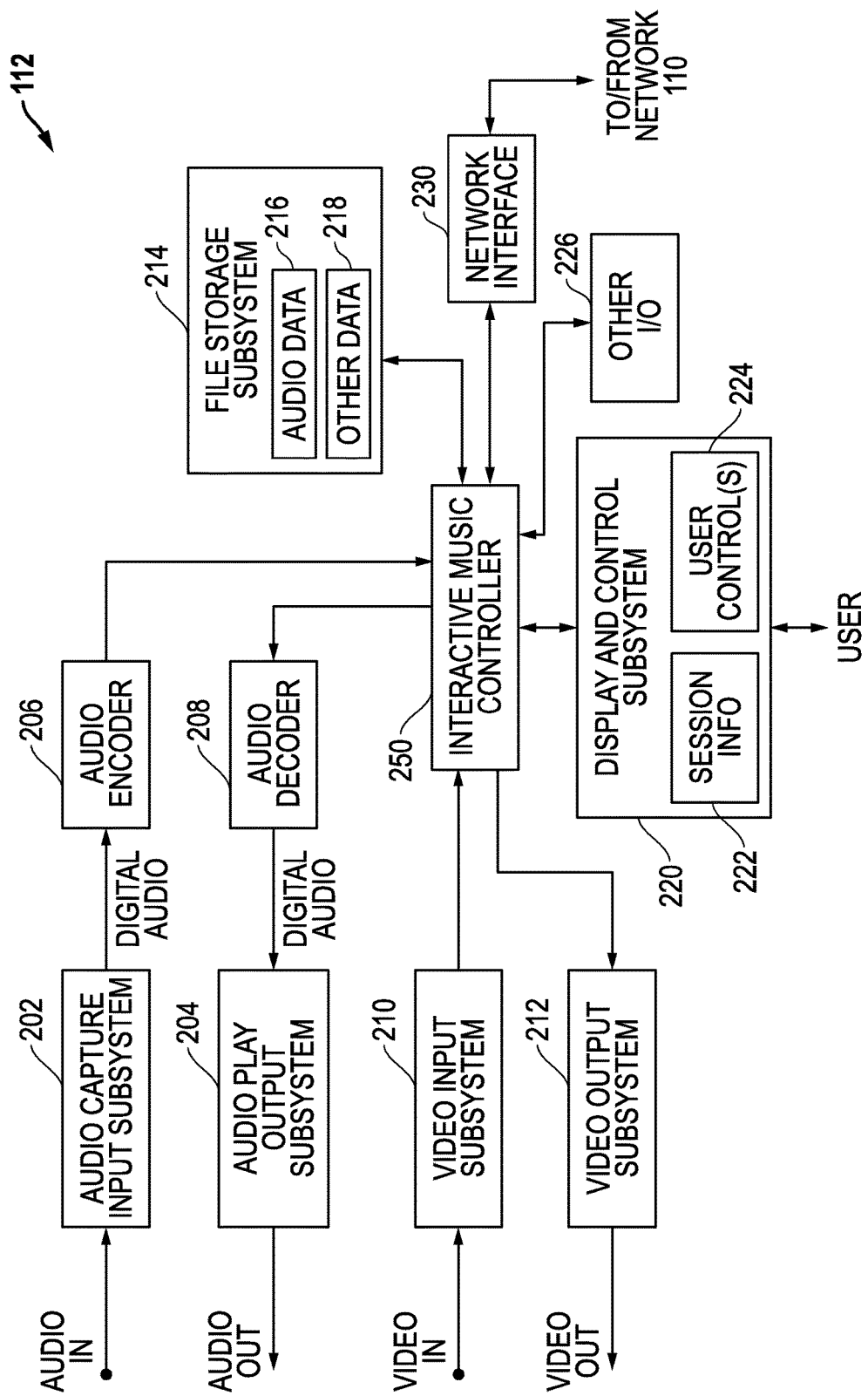
FIG. 2B is a block diagram of an example embodiment for audio/video/network/data subsystems within a music node.

FIG. 2B is a block diagram of an example embodiment for audio/video/network/data subsystems within a music node 112. One or more audio inputs (AUDIO IN) are received by an audio capture input subsystem 202, and digital audio is provided to an audio encoder 206. It is noted that the audio inputs can be analog signals or digital signals. If analog signals are input, then the audio capture input subsystem 202 samples these analog input signals to produce the digital audio. If digital signals, then the audio capture input subsystem 202 can send this digital audio to the audio encoder 206 or resample the digital audio inputs and then provide the digital audio to the audio encoder 206. The audio encoder 206 provides encoded audio data to the interactive music controller 250. This encoded audio data can then be stored as audio data 216 within the file storage subsystem 214, which can also store other data 218 associated with the operations of the music node 112. The encoded audio data can also be output through the network interface 230 to the network 110. The encoded audio and/or audio data received from the network 110 through the network interface 230 can be provided by the interactive music controller 250 to an audio decoder 208. The audio decoder 208 decodes the encoded audio data and outputs digital audio to the audio play output subsystem 204. The audio play output subsystem 204 then outputs audio output signals (AUDIO OUT) from the music node 112. The audio play output subsystem 204 can include one or more digital-to-analog converters to convert the digital audio from the audio decoder 208 to analog output signals, or the audio play output subsystem 204 can output the digital audio itself or re-sampled versions of the digital audio as the audio output signals (AUDIO OUT). The music node 112 can also include a display and control subsystem 220 that displays session information 222 and/or one or more graphical user controls 224. A user is thereby allowed to interact with and control the operations of the music node 112 through the display and control subsystem 220. Other input/output (IO) interfaces 226 can also be provided to allow other user IO interfaces or IO interfaces to other electronic systems. It is understood that that the interactive music controller 250 communicates with the different blocks within FIG. 2B using one or more control signals or commands to those blocks. Other variations could also be implemented.

Figure 2C:
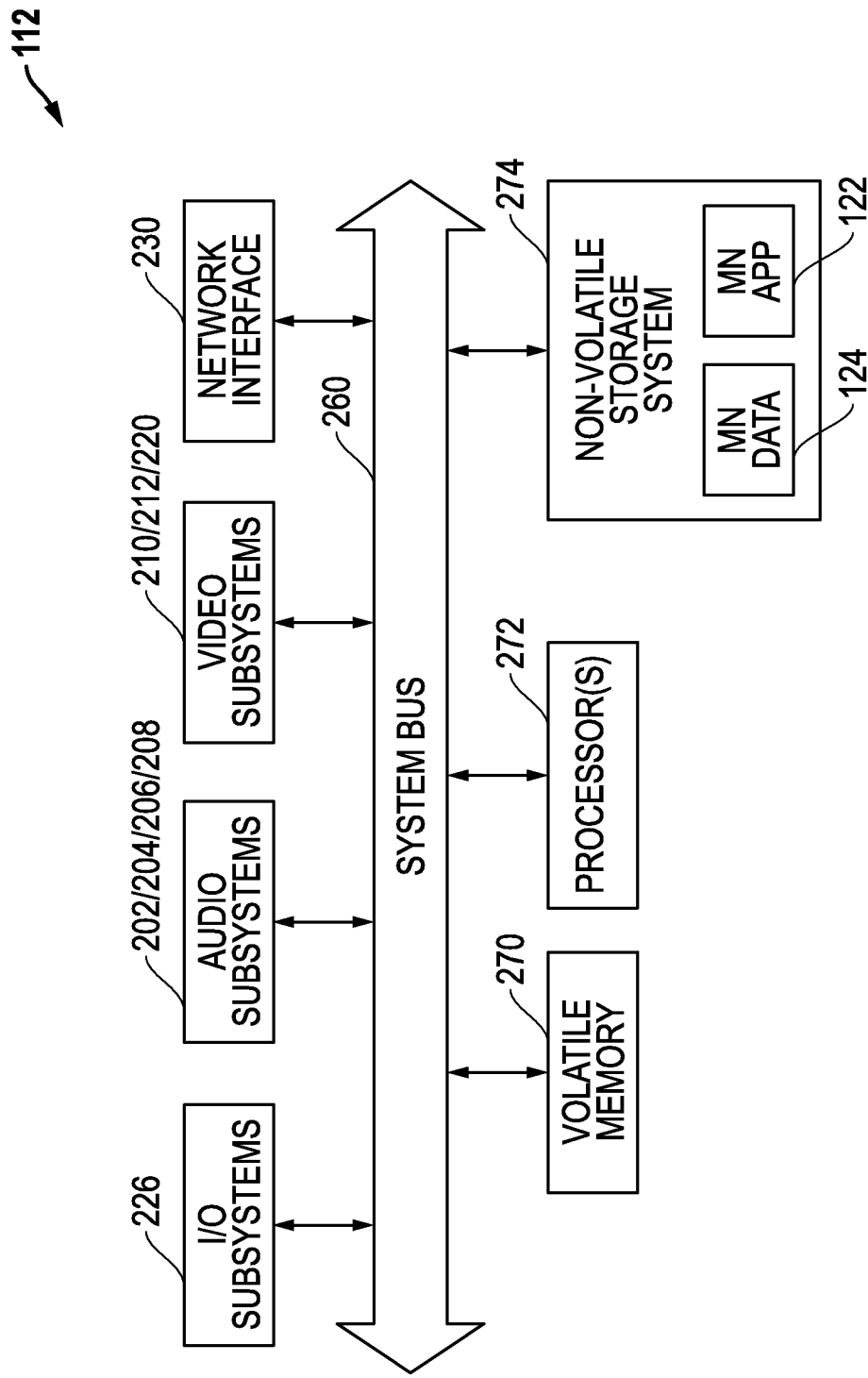
FIG. 2C is a block diagram of an example hardware embodiment for a music node.

FIG. 2C is a block diagram of an example hardware embodiment for music node 112. A system bus 260 provides communications between the different subsystems and components of the music node 112. One or more processor(s) 272 communicate with the audio subsystems 202/204/206/208 using one or more communication paths, with video subsystems 210/212/220 using one or more communication paths, network interface 230 using one or more communication paths, and IO subsystems 226 using one or more communication paths. The processor(s) 272 also communicate with non-volatile storage system 274 that stores music node (MN) data 124, such as the audio data 216 and/or other data 218 indicated above. The non-volatile storage system 274 also stores the music node application (MN APP) 122, which can include program instructions that are executed by one or more processor(s) 272 to implement the functions described herein for the music node 112. The non-volatile storage system 274 can be, for example, hard drives, optical discs, FLASH drives, and/or any other desired non-transitory storage medium that is configured to store information. Further, the one or more processor(s) 272 communicates with volatile memory 270 during operations to facilitate their operations. The volatile memory 270 can be, for example, DRAM (dynamic random access memory), SDRAM (synchronous random access memory), and/or any other desired volatile memory that is configured to store information while powered.

Figure 2D:
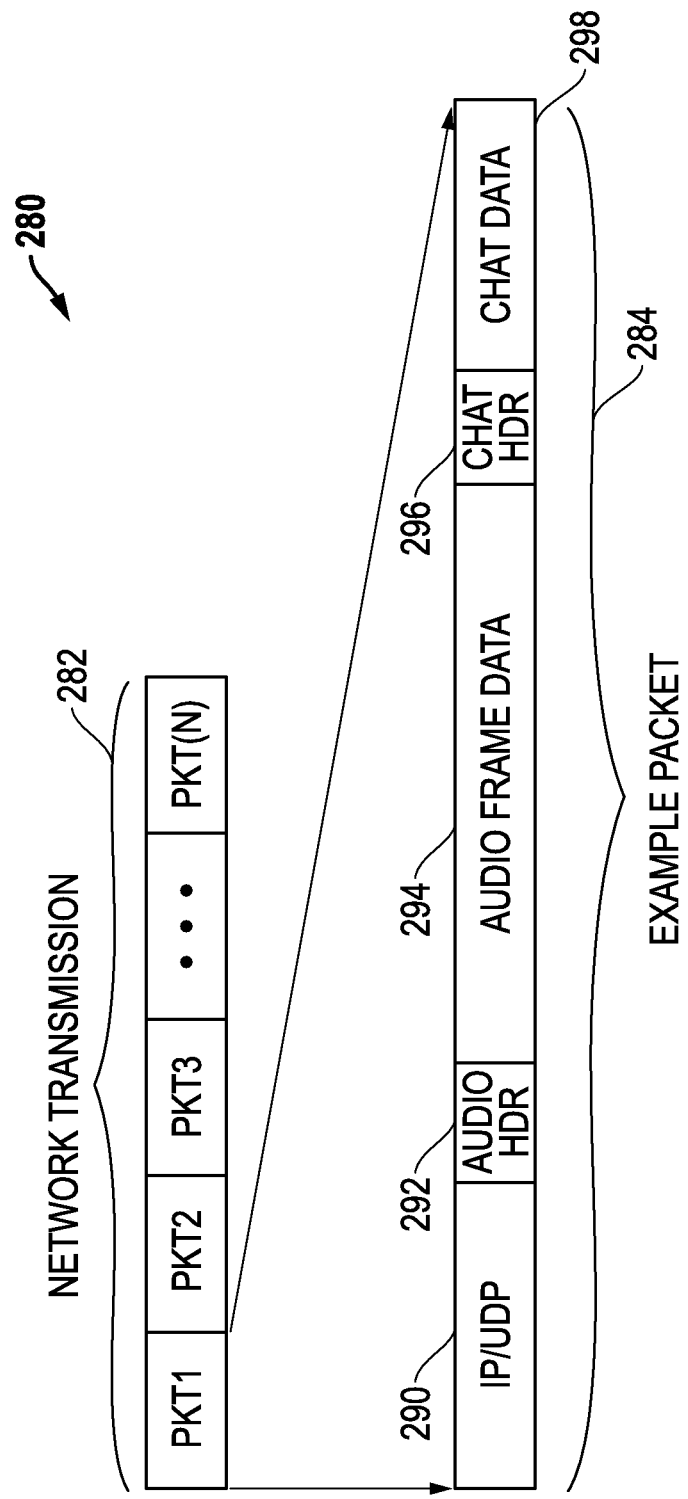
FIG. 2D is a block diagram of an example embodiment for network packets that can be transmitted within the interactive music system.

FIG. 2D is a block diagram of an example embodiment 280 for network packets that can be transmitted within the interactive music system 100. A network transmission 282 of network packets is shown for N packets (PKT1, PKT2, PKT3 . . . PKT(N)). As shown with respect to the example packet 284, each of the transmitted packets can be configured to include audio frame data 294, and audio header (HDR) 292, and a protocol header such as IP/UDP (internet protocol/user datagram protocol) header 290. Each packet can also include optional chat data 298 and a chat header (HDR) 296. It is also noted that the audio header 292 can include session control information, such as for example, track volume levels, master volume levels, recording start commands, recording stop commands, hinting selections, and/or other session related information. It is also noted that control packets can also be communicated separately from audio related packets among the MNs and between server system(s) and the MNs. Example values for byte sizes and data rates are described with respect to example embodiments below in APPENDIX A. For example, as one embodiment, the audio can be captured and encoded at 256 kilobits per second, and 2.5 millisecond data frames can be used to generate 400 packets-per-second that are the wrapped with header information and transmitted through the network 110. It is further noted that embodiment 280 provides one example packet structure that can be used for network communications for the interactive music system embodiments described herein, and other packet structures could also be utilized. For example, for communications where audio data is not communicated, a network packet can be used that includes header information and a payload having control information, MN related information, and/or other music session information communicated among the music nodes and server system(s). Other packet structures could also be used.

Functional blocks within FIG. 2B are now further described, although it is again noted that variations could be implemented for these functional blocks.

Audio Capture Input Subsystem (202). The audio capture input subsystem converts audio inputs to digital frames of audio information, preferably with low latency. For example, the audio input subsystem can sample analog audio inputs at a selected and/or fixed sampling rate, preferably of at least 44.1 KHz, and can output digital audio frames containing digital audio information, preferably 10 milliseconds (ms) or less of audio information. If the audio input from the audio source is already digital, a digital transfer from the audio source to the audio input subsystem can be utilized, preferably again having low latency. Digital audio frames containing digital information can again be output by thee audio input subsystem. Resampling can also be used, as needed, by the audio input subsystem to match digital sample rates between a digital audio source and the audio output frames for the audio input subsystem.

Audio Play Output Subsystem (204).The audio play output subsystem produces analog output signals and/or by converting digital audio information to analog output signals. For example, digital audio frames from other MNs can be received and converted to analog output signals. As indicated above, these digital audio frames can include a selected amount of audio information, such as about 10 ms or less of audio information. Resampling can also be used, as needed, to match the digital sample rates between the audio play output subsystem and the audio output destination, such as an external receiver or sound system.

Audio Encoder (206). The audio encoder encodes or compresses digital audio information to provide compressed audio information. The audio encoder is also preferably low latency. The audio encoder operates to process the digital audio frames of digital audio information captured at the audio input subsystem and produces a compressed audio stream. The audio encoder can also use error correction to embed error correction information that can be used by a decoder to detect and where possible correct and recover from errors induced on the audio stream during transmission or storage. The output encoded audio data from the encoder can also be packetized within network packets for transmission over a network.

Audio Decoder (208). The audio decoder decodes or decompresses incoming audio packets from other MNs or sources to provide uncompressed digital audio outputs. The audio decoder also uses error correction information with the packets to detect errors and apply error recovery to improve the quality of the decoded audio. As such, high quality audio with low SNR (signal-to-noise ratio) is achieved. Preferably, the audio decoder operates with low latency, and the audio decoder is configured to output audio frames containing 10 ms or less worth of digital audio.

Display and Control Subsystem (220). The input and a display subsystem allows a user to interact with the MN for management, configuration, diagnostics and general use and/or control. Video of other users in the music session may also be shown on this display.

Video Input Subsystem (210). If video input is desired, a video input subsystem is used to capture video and preferably operates with low latency. The video input subsystem can be used to allow live video of users playing in a music session to be shared. It is noted that the latency of the video capture subsystem can be allowed to be higher than the latency of the audio input subsystem while not significantly degrading the user's session experience. However, it is still preferable that MN provide at least 30 frames-per-second of video to ensure a real-time user experience.

File Storage System (214). A file storage system can also be included to store digital audio information. The MN uses a recording process, which is described further below, to store multiple audio streams concurrently.

Network Interface (230). An input/output network interface is provided that preferably operates with low latency. The audio processing application input network path of the MN includes a jitter queue buffer management system, which is described in more detail below. The MN also uses the network for interaction with a server that manages the music session, as also described in more detail below. The MN also uses the network for communication with peers in the music session. In general, the following classes of data flows occur in the MN: (1) peer-to-peer music data, (2) peer-to-peer state and session control data, (3) peer-to-peer video data, and (4) server session management and control data. It is also noted that peer-to-peer data may also be sent via a proxy server that may process the data before relaying it to another MN (e.g., aggregate packets, process and mix audio into a single audio stream, and/or perform other desired data processing).

It is also noted that although the components in FIG. 2B above are described with respect to an embodiment for a music node (MN) 112, different and/or additional components could be utilized in other embodiments. As such, the components can be varied, as desired. Further, the operation of each component could also be varied, if desired.

Figure 3A:
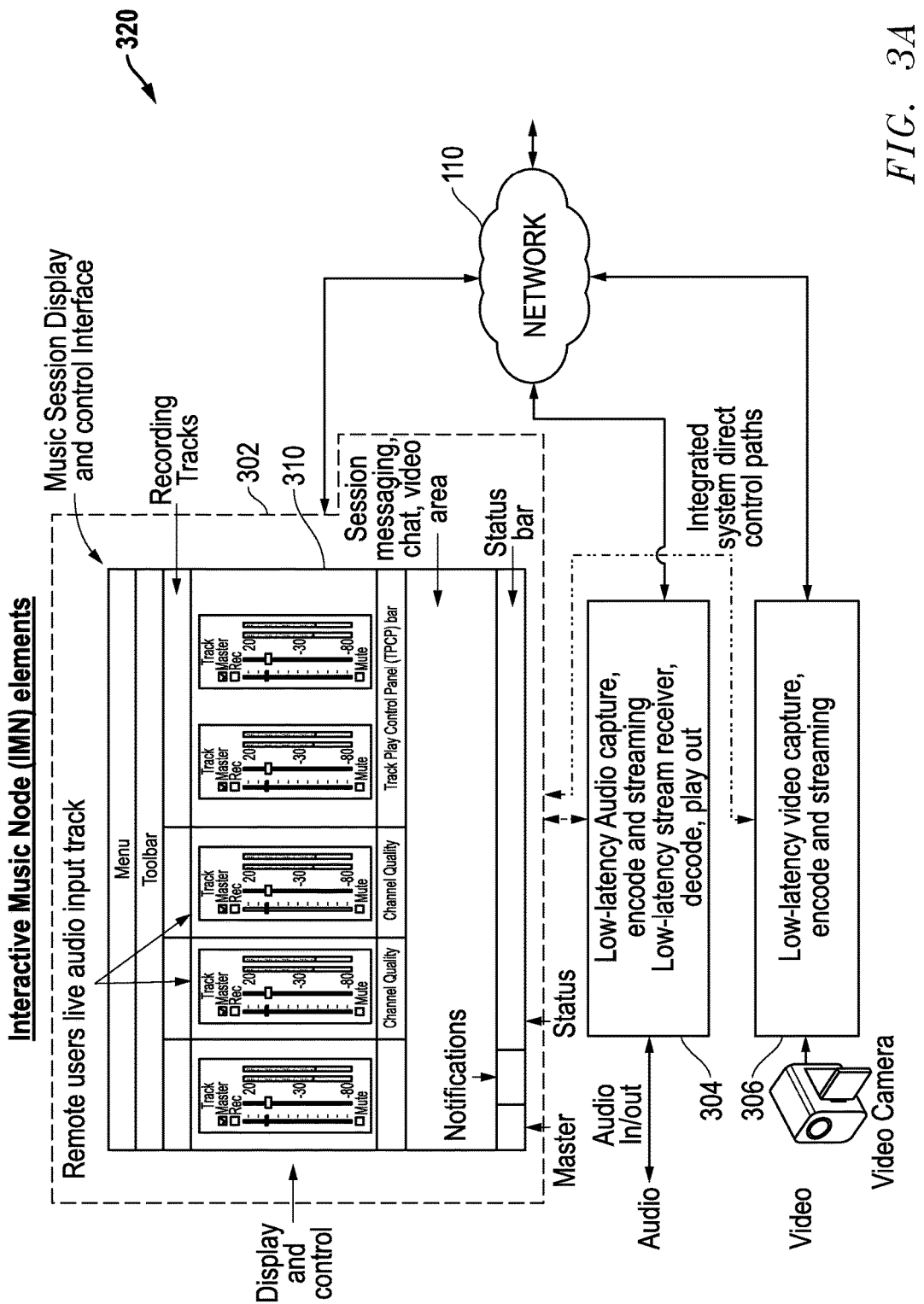
FIG. 3A is a block diagram of an integrated music node embodiment that includes components within one or more electronic devices with one or more connections to the network.
Figure 3B:
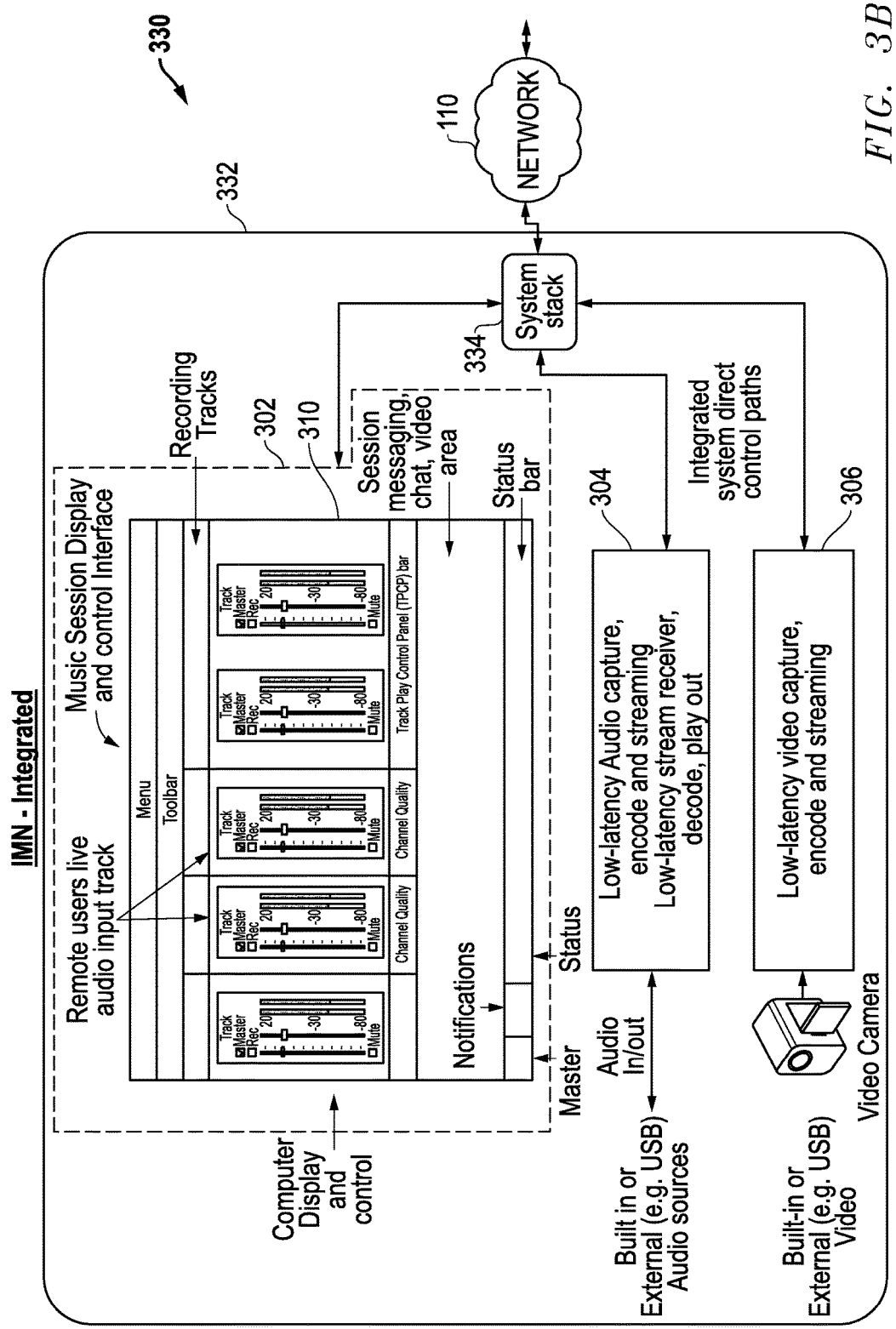
FIG. 3B is a block diagram of an integrated music node embodiment that includes components within one physical electronic device connected to the network.
Figure 3C:
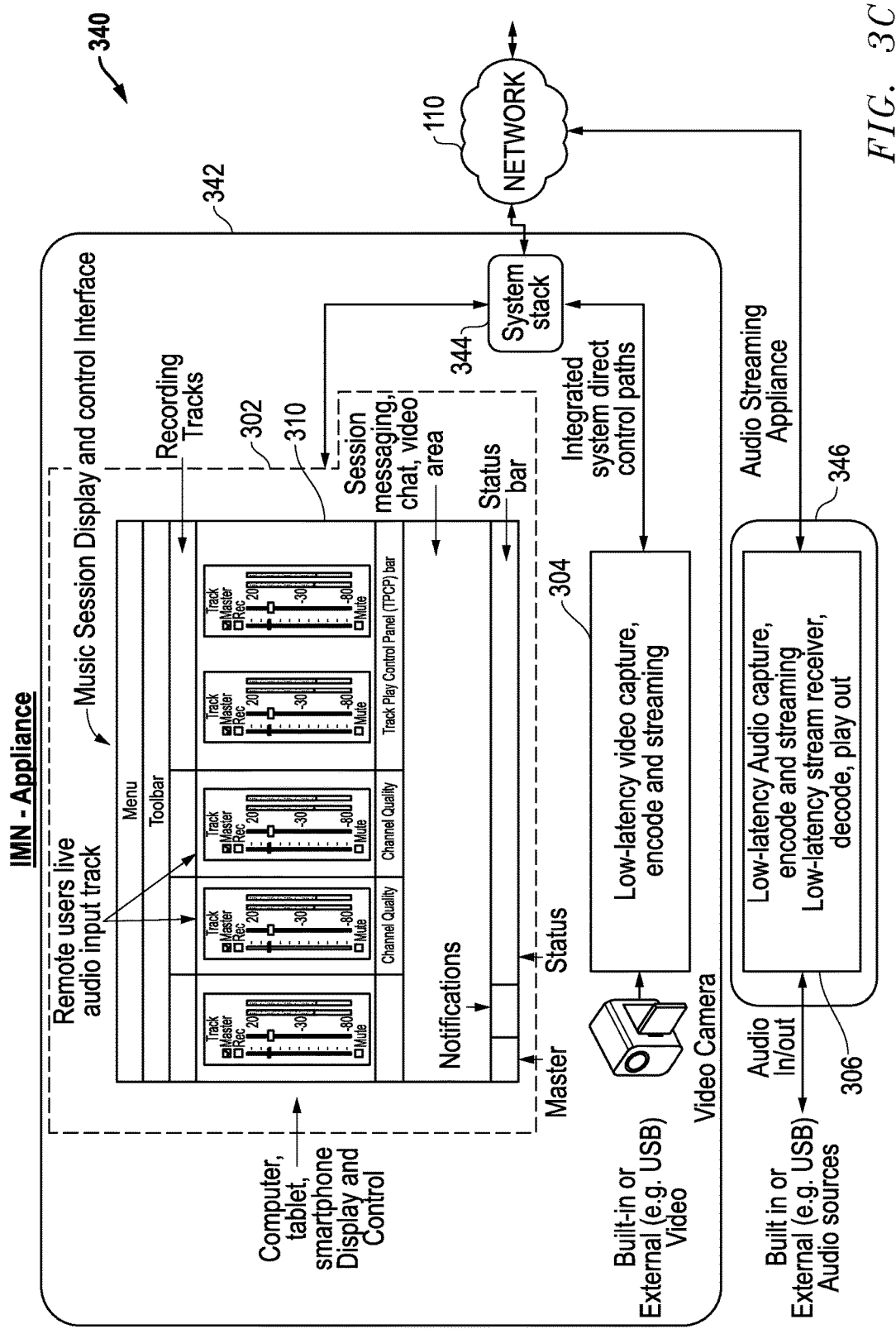
FIG. 3C is a block diagram of an example embodiment of a music node embodiment where audio components are separated into a dedicated audio processing appliance device.
Figure 3D:
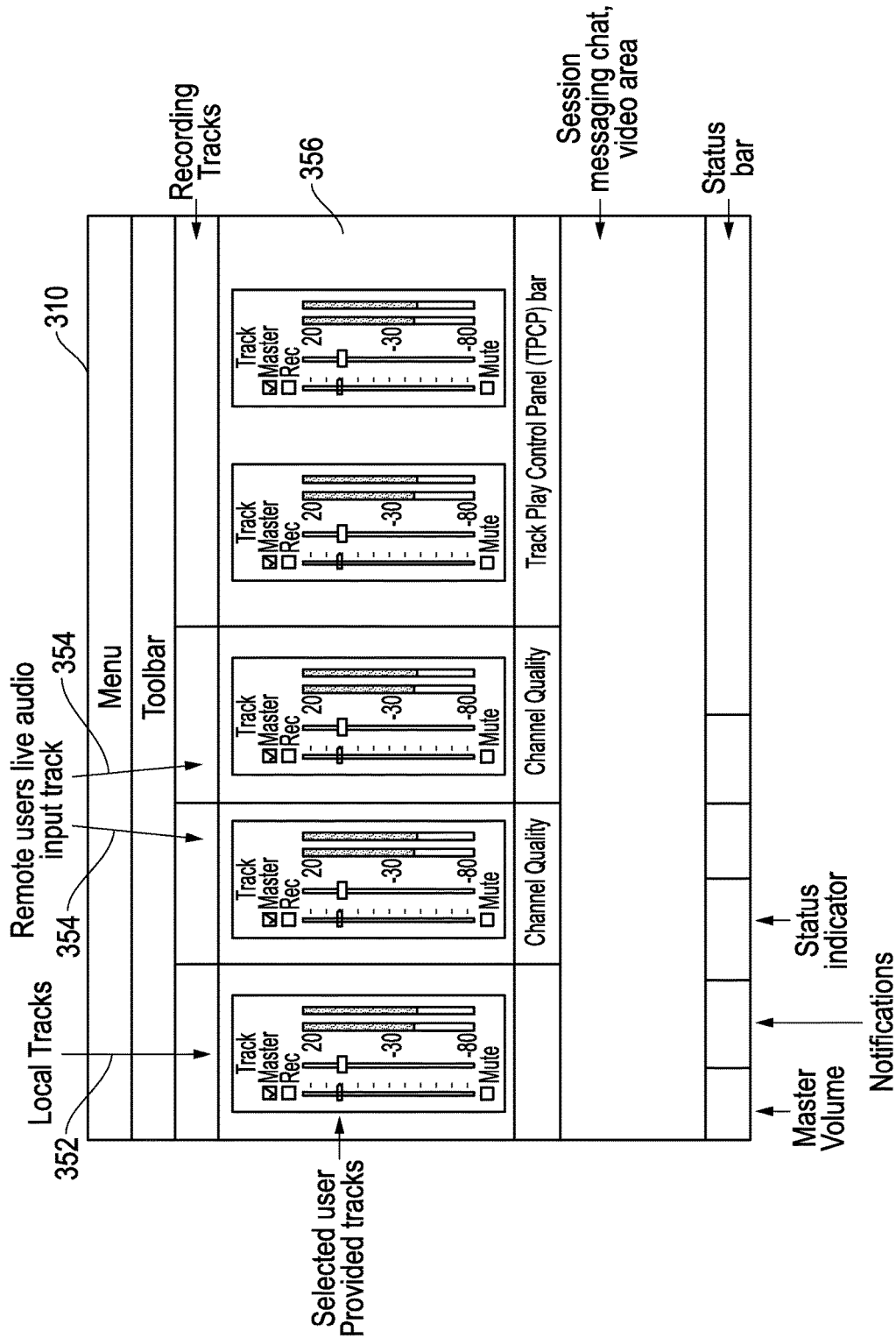
FIG. 3D is a block diagram of an example embodiment for a session information and control window to provide interactive control for the music session by the user.

FIGS. 3A-D provide further different implementation embodiments for the music node (MN) 112. FIG. 3A is a block diagram where components are implemented in one or more electronic devices or systems having independent connections to the network 110. FIG. 3B is a block diagram where components are implemented within a single electronic device or system having at least one connection to the network 110. FIG. 3C is a block diagram where components are implemented using an audio streaming appliance having a separate connection to the network 110. FIG. 3D provides an example embodiment of a graphical user interface providing session management and control for MNs.

Looking now to FIG. 3A, a block diagram of an integrated music node embodiment 320 that includes the components described above within one or more electronic devices with one or more connections to the network 110. Components 302 provide the display and control interface for the music session along with low latency video decode. A session information and control window 310 is displayed to a user that provides session information and control. Components 304 provide the audio input/output including audio input capture, encode, and streaming to the network 110, as well as audio stream receiver, decoder and local output player. Components 306 provide the video capture, encode, and streaming for local video through a video capture device, such as a video camera. The embodiment 320 can also include direct control paths between the components that are integrated portions of the system.

FIG. 3B is a block diagram of an integrated music node embodiment 330 that includes the components 302/304/306 described above within one physical electronic device 332 connected to the network 110. It is noted that for the embodiment 330 no external network is needed to communicate between the internal components. It is further noted that the audio in/out connections to the embodiment 330 can be through built-in or external connections, such as internal or external USB (universal serial bus) ports connected to one or more audio input sources or output devices. Further, the video capture can use built-in or external video connections, such as internal or external USB ports. A system software stack 334 provides control of the internal operations for the device 332, and the system software stack 334 can be implemented using one or more processor(s) running instructions stored in a non-transitory storage medium, as described herein.

FIG. 3C is a block diagram of an example embodiment 340 of a music node (MN) where audio components 302/304/306 are separated into a dedicated audio processing appliance device 346. As depicted, the dedicated audio processing appliance 346 includes components 306 providing the audio capture, audio input processing, audio encode/decode, and peer-to-peer (P2P) network audio interface. The separate device 342 includes components 302 and 304 providing the video, display, and user input mechanism (e.g., keyboard, mouse, touch-screen, etc.) and any additional remaining parts of the separate device 342. A system software stack 344 also provides control of the internal operations for the device 342, and the system software stack 344 can be implemented using one or more processor(s) running instructions stored in a non-transitory storage medium, as described herein. The separate device 342 can be, for example, desktop computer, laptop, tablet, smart phone, and/or another computing device.

FIG. 3D is a block diagram of an example embodiment for a session information and control window 310 that is displayed to a user (e.g., through an application graphical user interface (GUI)) to provide in part the interactive control for the music session by the user. As depicted, the window 310 includes a section 352 that shows audio inputs for tracks being recorded by the local music node, such as a guitar input and microphone (voice) input. Related controls are also provided within section 352, such as for example volume controls for each of these tracks, and these controls allow a user to make adjustments to his/her own tracks in the session. A master volume control can also be provided. The window 310 also includes a section 354 that shows live tracks associated with other MNs within the session, such as a microphone (voice) and keyboard inputs for one or more additional MNs in the session. Related controls are also depicted within section 354, such as for example volume controls for each of these tracks, and these controls allow a user to make adjustments to other non-local tracks in the music session. Selection buttons can also be provided to initiate a recording of tracks within the music session. The window 310 also includes a section 356 that shows recordings that have been made for tracks within the music session, such as for example guitar recordings, microphone (voice) recordings, and/or keyboard track recordings. Related controls are also depicted within section 356, such as for example volume controls for each of these recorded tracks, and these controls allow a user to make adjustments to all of the recorded tracks for the music session. Controls can also be provided for play back control of the recordings, such as for example a play button and a position slider for the recordings. It is further noted that additional or different session information and/or controls can also be provided as part of the window 310. Further, it is noted that additional windows could also be used, and information and controls can be organized, as desired, among these windows while still providing session information and control to a user through a graphical user interface displayed by the music node (MN).

Figure 4A:
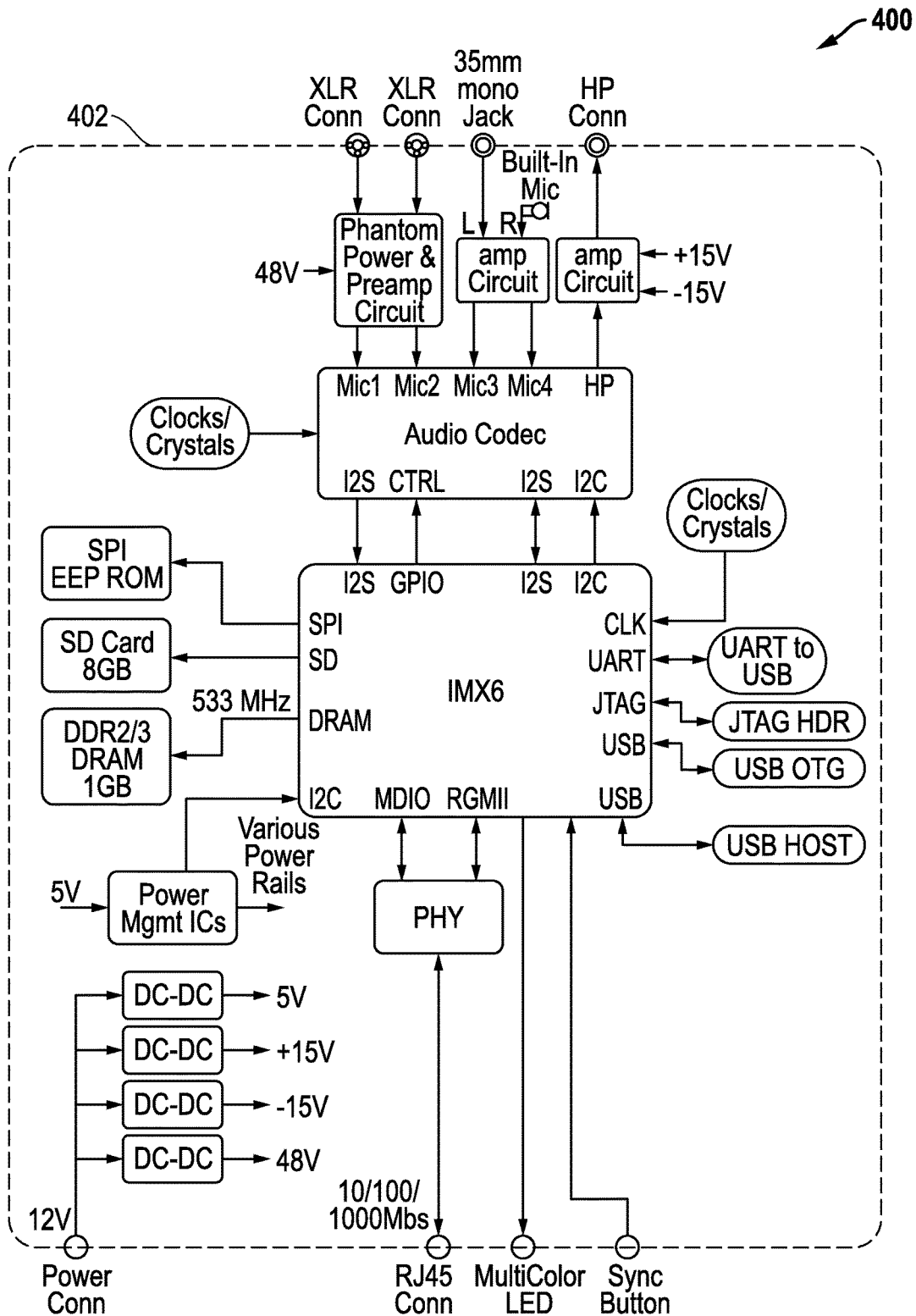
FIG. 4A is a block diagram of a example embodiment for a dedicated audio processing appliance device.
Figure 4B:
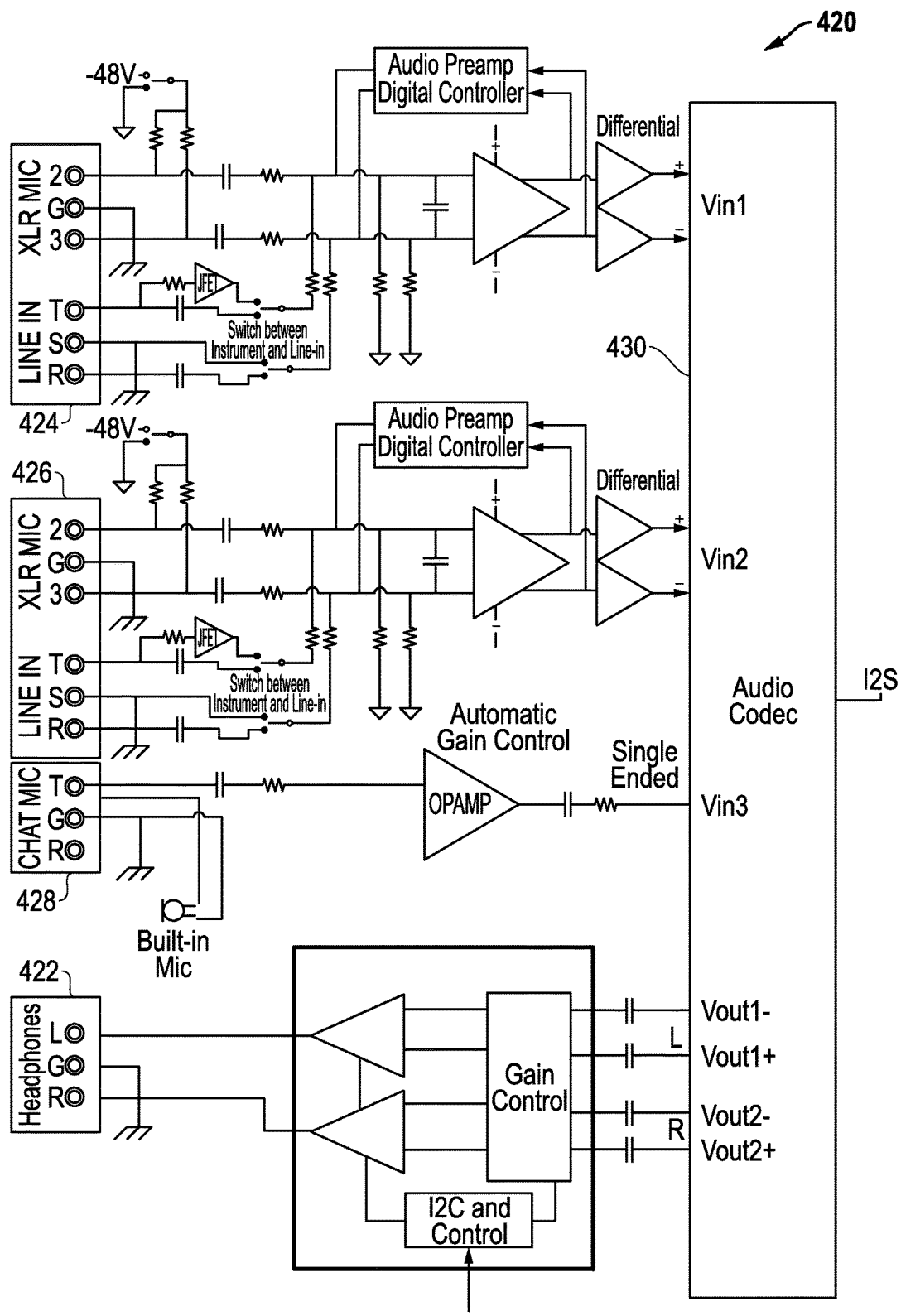
FIG. 4B is a circuit and component diagram of an example embodiment for connections to an audio input/output processor for a dedicated audio processing appliance device.
Figure 4C:
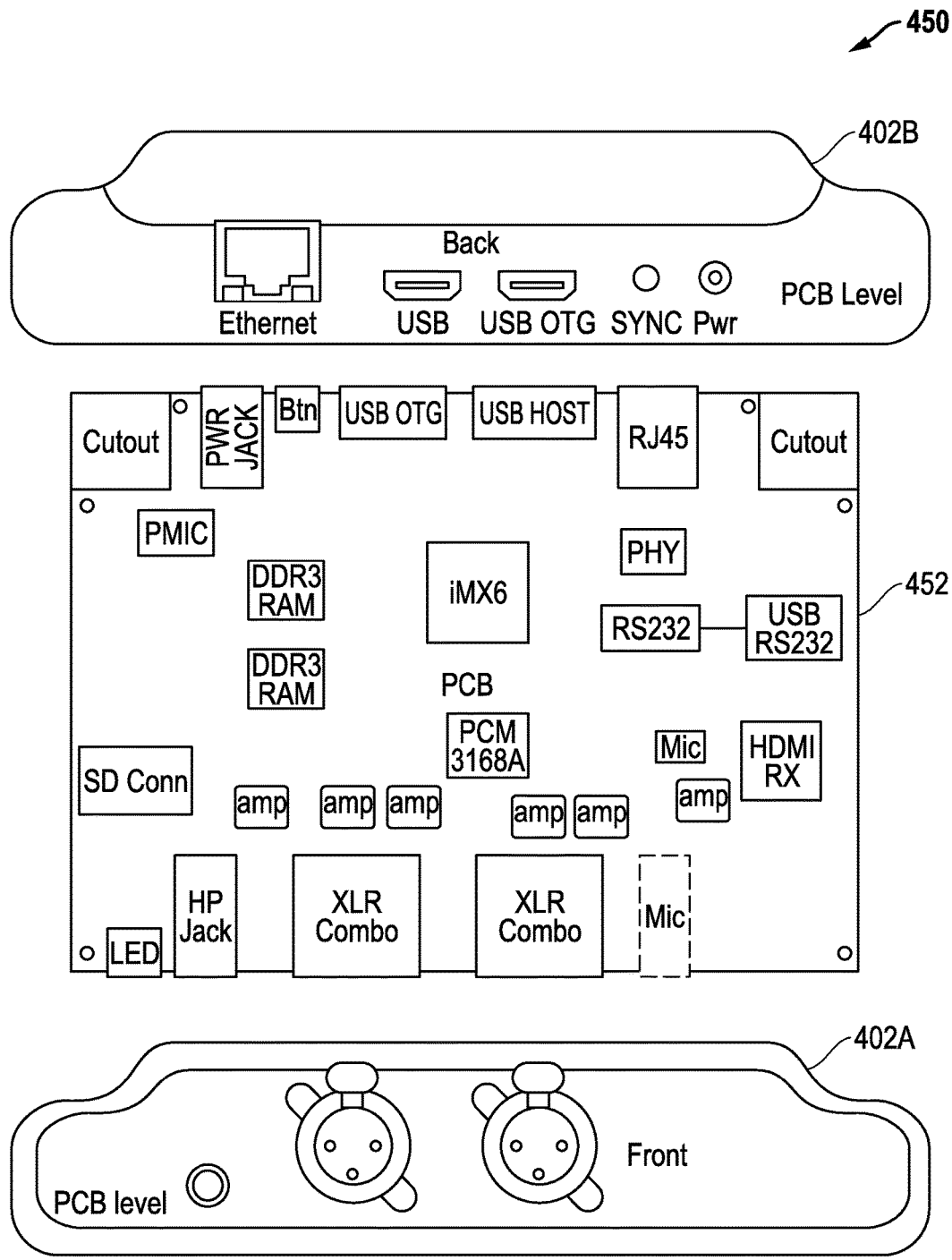
FIG. 4C is a hardware layout diagram of an example embodiment for a dedicated processing appliance device.
Figure 4D:
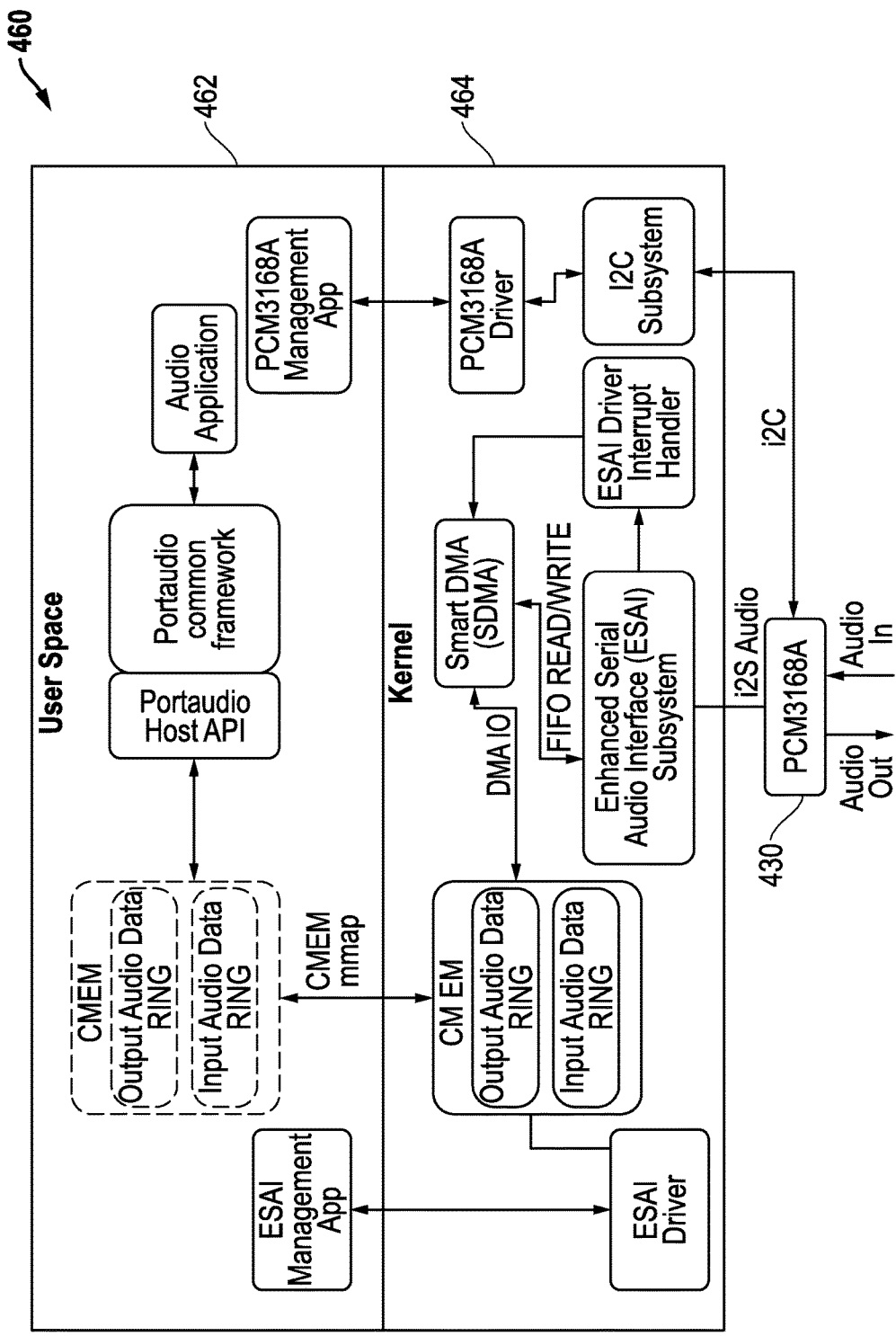
FIG. 4D is a block diagram of an example embodiment for a audio software stack including a user space and a kernel coupled to an audio interface.

FIGS. 4A-D are block diagrams of a further example embodiment for the audio streaming appliance 346. FIG. 4A is a block diagram of an example embodiment for a dedicated audio processing appliance device 346. FIG. 4B is a circuit and component diagram of an example embodiment for connections to an audio input/output processor for a dedicated audio processing appliance device. FIG. 4C is a hardware layout diagram of an example embodiment for a dedicated processing appliance device. FIG. 4D is an example embodiment for an audio software stack that can be used with the dedicated audio processing appliance device or with other MN embodiments if a separate audio processing appliance device is not being used to implement the MN.

FIG. 4A is a block diagram of an example embodiment 400 for a dedicated audio processing appliance device 346. For the embodiment depicted, a device body 402 includes one or more external connections and input/output components, such as for example USB (universal serial bus) connections, SD (secure digital) card reader, a power connector, an RJ45 Ethernet connector, a status LED, a synchronization (sync) button, XLR connectors, a mono connector, a HP (headphone) connector, and/or other desired connections or components. The device body also includes one or more printed circuit boards on which are mounted one or more integrated circuits, discrete components, and electronic communication traces. For example, an audio codec integrated circuit (e.g., PCM3061A from Texas Instruments) can be used that outputs audio such as through the headphone (HP) connector and captures audio inputs (e.g., sampling frequency of 8-96 kHz) such as from the XLR connectors and the mono connector as well as an internal microphone if included. Also, a processor integrated circuit (e.g., iMX6 from Freescale Semiconductor) can be coupled to the audio codec and other components to process the audio input/outputs as well as other MN and music session related input/outputs. Other components could also be included such as EEPROMs (electrically erasable programmable read only memories), DRAMs (dynamic random access memories), clock circuits, crystal circuits, power management integrated circuits, DC-to-DC converters, Ethernet physical (PHY) layer integrated circuits, and/or other desired components.

FIG. 4B is a circuit and component diagram of an example embodiment 420 for connections to an audio codec 430 for a dedicated audio processing appliance device. Example audio connections 422, 424, 426, and 428 are shown as well as example circuits that can be coupled to one or more printed circuit boards between these audio connections and the audio codec 430. As described above, these components can all be located within a device body for an audio processing appliance device. Audio connection 422 is a headphone connector this is coupled to receive left (L) and right (R) audio outputs for the audio codec 430. Audio connection 428 is a chat microphone connector that is coupled to provide audio input voltages to the audio codec 420. Audio connection 424 is a combined XLR microphone connector and audio line-in connector that is coupled to provide audio input voltages to the audio codec 430. A switch is also provided to switch between the XLR microphone input and the line-in input. Audio connection 426 is similar to audio connection 424. The audio codec 430 captures audio inputs and provides audio outputs and communicates audio data and control information to and from other electronic devices using a digital interface, such as a digital serial interface (e.g., I2S interface). Variations could be implemented as desired.

FIG. 4C is a hardware layout diagram of an example embodiment 450 for a dedicated processing appliance device. The front 402A of the device body includes connectors such as the headphone (HP) jack and the XLR combo connectors. The back 402B of the device body includes connectors such as an Ethernet connector, USB connectors, sync button, and a power connector. The printed circuit board 452 includes one or more integrated circuits and/or other discrete circuits or electrical components, as well as interconnecting electrical traces. While an example layout of components is shown, it is understood that this layout is just one example, and other implementations and layouts could be used.

FIG. 4D is a block diagram of an example embodiment for an audio software stack 460 including a user space 462 and a kernel 464 coupled to an audio interface for the audio codec 430. The software stack 460 can be implemented, for example, as one or more processing devices executing program instructions stored in a non-transitory storage medium. As indicated above, one processing device that can be used is an iMX6 processor from Freescale Semiconductor. The software stack provides low-latency audio input/output. In part, the embodiment depicted captures audio at the codec input and sends chunks (e.g., 2.5 ms chunks) of captured audio to the audio application where it is processed. This processed audio is sent back to the codec to have it played as an audio output and is also sent through network communications to peers within a music session. The internal audio input/output latency is preferably less than 3 ms and has a variance of 0.001 or less. An Enhanced Serial Audio Interface (ESAI) subsystem and driver can also be used to transmit and receive digital audio from the audio codec. Further, parallel and/or serial digital interfaces (e.g., I2S, I2C) can be used between the audio codec and the processing device implementing the software stack 460. An open source audio platform, such as PortAudio, can also be implemented within the software stack 460 to provide audio processing within the user space 462. Further, continuous memory allocators (CMEMs) can also be used as well as SDMA (smart direct memory access) controllers. Other variations can also be implemented.

Interactive Music Server System—Server Services

Where the MN embodiments described above provide the input/output of music for the user and other user input/control, the server provides one or more of the following server services: user registration, music session creation, pre join session scoring, recording management, live broadcasting management, global session interface, and/or other server services. Different and/or additional server services can also be used or provide, and variations can also be implemented.

Figure 5A:
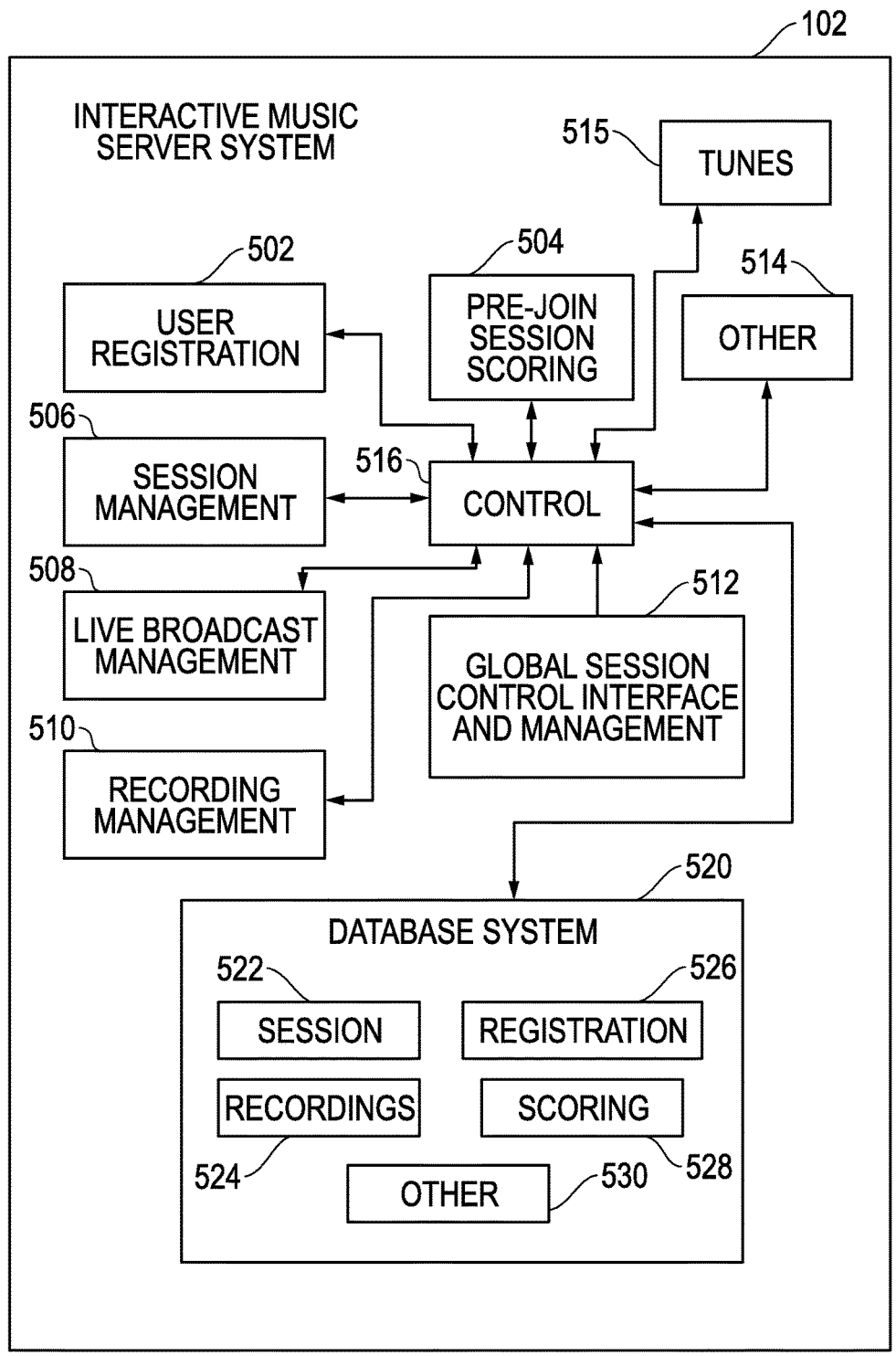
FIG. 5A is a block diagram of an example embodiment for an interactive music server system.

FIG. 5A is a block diagram of an example embodiment for an interactive music server system 102. As described herein, the server system 102 can provide one or more server services for the interactive music system 100 and the music sessions 150 for the music nodes 112, 114 . . . 116 as shown in FIG. 1. Looking to the example embodiment of FIG. 5A, the server system 102 includes a user registration module 502 that operates to provider user registration services, pre-join session scoring module 504 that manages MN scoring for maintaining session quality, a session management module 506 that facilitates the creation and joining/leaving for music sessions, live broadcast management module 508 that manages live broadcasts for the music sessions, a recording management module 510 that manages the movement of recordings among the session MNs, a global session control interface and management module 512 that manages the in-session controls selected by the various MN users, a tunes module 515 that provides features associated with the packaged tunes service described below, and/or other modules 514. For the example embodiment depicted, the server system 102 also includes a database system 520 that is used by the control module 516 and the other modules to store data associated with the operation of the interactive music system 100, including the server systems and the music nodes. For example, the database system 520 stores session information 522, recordings 524 for the sessions, registration information 526, scoring information 528, and/or other information 530. The operation of example modules for the server services is described in more detail below.

It is noted that one or more server systems (e.g., server systems 104, 106 . . . in FIG. 1) can also be used to implement the functional modules for server system 102 in FIG. 5 and described herein. These functional modules can also be distributed among the server systems being used, as desired. Further, multiple server systems can perform similar functions, and load balancing can be used to distribute workloads for the interactive music system 100 among the different server systems. Similarly, the database system 520 can be implemented using one or more data storage devices, and these data storage devices can be internal to or external from the server system(s), as desired. For example, the data storage system 520 can be implemented using internal hard drives, external hard drives, a RAID (redundant array of independent drives) system, network attached storage, and/or any other desired data storage device(s) that provide non-transitory data storage mediums. Other variations could also be implemented while still utilizing one or more server systems and related database systems to provide the server services described herein.

Figure 5B:
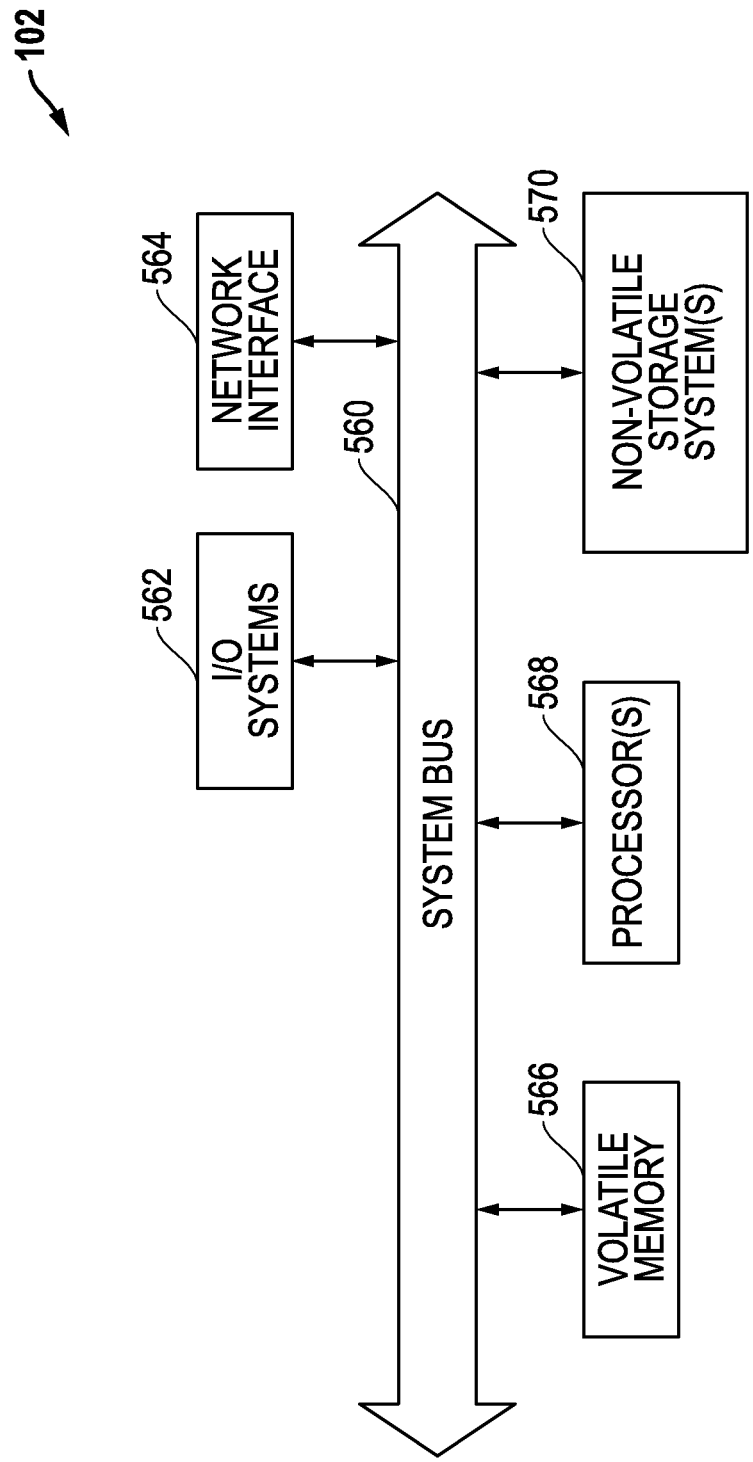
FIG. 5B is a block diagram of an example hardware embodiment for server system.

FIG. 5B is a block diagram of an example hardware embodiment for server system 102. A system bus 560 provides communications between the different subsystems and components of the server system 102. One or more processor(s) 568 communicate with network interface 564 using one or more communication paths, IO subsystems 562 using one or more communication paths, with non-volatile storage system(s) 570, and with volatile memory 566 using one or more communication paths. In addition to storing server services data, as described above, the non-volatile storage system(s) 570 can also store program instructions that are executed by one or more processor(s) 568 to implement the functions described herein for the server system 102. The non-volatile storage system 570 can be, for example, hard drives, optical discs, FLASH drives, and/or any other desired non-volatile storage medium that is configured to store information. Further, the volatile memory 566 can be, for example, DRAM (dynamic random access memory), SDRAM (synchronous random access memory), and/or any other desired volatile memory that is configured to store information while powered.

Functional blocks within FIG. 5A are now further described, although it is again noted that variations could be implemented for these functional blocks. It is further noted that APPENDIX A below describes additional embodiments and example details including MN registration, network communications, control messages, and other aspects for the interactive music system and for NAAS (Network as a Service) server systems that provide network communications for music sessions.

User Registration (502). Each user registers with the server and creates an account. As part of this registration, users also provide certain meta-data such as the kind of instrument(s) they play, the location that they live, and/or other user data information. After registering, a user can access the server system, such as through a web browser and internet connection, and the user can sign in to the server services.

Music Session Creation and Management (506). Once a user is signed in from a MN, the user is able to create music sessions. A music session is a server resource that a user may share with other users, inviting them to join and play music together or listen to music occurring in the session. A session can be a private session such that only the creator or members of the session may invite others to join or listen. A session can also be a public session such that it is listed on the server so that any user with a MN can discover and request to join or listen. The user creating the session can select whether or not to create the session as a public or private session, and this selection can also be changed once the session is created.

Pre-Join Session Scoring (504). To help ensure that users have a positive experience when in a music session, the server can direct the MNs associated with requests to join sessions to perform one or more qualifying tests to provide scoring for the MNs requesting to join. The scoring results of these qualifying tests are sent by the MNs to the server. These qualifying tests can include, for example, reporting network latency information associated with the network latency between the MNs that would be involved in the session. The server then uses the result data passed back to allow the user to join the session, disallow the user from joining the session, provide a warning to the current session participants concerning the new user requesting to join the session, and/or other actions based upon the results of the scoring process. For example, if the latency between the joining MN and one or more of the MNs that are already in the session is beyond a predefined threshold, the server may disallow the user from joining the session or warn the current session MNs but allow the MN to join. The current session MNs can also be given control of allowing or disallowing the new MN to join based upon the scoring results.

Recording (510). The server can also store and subsequently manage access to recordings made by users in a session. This recording management can also include mechanisms for merchandising the content, sharing or editing of the session recordings.

Live Broadcasting (508). The creator of a music session may also elect to live broadcast the session. The server manages access to the live broadcast stream according to the terms requested and/or selected by the user controlling the session. For example, the user can choose to have access to the live broadcast be paid access or free access, to set a limit for the number of listeners, or to allow only invited users to listen, and/or to provide other terms associated with the live broadcast. The server also directs the MN to start/stop the broadcast, for example, to start the broadcast when there is at least one listener and to stop the broadcast when there is none.

Global Session Interface (512). One particularly advantageous aspect to this interactive music system embodiments described herein is that the server provides MN users in a session with a common audio mixer view of all the live input and played-back music sources (tracks) at the MNs in the session, such as for example the embodiment for window 310 shown in FIG. 3D. The track controls (volume, mute, etc.) for any track within the session affect the track at the MN from which it originates. As such, a user at one MN can adjust tracks for the entire session, even though tracks may originate at one or more other MNs within the session, and these adjustments are sent as network communications to the other MNs. The other MNs receive these control messages and adjust their settings accordingly. This global session interface enables any user in the session to configure the track mix setting for the session. By providing a session global track control, the interactive music system simplifies the user experience. For example, even if only one user in the session has basic knowledge of audio mixing, a high quality final mix of the overall session can still be produced that is good enough for immediate broadcast, recording, and/or for the session musicians to appreciate the result of the in-session effort.

Figure 6A:
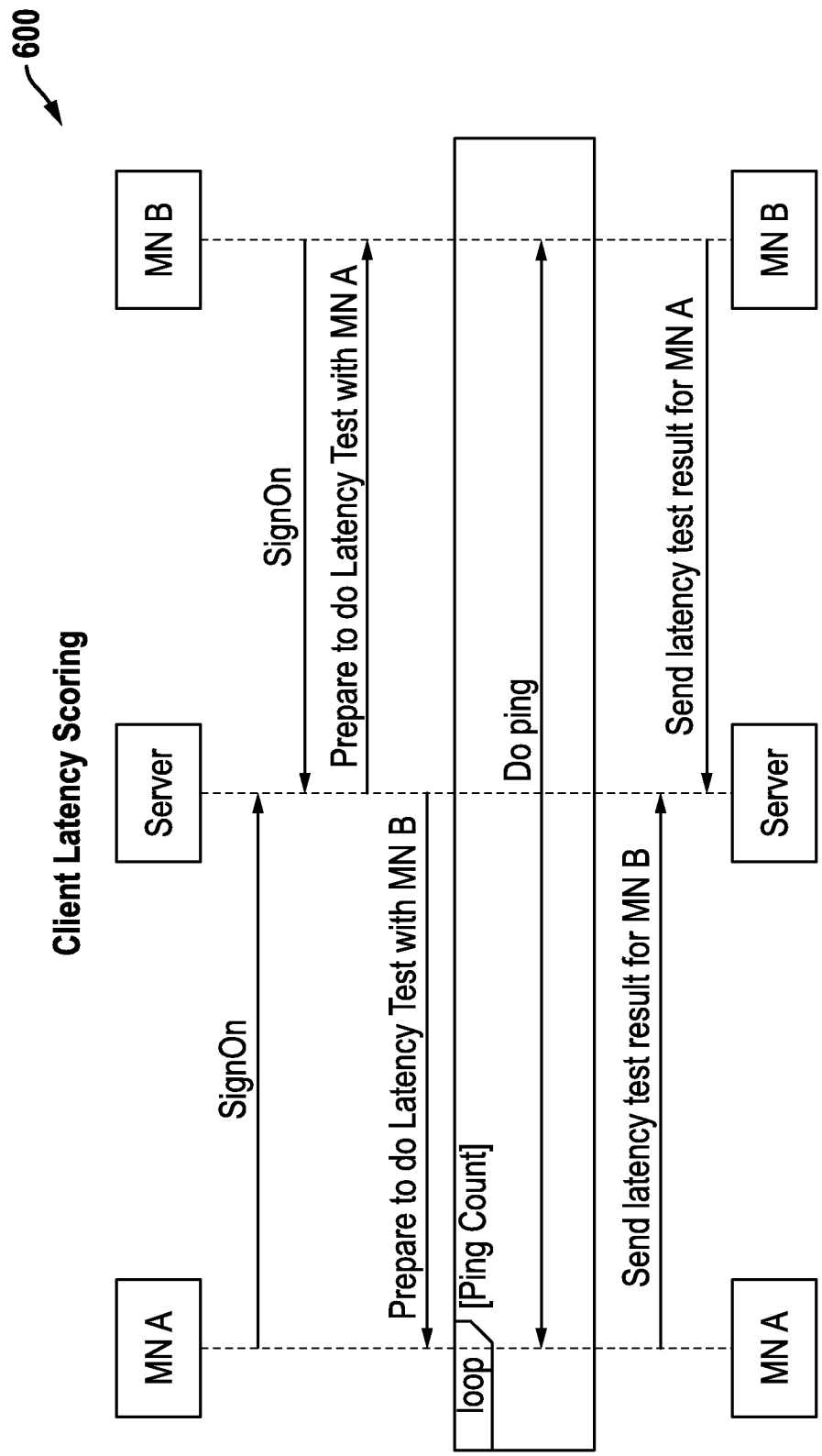
FIG. 6A is a swim lane diagram of an embodiment for latency scoring for two music node (MN) client systems (MNA and MNB) and a server.
Figure 6B:
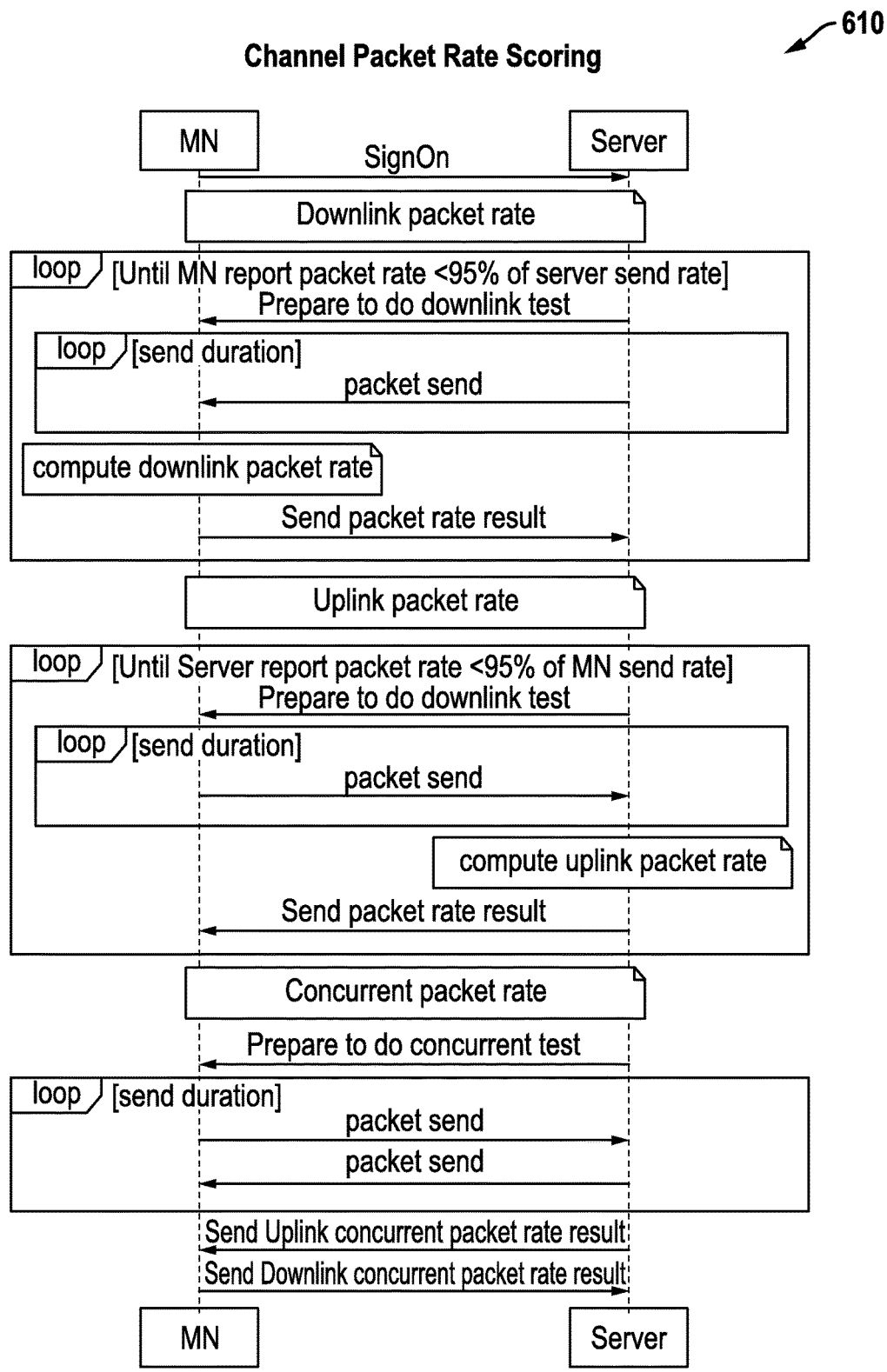
FIG. 6B is a swim lane diagram of an example embodiment for MN packet rate scoring.
Figure 6C:
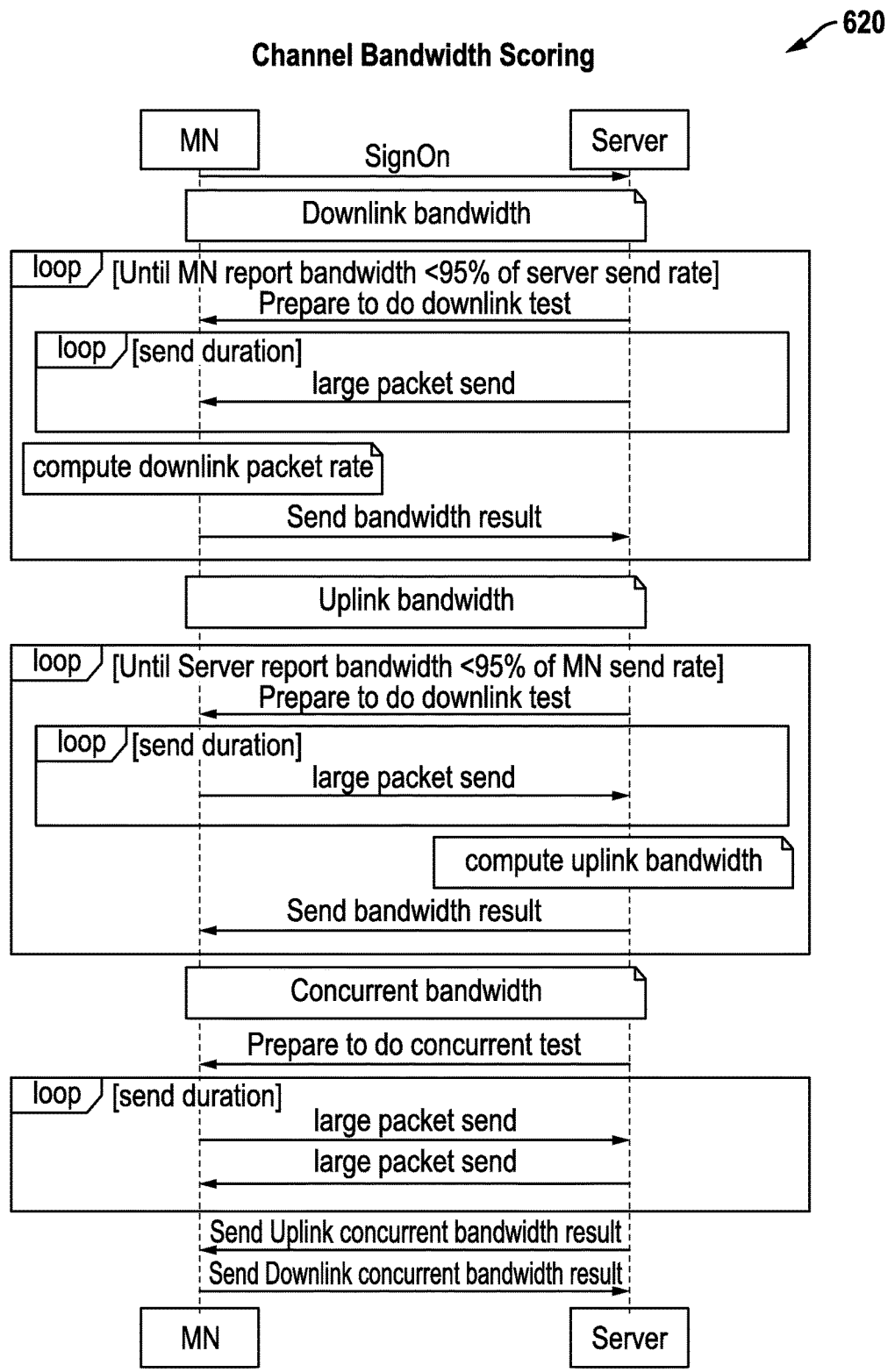
FIG. 6C is a swim lane diagram of an example embodiment for MN bandwidth scoring.
Figure 6D:
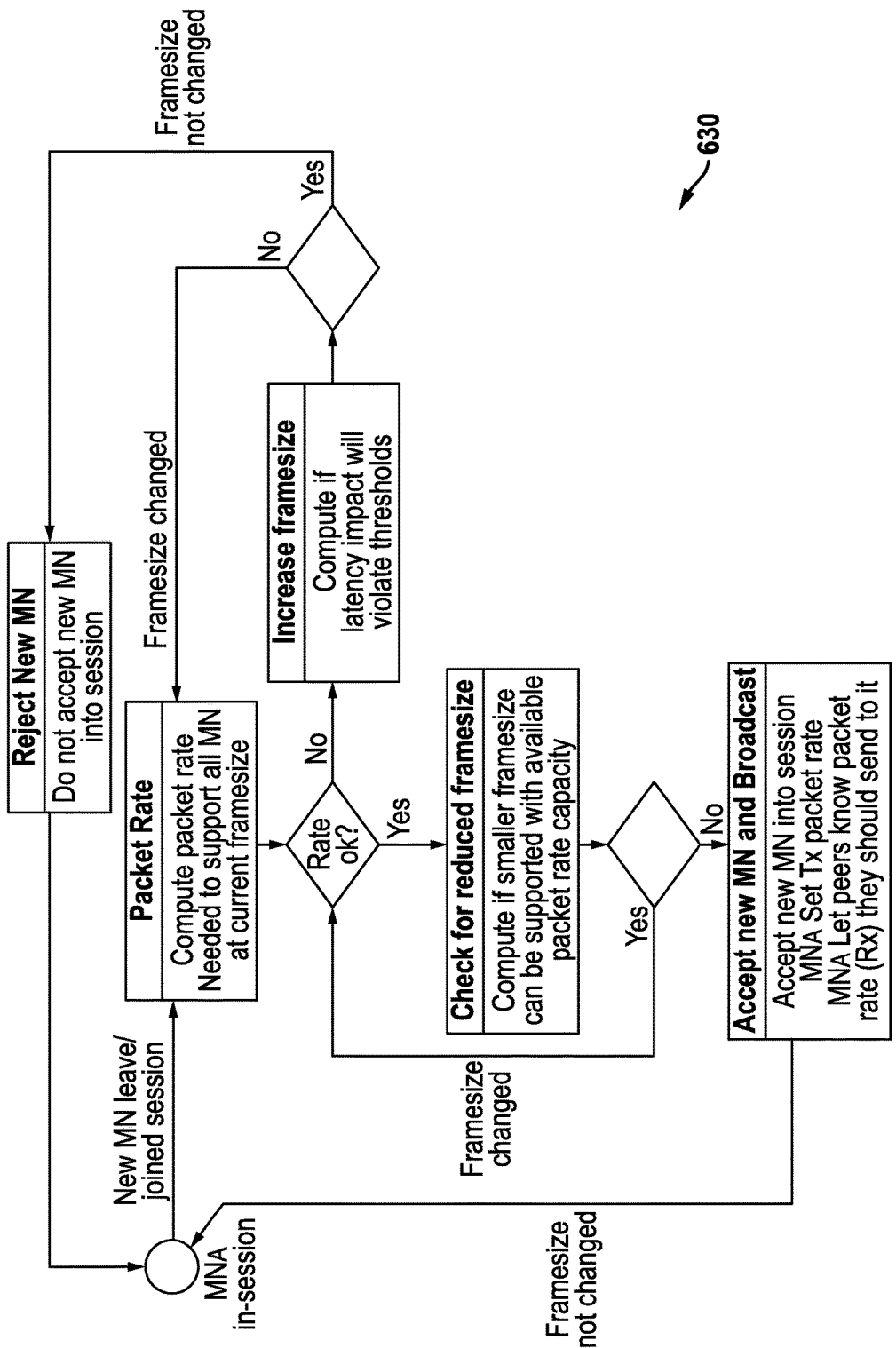
FIG. 6D is a process flow diagram of an example embodiment for adaptive throttling of packet frame size.
Figure 6E:
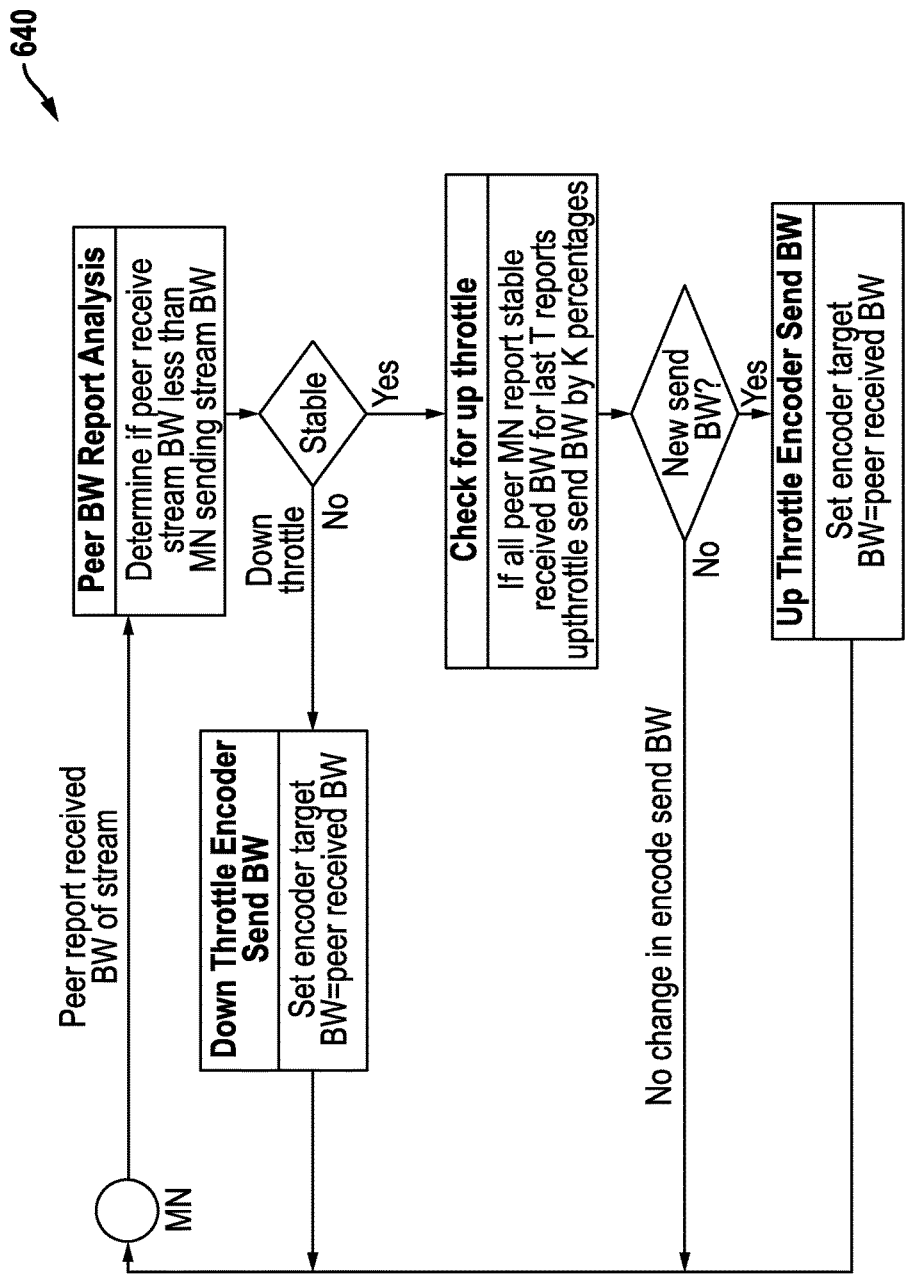
FIG. 6E is a process flow diagram of an example embodiment for adaptive throttling of bandwidth.
Figure 7A:
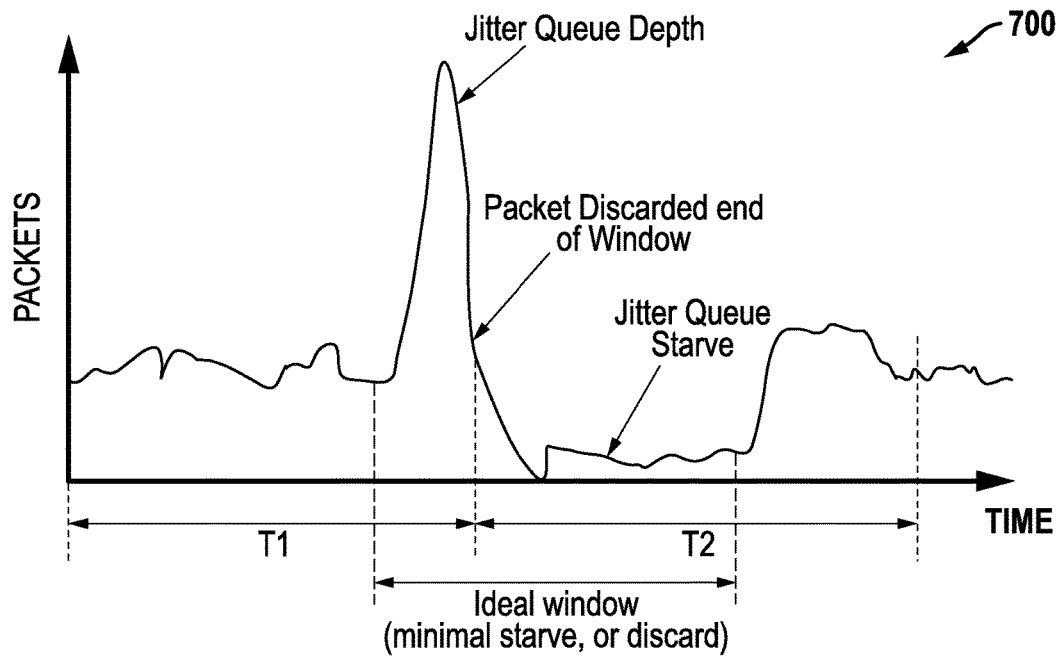
FIG. 7A is a representative timing diagram of an example embodiment for a jitter queue.
Figure 7B:
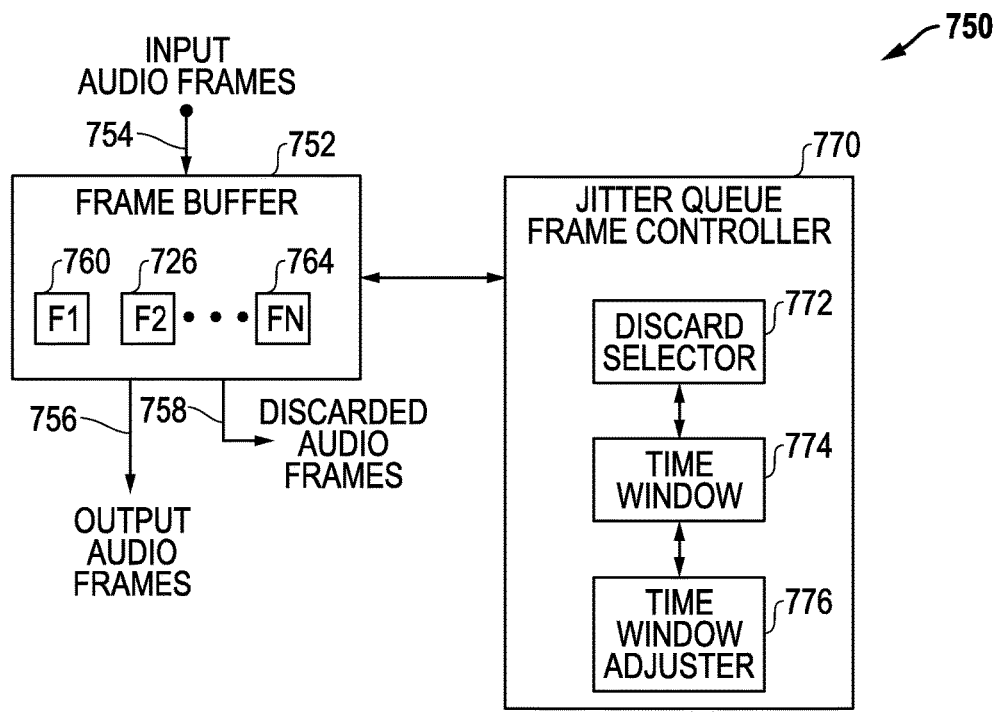
FIG. 7B is a block diagram of an example embodiment for a jitter queue.
Figure 7C:
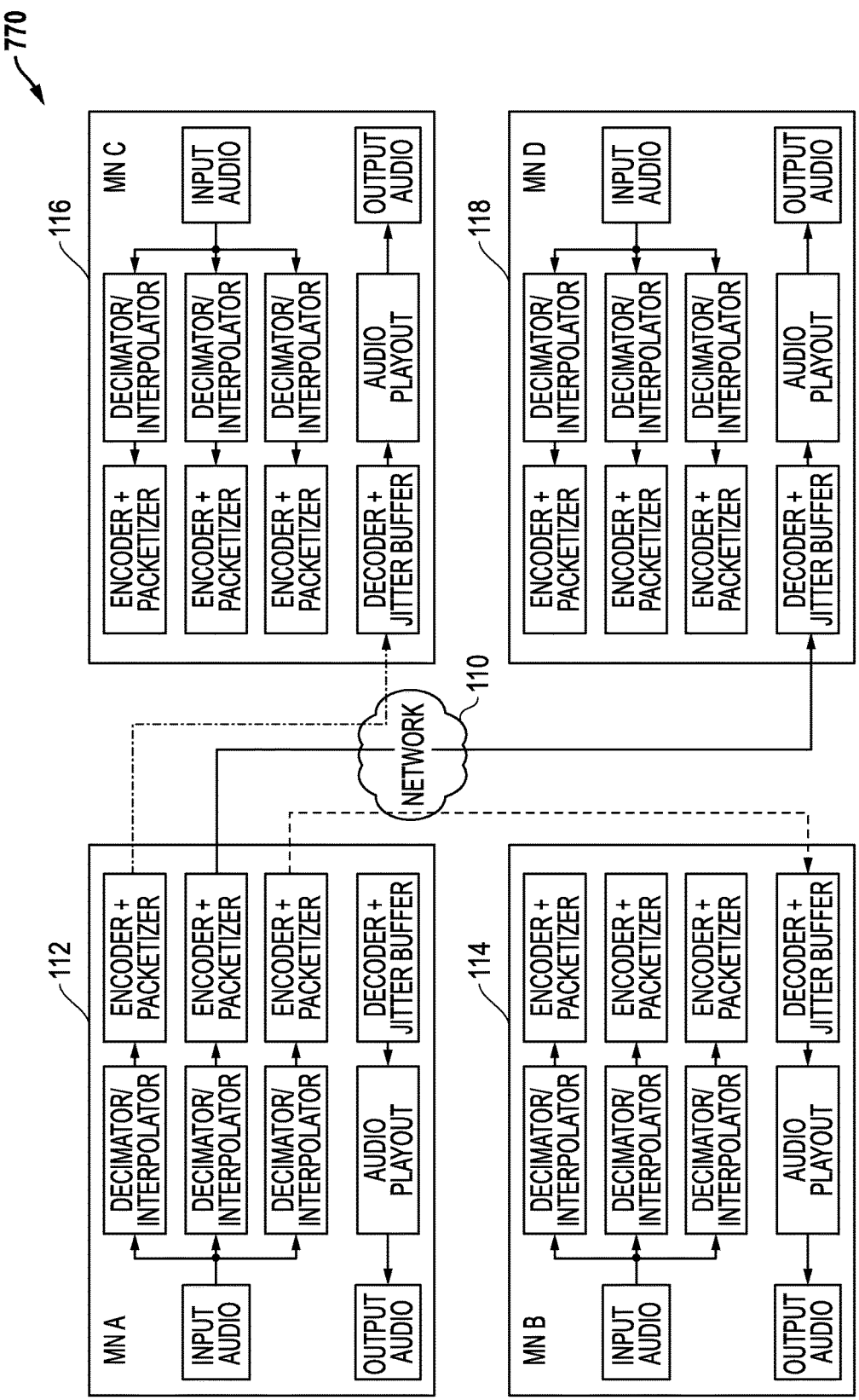
FIG. 7C is block diagram of an example embodiment for sending MNs having sending queues including decimator/interpolator blocks and encoder/packetizer blocks to adjust send rates for receiving MNs.

Example operational features and embodiments for the interactive music system will now be further described with respect to FIGS. 6A-C(session scoring), FIGS. 6D-E (adaptive throttling), FIGS. 7A-C(jitter queue), 8A-C(recording), 9A-B (distributed metronome), 10A-D (virtual positioning), 11A-B (concert broadcast), 12A-B (large group session), 13A-B (musician hinting), and 14 (songs/tracks/tunes service).

Session Scoring

Before a MN is allowed into a session, it is first qualified using a session scoring. This pre join session scoring helps to ensure that all users in the session have a good experience. The following discussion provides more detailed examples for the scoring process.

Latency Scoring and Thresholds. Depending upon the beats-per-minute (BPM) used in a musical performance, the performing musicians can accommodate various amounts of audio latency and still have a qualitatively good interactive music experience. Latency here refers to the time it takes for sound to reach the participating musician after leaving the sound source. In free space, sound travels at approximately 0.34 meters per millisecond (m/ms). It is observed that generally the distance on stage that musicians can participate at high BPM (e.g., about 160 BPM) without a director/conductor is about 8 meters. This distance represents a latency of about 24 ms (e.g., 8 m/0.34 m/ms≅23.5 ms. If the BPM of the performance is lower (e.g., about 100 BPM), it has been shown that latency of up to about 50 ms (e.g., representing about 17 meters separation) can be accommodated by musicians performing together on stage.

Latency between MNs within the interactive music system embodiments described herein includes: (1) transmit latency (T) including time to capture, encode, and transmit audio packets, (2) receive latency (R) including time to buffer (e.g., the jitter queue described below), decode, and play received audio packets, and (3) network latency (N) including time for audio packets to travel within a network between two MNs. If the capture, encode, and transmit latency for the sending MN is represented by T; the receiver jitter queue, decode and play latency for the receiving MN is represented by R; and the one-way network latency from the sending MN to the receiving MN is represented by N; the total audio path latency or delay (D) for audio originating at the sender and arriving at the receiver can be represented as D=N+T+R.

As between one music node ($MN_i$) sending to another music node ($MN_j$), the delay ($D_{i,j}$) between these two nodes can is represented using the following equations:

$$D_{i,j}=N_{i,j}+T_i+R_j$$

where $N_{i,j}$ is the network delay from $MN_i$ to $MN_j$, $T_i$ is the transmit delay for $MN_i$, and $R_j$ is the receive delay for $MN_j$. The maximum latency in the session ($S_{delay}$) can be represented by the following equation:

$$S_{delay}=\forall_{i,j}\max(D_{i,j},D_j,i)$$

wherein all music nodes (MN) in the session as well as audio paths to and from each pair of MNs are considered to find the maximum session latency.

At a MN within the session, rather than treating the transmit latency different from the receive latency, the latency can also be approximated by considering an average of the two. Thus, the latency ($M_x$) for a given music node ($MN_x$) within the session can be represented as $M_x=(T_x+R_x)/2$. Similarly, it can be approximated that different MNs ($MN_x$, $MN_y$, . . . ) have similar characteristics (e.g., $M_x \cong M_y$) so that the latency (M) can be approximated for the MNs within a session such that $M_x \cong M_y \cong M$.

If $D_{max}$ is a maximum allowed music delay threshold for a session, then the latency between any two music nodes ($MN_x$, $MN_y$) should be less than $D_{max}$ to maintain a good user experience within the session. As such, it is desirable that the following equation be satisfied: $(N_{x,y}+2M) \leq D_{max}$. This expression can be rewritten as $2N_{x,y} \leq (2D_{max}-4M)$. The network ping between the two music nodes can be represented as $PING_{x,y}=2N_{x,y}$, assuming the network delay time is about the same in both directions (e.g., $N_{x,y}=N_{y,x}$). Substituting into the previous expression, the following equation can be used to assess whether or not to allow a new MN into a session:

$PING_{x,y} \leq 2(D_{max}-2M)$ or $PING_{x,y} \leq 2(D_{max}-NodeLatency)$ or

½$(PING_{x,y})+NodeLatency \leq D_{max}$ where it is assumed that $2M=(T+R)=NodeLatency$. Thus, a determination of whether a MN should be allowed to join a session can be based upon a predetermined node latency (e.g., transmit latency (T)+receive latency (R)) and a predetermined maximum delay ($D_{max}$) along with a network ping test result between the two nodes ($PING_{x,y}$). The condition, therefore, can be used to filter the music nodes that are allowed into session.

FIG. 6A is a swim lane diagram of an embodiment 600 for latency scoring for two music node (MN) client systems (MNA and MNB) and a server. First, both MNA and MNB sign on to the server. Next, the server communicates with MNB to prepare MNB to do a latency test with MNA. The server also communicates with MNA to prepare MNA to do a latency test with MNB. The server then initiates a ping count loop for both MNA and MNB. MNA then sends the results of its latency test for MNB to the server, and MNB similarly sends the results of its latency test for MNA to the server. As described herein, the server can use these scoring results to determine whether or not MNA and MNB will be able to interact in a music session with latency below a threshold selected as a latency threshold that provides for positive user experience. If the latency test results indicate latency scoring that does not meet the selected thresholds, then appropriate actions can be taken as described herein, such as not allowing MNB to enter a session created by MNA, issuing a warning to MNA that allowing MNB may degrade performance beyond acceptable levels, and/or any other desired action. Variations can be implemented as desired, and example variations are described below.

Latency Scoring Optimization. To improve the speed at which latency between a given set of MNs is calculated, one or more of the following optimizations can also be utilized: caching, distance filter, network correlation, updating, and/or other optimization determinations. In part, these techniques include estimating expect latency without requiring the MNs to initiate and respond to ping tests, as this ping testing can itself significantly slow down the MN as numbers of MNs within the system increases.

Caching. If latency scoring between a given pair of MNs (A, B) were recently calculated, use that number result instead of asking the nodes to perform new latency probes.

Distance Filter. A distance filter can be applied using a geographic IP (Internet Protocol) address database. For consumer class internet network services, the observed network latency generally approximates to one way delay of 30 miles per millisecond or 15 miles per network ping millisecond, as the network ping includes transmit and return paths. By using the IP address of the MNs and a GEO IP database, the longitude and latitude of the MNs can be determined. The terrestrial distance between MNs can then be computed, and internet latency can be approximated. For example, if a network ping time of 30 ms is used as threshold network latency, then this translates to about 450 miles of allowed geographic separation (e.g., 15 miles per ping ms*30 ms=450 miles). The current approximate geographic limit, therefore, is under about 500 miles assuming 30 ms of network latency is allowable for a good user experience by the MNs. Thus, it is expected that users that have distances of more than 500 miles between them are unlikely to have a good interactive music experience, as the latency will be too great to allow for a good interactive music experience.

Network Correlation. If the IP address of a first MN (A) corresponds to the that of a second MN (B) and the two MNs are served by the same ISP (internet service provider) and are in the same local geographic area (e.g. same city and/or zip code), then if the latency of the first MN (A) to a third MN (C) is known, the system infers that latency from the second MN (B) to the third MN (C) will be similar and uses that scoring data.

Updating Latency Cache with Actual Latency. The above guesses or proxies for latency are updated when the nodes actually join a session. Once joined, the actual latency between the MNs is observed and passed to the server. The server then uses this data to refine the accuracy of its latency estimation optimization. If a user is invited explicitly to a session, then the latency of the user is not used to filter them. However, the server system can warn the new user or the current session members of high network latency if the distance or latency between the new user and any MN in the session is large. The server system also warns users periodically during session that the network condition is unfavorable if the latency between one MN and its peers goes and stays beyond a threshold.

As indicated above, as a MN comes online or requests to join sessions, the server directs them to perform latency probes with other MNs. The MN may be dormant (e.g., not in a music session) or active (e.g., in a music session). If the MN is in a session, the server is careful to control the rate at which it asks the MN to do probes as the latency probe process may negatively affect the user network capacity thereby degrading the interactive audio experience. New latency probe data that is acquired by the server is then used to refresh the server latency cache.

Latency Probe with Proxy Server. In some cases, a MN will communicate to the network through a proxy server. In this case the overall network latency is the network latency for a MN wanting to join the session to the server plus the maximum latency from the proxy server to MNs that the joining MN wants to communicate with as part of a music session.

Client Decoding Capability in Scoring. In addition to network latency, the decoding capability of the MN that is joining the session plays a role in impacting the session experience of all users. The compute capability of MN directly correlates to how many audio streams it can concurrently decode and then process the resulting audio such that the real-time requirements of the system is maintained. A MN is said to be "K" stream capable if K is the maximum number of audio streams it can concurrently decode and process in real-time. If a user with a MN having decode capability of K streams tries to join a session with more than K streams in it, the user will not be allowed and/or a warning will be issued. Similarly, it is noted that the MN with lowest K stream capability within a session in effect limits the session to no more than K participant streams without degrading the session.

Edge Network Scoring. Currently, for lowest audio latency, a MN will preferably need to send audio packets to its peers every 2.5 ms or 400 times per second. In a session that has X participants and that is fully peer-to-peer (P2P), every MN will transmit (X−1)*400 packets per second. Similarly, it will receive (X−1)*400 packets per second. This implies that the users network (e.g., home network router or other network interface) must be able to support a full duplex packet rate of 800*(X−1) packets per second. In a session with five (5) MNs, therefore, this produces 3200 packet per second. Current technology in some home routers and wireless network access points (e. g., Wi-Fi) are unable to support this kind of throughput.

Similarly, as the number of MNs in a P2P session grows, the uplink bandwidth grows linearly with number participant. For many users on broadband networks provided by internet service providers (e.g., cable companies, phone companies, etc.), the downlink bandwidth is significantly higher than the uplink bandwidth. For a MN to send a 256 kilobits per second (kb/s) audio stream at 400 packets per second with UDP (User Datagram Protocol) formatting requires 380 kb/s of bandwidth. If a user has an uplink bandwidth of 1 megabits per second (1 mb/s), this uplink bandwidth clearly limits the number of P2P connections to other MNs the user MN can have to at most two MNs at this audio bit rate. By using a lower audio bit rate of about 96 kb/s, the per stream uplink bandwidth falls to 220 kb/s. With this lower bit rate, therefore, the same user can potentially accommodate four P2P MNs in a session.

The packet rate limit or bound for a user is often is reached before the bandwidth limit or bound for the user. Either way, however, by pre-scoring the user's network latency, the interactive music system is able to filter whether a MN may join a session without adversely affecting the user experience within the session. For example, the creator of the session may set a criterion that only MNs that can support stream audio at a bit rate of X or greater and packet rate of 400 packets per second to all peers within the session may join the session. The server uses these filters in conjunction with the MN packet and bandwidth scores to determine session admission.

MN Packet Rate Scoring. As one example, the MN packet rate scoring is performed as follows. The MN connects to a scoring server hosted by one or more server system(s) through the network 110. The scoring server sends UDP test packets at high rate of K packets per second for some duration T, where K is multiple of 400 or some other selected number. The payload of the test packets represents that of a session music payload, for example, a session music payload at 128 kb/s aggregated with that of chat stream of 40 kb/s. At the end of the interval T, the MN reports to the server how many packets it received. If the MN reports receiving 95% or more of the packets (or some other selected threshold), it then requests another scoring session with the server but with twice as many packets per second as was sent previously. This continues until the MN reports to the server receiving less than 95% of the packets sent by the server (or some other selected threshold).

The downlink channel packet rate ($D_{RATE}$) is then determined by multiplying the final server packet rate with the percentage of packets received by the MN in the last cycle. Next the uplink capacity of the client is determined. The server directs the MN to send packets to it a rate of K for T seconds. At the end of the T, the server reports to MN how many packets it received. If the server reports receiving 95% or more of the packets sent by the MN (or some other selected threshold), the MN will double its send packet rate to the server on the next cycle. When the uplink receive rate by the server is less than 95% (or some other selected threshold), the uplink channel rate ($U_{RATE}$) is computed by multiplying the final packet send rate of the MN with the percentage of packets received at the server in the last cycle.

Next, the concurrent channel packet rate is computed. The server and the MN each sends packets concurrently for T seconds. The server sends at $D_{RATE}$ and the MN sends at $U_{RATE}$. If the server receives U percentage of the packets the then MN and the MN receives S percentage of the packets from the server, the effective channel packet rate capacity (C) of the MN network connection in a music session can be given as two times the minimum of S times $D_{RATE}$ or U times $U_{RATE}$, which can be represented by the equation: $C=2*\min(S*D_{RATE}, U*U_{RATE})$. The channel packet rate capacity (C), for example, can be used as the MN packet rate score.

FIG. 6B is a swim lane diagram of an example embodiment 610 for MN packet rate scoring. The MN signs on to the server. First, the downlink packet rate communications then occur between the MN and the server. The downlink packet rate result is then sent from the MN to the server. Next, the uplink packet rate communications occur between the MN and the server. The uplink packet rate result is then sent from the server to the MN. Finally, the concurrent packet rate communications occur between the MN and the server. The concurrent downlink packet rate result is then sent from the MN to the server, and the concurrent uplink packet rate result is then sent from the server to the MN. The final packet rate scoring result is then determined by the server and/or the MN.

MN Bandwidth Scoring. Similarly, to determine the MN channel bandwidth score, the sequence described above is repeated, but this time large payload test packets are used to determine an effective downlink throughput ($B_{DOWN}$) and uplink throughput ($B_{UP}$), for example, in terms of megabits per second (mb/s). These rates are determined by the largest bandwidth needed at a MN to support the largest expected number of concurrent users in a session with all features of the service in play (e.g., video, music, messaging, etc. enabled). At end of the bandwidth scoring, the MN downlink bandwidth ($D_{BW}$) is computed, and the uplink bandwidth ($U_{BW}$) is computed.

FIG. 6C is a swim lane diagram of an example embodiment 620 for MN bandwidth scoring. The MN signs on to the server. First, the downlink bandwidth communications then occur between the MN and the server. The downlink bandwidth result is then sent from the MN to the server. Next, the uplink bandwidth communications occur between the MN and the server. The uplink bandwidth result is then sent from the server to the MN. Finally, the concurrent bandwidth communications occur between the MN and the server. The concurrent downlink bandwidth result is then sent from the MN to the server, and the concurrent uplink bandwidth result is then sent from the server to the MN. The final bandwidth scoring result is then determined by the server and/or the MN.

Adaptive Packet Rate Throttling. If a MN's network environment score (e.g., packet rate scoring, bandwidth scoring) indicates that it can support only P packets-per-second and the number of MNs is K in the session, the MN can send audio packets at a first packet rate as long as the MN can support a packet rate (P) above a selected threshold, such as for example 400 times per second, such that the following threshold condition remains true: $P \geq 2*400(K-1)$. When the threshold condition becomes false, the MN switches to a lower packet rate, such as for example to 200 packets per second by aggregating two audio frames (e.g., two 2.5 ms audio frames) within in a single packet. The MN can also inform it peers to send packets to it at a lower rate, although it may throttle the send and receive rates independently. In the case where both send and receive rates are throttled back to 200 packets per second, such as when $P \geq 2*200(K-1)$, the system may further throttle the packet rate by aggregating in single packet, such as four audio frames (e.g., four 2.5 ms audio frames) in a single packet. Further aggregations and packet rate reductions could also be used.

While process of aggregating packets adds latency, the packet rate and overall bandwidth are reduced. At 200 packets per second, for example, the MN has 2.5 ms more latency relative to 400 packets per second. At 100 packets per second, the MN has 7.5 ms more latency relative to 400 packets per second. If the end-to-end latency is still within the desired limits, packet rate throttling is an effective mechanism for extending the possible set of MNs that may participate in a session. If $T_{max}$ is the maximum allowed latency in the session and T is the latency of the session before packet rate down throttle, then down throttle is allowed if ($T_{max}-T$) is greater than the additional latency cause by packet rate down throttle.

It is further noted that as the number of MNs grow, the MN can adaptively down throttle the send or receive packet rates. Conversely, as the number of MNs in the session decline, the MN can adaptively up throttle the packet send or receive rates as well. It is further noted that if the server system is used as proxy, as described below with respect to the NAAS (Network as a Service) embodiments, the uplink and downlink packet rate from a MN can become invariant to the number of MNs in the session.

FIG. 6D is a process flow diagram of an example embodiment 630 for adaptive throttling of frame size when an MN leaves or joins a music session. When an MN leaves or joins, a new packet rate is determined for the remaining MNs. If the rate meets latency requirements, then a determination is made whether the framesize can be reduced. If the framesize is changed, then the rate is again checked. If the rate is not satisfactory, then a determination is made whether to increase the framesize. If the framesize is changed, then a new packet rate is again determined. If not, then the new MN is rejected for the session. Once a new framesize is selected and approved, the new framesize is communicated to all MNs in the music session, and the new MN is accepted into the session.

FIG. 6E is a process flow diagram of an example embodiment 640 for adaptive throttling of bandwidth (BW). If a difference in receive BW and send BW is detected, then a determination is made whether the communications are stable. If not stable, then bandwidth is down-throttled. If stable, then a check is made to determine if BW can be up-throttled. If a change is made, the communications are sent to adjust the MN bandwidth.

Jitter Queue

As audio packets traverse the network, jitter (variability in the inter-arrival time at the receiver) is introduced. As the audio play out preferably happens at a constant rate, packets are buffered through a jitter queue within the MN and then dequeued and played at constant rate.

Classically, a jitter queue preferably buffers enough packets to account for the longest expected inter-arrival delay or jitter, thereby ensuring that the play out (e.g., audio output information ultimately heard by the user) does not starve once it has begun. When a play out does starve, the typical results are sound artifacts in the play out. The ideal low-latency audio jitter queue is considered herein as one where the buffer for the jitter queue always drains to zero at least once, but does not starve, in a predefined window of time. Satisfying this condition helps to guarantee that audio latency is not built up on the jitter queue, and this condition can be represented by the expression: $JQ_{MIN}=0$, during time T, where $JQ_{MIN}$ represents the minimum number of packets in the jitter queue during a time duration represented by T.

It is noted that a time duration T of one second or less is a preferable threshold to be achieved for the jitter queue reaching zero in order to preserve a low-latency and high-quality audio experience. Other values for the time duration T could also be selected, if desired.

If the jitter queue does not reach zero during the time duration T (e.g., $JQ_{MIN}\ne 0$, during time T), then a buildup of latency can be deemed to be occurring as some packets will not be processed within the time period T. To avoid this condition, the MN can discard packets from the jitter queue in one or more of the modes described in more detail below.

Further, if packets are discarded from the jitter queue in one interval $T_i$ and then starves in a subsequent interval $T_{i+1}$, this subsequent starving can be used to indicate that the monitor time window T is not aligned with packet variances that are occurring in the interactive music system.

FIG. 7A is a representative diagram of an embodiment 700 for a jitter queue that buffers audio frames for play output. The x-axis represents time, and the y-axis represents packets within the jitter queue. The first time window (T1) included a spike in the number of packets that is potentially limited by the jitter queue depth (e.g., the total number of packets that can be stored in the jitter queue). As described below, any remaining packets within the jitter queue at the end of the time period (T1) can be discarded. During the second time window (T2), the portion of the diagram where low numbers of packets are within the jitter queue indicates where the jitter queue is close to being starved. At the end of time period (T2), the packets remaining in the jitter queue can again be discarded. As described herein, an ideal time window is the one where the jitter queue reaches zero at least once with minimal starve and discard at the end of the time period. An example ideal window is indicated for embodiment 700.

As the bursty nature of jitter is considered to be statistically random, one can only strictly avoid this situation by increasing the window of time T to a large value. Hover, this is not desirable because of the following reason. If at the beginning of the window K packets were delayed within the network and had not yet been received, the jitter queue may starve. The play out buffer for the MN can be configured to play filler audio frames during the starved mode until the late packets arrive. If the late packets later arrive along with the rest of subsequent packets in a timely manner, the jitter queue will always have K worth of extra packets on it and the user will perceive this latency. To avoid this situation, the time duration T can be bound and frames remaining within the jitter queue at the end of the time window T can be discarded, if the jitter queue did not reach zero within the time window T. The smaller the value of T initially, the more accurately this indicates of low-latency playout. However, if the network is highly bursty, the system adaptively expands the window up to some threshold. If the network stabilizes after some time (indicated by low starves and high empty buffer counts), the system throttles down the window duration. If the queue did not reach empty during the interval, then remaining frames are discarded.

FIG. 7B is a block diagram of an example embodiment 750 for a jitter queue. A frame buffer 752 receives input audio frames 754 and stores these input frames. The stored frames (F1, F2 . . . FN) 760, 762 . . . 764 are then output in a FIFO (first-in-first-out) order as audio frames 756 unless discarded as discarded audio frames 758. The jitter queue frame controller 770 communicates with the frame buffer 752 to analyze the stored frames (F1, F2 . . . FN) 760, 762 . . . 764 and to provide control information to the frame buffer 752 including discard instructions. As described herein, the time window (T) can be used to determine when discard determinations are made for the stored frames (F1, F2 . . . FN) 760, 762 . . . 764, and this time window (T) can be dynamically adjusted by the time window adjuster 776 based upon the conditions of the stored frames (F1, F2 . . . FN) 760, 762 . . . 764. The time window (T) is provided to the discard selector 772, and the discard selector 772 generates discard instructions at the end of each time window (T). The discard instructions are provided from the jitter queue frame controller 770 to the frame buffer 752. Based upon the discard instructions, zero or one or more than one of the stored frames (F1, F2 . . . FN) 760, 762 . . . 764 are discarded as discarded audio frames 758 and not provided as output audio frames 756. As described herein, the dynamic control of the jitter queue using the time window (T) and audio frame discards provides for reduced latency and improved user experience.

One embodiment for a low-latency adaptive jitter queue algorithm is shown below. The adaptive algorithm runs when there are no lost packets within the network transmission, as by definition if packets are being lost, the jitter queue will likely starve.

```
void jitter_end_of_window_process(jq_window t)
{
    if( jq[t].had_starve( ) && jq[t-1].had_discard( )){
        jq.EARLY_DISCARD_CNT.icrement( );
        if(jq.EARLY_DISCARD_CNT > DISCARD_THRESHOLD &&
            jq.window_duration < MAX_JITTER_WINDOW) {
            jq.window_duration = jq.window_duration.increase( );
    }
}
```

```
    }else if( jq[t].had_starve( ) == false){
        if( jq[t].had_no_packet_loss( ) == true && jq[t].min == 0){
            jq.WINDOW_IS_BALANCED.icrement( );
            if(jq.WINDOW_IS_BALANCED.count( )/jq.number_of_windows( ) >
            BALANCE_IS_GOOD_THRESHOLD){
                if(jq.window_duration < MIN_JITTER_WINDOW) {
                    jq.window_duration = jq.window_duration.decrease( );
                }
            }
        }
        if(jq[t].had_no_packet_loss( ) == true && jq[t].min != 0){
            if(jq[t].discard_policy == CLAMP_TO_ZERO){
                jq[t+1].schedule_discards = jq[t].current_length( );
            }
            else if (jq[t].discard_policy == CLAMP_TO_MIN){
                jq[t+1].schedule_discards = jq[t].min;
            }
        }
    }
}
void packet_discard(jq_window t, audioPacket p)
{
    if(jq.schedule_discards > 0){
        if( can_discard_packet(t,p)){
            jq[t].discard.increment( );
            jq.schedule_discards.decrement( );
        }
    }
}
bool can_discard(jq_window t, audioPacket p)
{
    if(p.audioEnergy <= QUIET && jq[t].playoutSequenceIsQuiet( ))
        return true;
    if(p.audioEnergy >= LOUD && jq[t].playoutSequenceIsLoud( ))
        return true;
    if(jq[t].packetsTobeRecievedInWindow( ) <= jq[t].schedule_discardsi)
        return true;
    return false;
}
```

Low-Latency Jitter Queue Discard Policy. The example algorithm above dynamically expands and shortens the jitter queue monitoring window (T) to find a window where the count of the number of times the jitter queue reaches a minimum of zero with the time window T (e.g., $JQ_{MIN}=0$, during time T) occurs at high rate, such as for example preferably at least 50% or greater of the play out input/output rate. The can_discard( ) function within the algorithm applies heuristics to decide if an audio packet is a good candidate for discarding. The can_discard( ) function is called when the algorithm determines that audio latency is building up on the queue and packets must be discarded. The example heuristics used are described below with respect to different discard heuristics: energy based discard, random distribution discard, linear discard, lump discard, and hybrid discard. Different and/or additional heuristics could also be utilized.

Energy Based Discard. The sender of the audio frame also includes additional data indicating the power level, such a VU (volume unit) level, of the energy of the audio encoded in the frame. The receiver then can use this energy level to decide before decoding the frame, if this is a relatively silent or loud frame. If the frame is in a sequence of quiet or loud frames, it is a candidate for discard and the system can either discard the frame without decoding (treating it as lost packet) or decode the frame and discard the data. The latter approach is preferred as the audio decoder is stateful and this leads to the best preservation of sound. However, it may be more efficient to the receiver computational capability to simply discard the packet and let the decoder recover its state by treating the discard packet as lost.

Random Distribution Discard. If K packets are expected to be received within the time window T and D packets are to be discarded within the time window, a random number generator of range K can be used, and packets can be discarded when the random number generator produces a number "i" such that i/K is less than or equal to D/K. As such, for the K packets received within the time window T, D of these K packets will be randomly discarded based upon the output of the random number generator.

Linear Discard. If K packets are expected to be received within the time window T and D packets are to be discarded within the time window, a linear discard can be used such that packets are discarded using a ratio of D/K packets. As such, for the K packets received within the time window T, a packet is discarded every D/K packets rounded down to the nearest integer.

Lump Discard. If K packets are expected to be received within the time window T and D packets are to be discarded within the time window, a lump discard can be used such that D consecutive packets are discarded at once. As such, for the K packets received within the time window T, a consecutive group of D packets within the time window T are discarded together.

Hybrid Discard. If K packets are expected to be received within the time window T and D packets are to be discarded within the time window, one or more of the above discard techniques, as well as other discard techniques, could be used in combination. For example, the energy based discard can be used in conjunction with one of the other discard methods. If the energy based discard and the lump discard methods were utilized, for example, the energy based discard could first be applied and if it has not found candidate packets at the appropriate relative levels to discard and the time window is coming to a close, then the lump discard could be used to discard D packets in a lump discard.

Mismatch Sender/Receiver Packet Rates. Let C be the audio capture rate at a MN input and P be audio output play out rate. If two nodes $MN_i$ and $MN_j$ are in a session and $C_i \neq Pj$ or $C_j \neq P_i$, then the jitter queue at the receiver portions of these MNs will buildup latency or starve, respectively. If it is assumed that $C_i > Pj$ and because the input/output (IO) rate for a particular MN can be assumed to generally be matched, then it can also be assumed that $P_i > Cj$. These assumptions mean that $MN_i$ will be sending more frames to $MN_j$ than it can play out thereby causing latency buildup in the receiver portion of $MN_j$. These assumptions also mean that $MN_j$ will not send enough frames to $MN_i$ causing the receive portion of $MN_i$ to starve.

This situation is likely to occur because the IO subsystem of the MNs involved in session may not all be matched. To gracefully handle this IO mismatch, the MNs share their IO rate information with other MNs within the session, thereby enabling them to understand whether, and how many, frame discard/insert operations they may need to execute per second in the audio path from each sending MN to each receiving MN. By knowing that frame insert is needed with respect to an audio path, the sending and/or receiving MN can intelligently choose the point to insert one or more audio frames, such as during quiet or loud audio sequences as described above. Similarly, by knowing that frame discard is needed with respect to an audio path, the sending MN or receiving MN can intelligently choose the point to discard one or more audio frames, such as during quiet or loud audio sequences as described above. It is further noted that the MN in an audio path that has the faster IO rate is preferably the MN to execute the discard/insert operations, as this MN would likely have greater processing capacity. However, either MN or both MNs within the audio path can execute discard/insert operations, if desired.

Sender Queues and Rate Adjustments for Receivers. It is desirable not to have the receiving MN starve of input audio packets or discard audio packets. For example, if the encoded audio stream process is stateful, these starve conditions and/or discard conditions can cause the MN to loose state and produce undesirable audio artifacts. To help ensure these starve and/or discard conditions do not occur at the receiving MNs, each receiving MN can be configured to inform each of the sending peer MNs what its IO rate is for processing received audio packets. For each receiving MN to which it is sending audio packets, the sending MN can then implements different send queues having different send rates, each queue being tuned to the receiving MN expected IO rate for processing input audio packets. Input audio captured at the sending MN is then queued within respective send queues, and these send queues are set to have IO rates associated with the receiving MNs. The send queues can be implemented, for example, using decimator/interpolator blocks within the audio output paths for the sending MN to produce audio content that matches receiver IO rates. For example, decimators can decimate the audio content to reduce the output audio rate, and interpolators can extend the audio content to increase the output audio rate. The decimated/interpolated audio is encoded, packetized, and sent by the sending MN to the respective receiving MNs.

FIG. 7C is block diagram of an example embodiment 770 for sending MNs having sending queues including decimator/interpolator blocks and encoder/packetizer blocks to adjust send rates for receiving MNs. As depicted, MNA 112 is sending input audio captured at MNA 112 to MNB 114, MNC 116, and MND 118 through network 110. MNA includes a decimator/interpolator for each MN to which it is sending audio packets. Each decimator/interpolator decimates the audio content or extends the audio content based upon IO rate information received from each of the other MNs. For example, MNB 114 communicates with MNA to provide information about the IO rate associated with its processing of received audio packets through its decoder/jitter buffer. Similarly, MNC 116 and MND 118 communicate with MNA to provide information about the respective IO rates associated with their processing of received audio packets through their decoders/jitter buffers. Using this IO rate information, MNA adjusts the decimator/interpolator for the receiving MN to account for the expected IO rate for that receiving MN. The output from the each decimator/interpolator is then provided to an encoder/packetizer that encodes the audio data and packetizes it for transmission as audio packets through the network 110. The send rates to each of the peer MNs are therefore tuned for each of the receiving MNs, as represented by the dashed line 114 to MNB 114, the dashed and dotted line to MNC 116, and the solid line to MND 118. Each of the other MNs 114, 116, and 118 can operate in a similar way as MNA 112 to provide tuned send rates to each of the other peer MNs within the music session. Further, the MNs can periodically send updated IO rate information to the other MNs during the music session so that the respective send rates from the other MNs to that MN can be updated during the music session. As such, the user experience is improved, as discard and/or starve conditions at the jitter buffers can be reduced and potentially eliminated through the use of sender queues and rate adjustments.

Recording

Writing the digital content of an audio stream to a file is referred to herein as recording. In a music session, any user may initiate a recording from a participating MN control interface, such as for example through the control window 310 depicted in FIG. 3D.

The record start command is sent to all the MNs in the session, and each MN records the following: (1) audio input at each $MN(R_{ai})$, (2) incoming audio stream from each peer $MN(R_{as})$, and (3) master output. The audio input(s) at each $MN(R_{ai})$ is typically the highest fidelity audio source as it has no encode/decode compression or transmission related artifacts such as packet loss, errors, and/or other degradations. The incoming audio stream from each peer $MN(R_{as})$ is a recording of what each user is hearing at their respective MN. The incoming audio stream from other MNs is received as the decoded version of the encoded stream sent by the original peer MN and includes all the artifacts from packet loss, errors, jitter queue discards/inserts, and/or other degradations. The master output is the mix ($R_m$) of audio input at a MN and the remote input streams, this mix is played out at the MN such that $R_m = \Sigma R_{as} + \Sigma R_{ai}$.

Fast Record Playback. Each MN produces a set of recordings ($R_m$, $R_{as}$, $R_{ai}$) including the local recordings, the peer MN input recordings, and the master recording from a record command. At the record stop command, this set of files is available for immediate playback. These files represent the fast playback assets from recordings at an MN.

High Fidelity Playback. Each MN in the session also uploads the high fidelity local input recording ($R_{ai}$) to the server. The server stores and distributes these high fidelity recordings to each of the MNs in the session. As the high fidelity recording ($R_{ai}$) corresponding each peer input recording ($R_{as}$) is downloaded to a MN, the MN replaces the content of the lower fidelity file with the high fidelity source recording file (e.g., each $R_{ai}$ replaces its respective $R_{as}$ at each MN once received). At such time, the user at the MN may playback the session high fidelity audio either locally or from the server that mixes the audio of the high quality recordings. These high fidelity files represent the slow playback assets from the recordings at the MNs in the session owing to the delay in getting audio pushed to the server and then downloaded to the MNs within the session. It is also noted that the MNs can also keep the low fidelity recordings ($M_{as}$), if desired, even though the corresponding high fidelity recordings ($M_{ai}$) have been downloaded to the MN. Further, it is noted that each MN can send its local high fidelity recording ($M_{ai}$) directly to the other MNs in the session rather than going through the server.

Figure 8A:
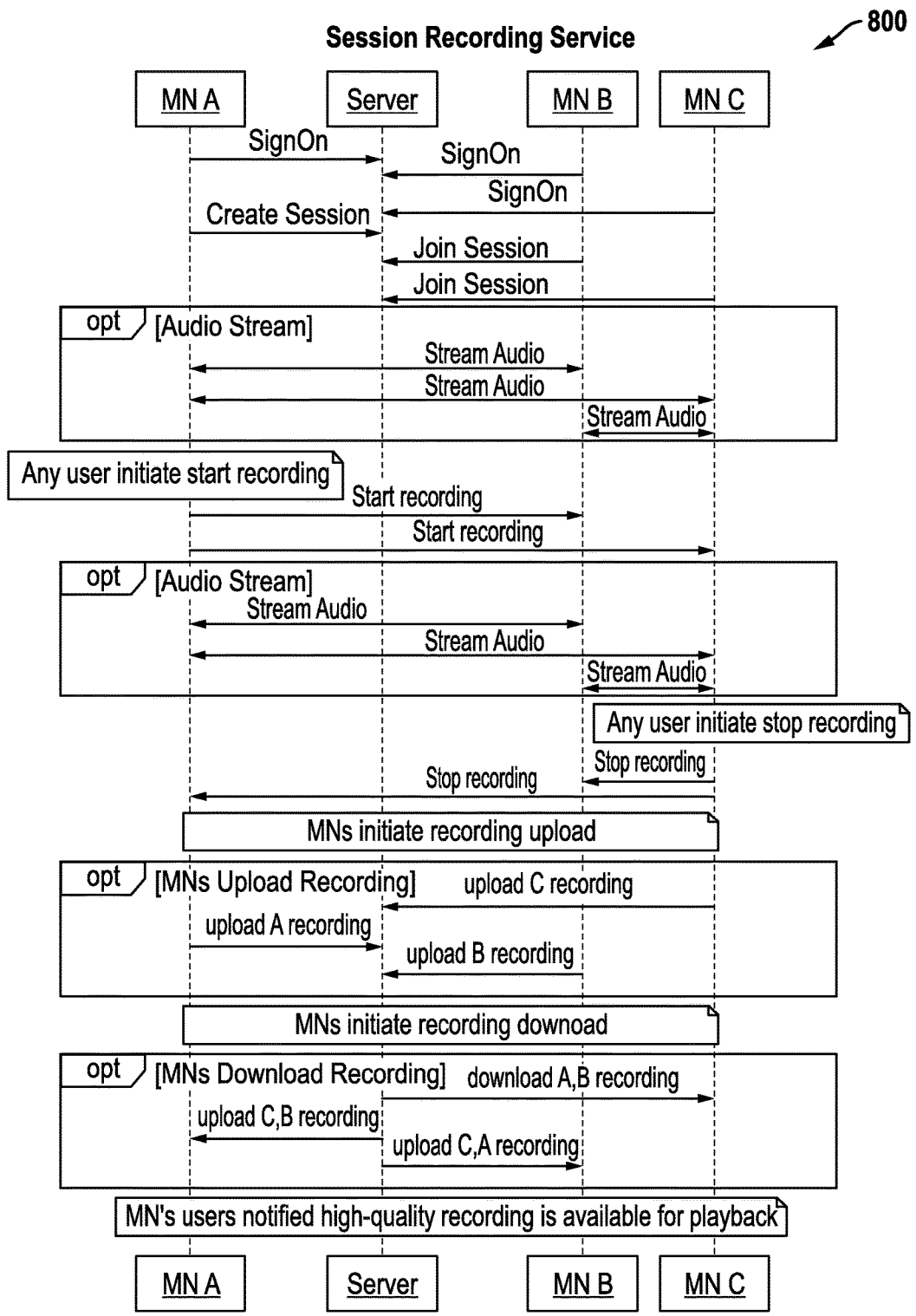
FIG. 8A is a swim lane diagram of an example embodiment for session recording service including one or more server system(s).

FIG. 8A is a swim lane diagram of an example embodiment 800 for session audio communications for three MNs (MNA, MNB, MNC) and recording service including one or more server system(s). Once MNA, MNB, and MNC have signed on to a music session, they stream audio for their music tracks to each other as part of the music session. Any one of the MN users can then initiate a start for a recording. As depicted, MNA initiates a start for a recording. Each MN then records its local tracks and the other MN tracks as described herein. Any user can then initiate a stop of the recording. The high fidelity recordings made at each MN are then uploaded to the server. The MNs can then download the high fidelity recordings for the other MNs in the session from server. Once these are downloaded to each MN, the MN notifies the user that high-quality or high-fidelity playback is available for the session recording. It is also noted that the high-fidelity recordings could be directly communicated between the MNs in the session, if desired.

Figure 8B:
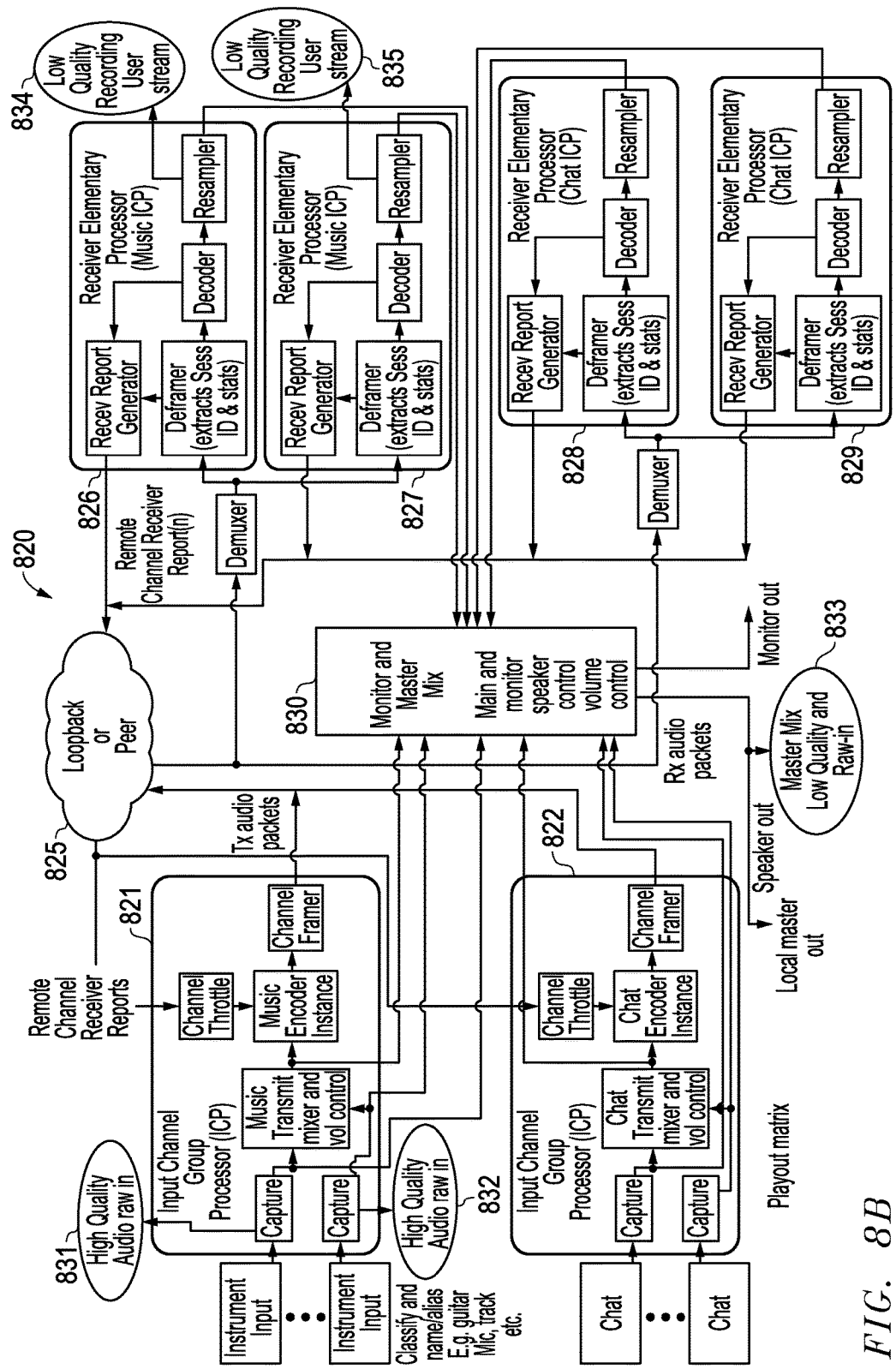
FIG. 8B is a block diagram of an example embodiment for a recording system.

FIG. 8B is a block diagram of an example embodiment 820 for a recording system. The embodiment 820 includes one or more input channel processors (ICP) that process local audio inputs or loopback/peer audio inputs from network connections 825. The group ICP 821 captures audio inputs from one or more instrument inputs (e.g., guitar, keyboard, voice, etc.) and outputs transmit audio packets associated with this audio input. Group ICP 821 also provides high quality audio outputs 831 and 832 associated with the captured audio inputs for the music session. The group chat ICP 822 captures one or more chat audio inputs and outputs transmit audio packets associated with this audio input. The peer ICPs 826 and 827 receive de-multiplexed music session audio input packets from peer MNs and process those packets to produce low quality recording user audio streams 834 and 835. The ICPs 828 and 829 receive de-multiplexed chat audio information and can output chat audio. The audio controller 830 provides speaker output 833 and provides a monitor and master mixer controls, as well as main and monitor speaker control and volume control. It is noted that each of the outputs 831, 832, 833, 834 and 835 are example audio output streams that can be selected for recording individually and/or in combination with each other.

Figure 8C:
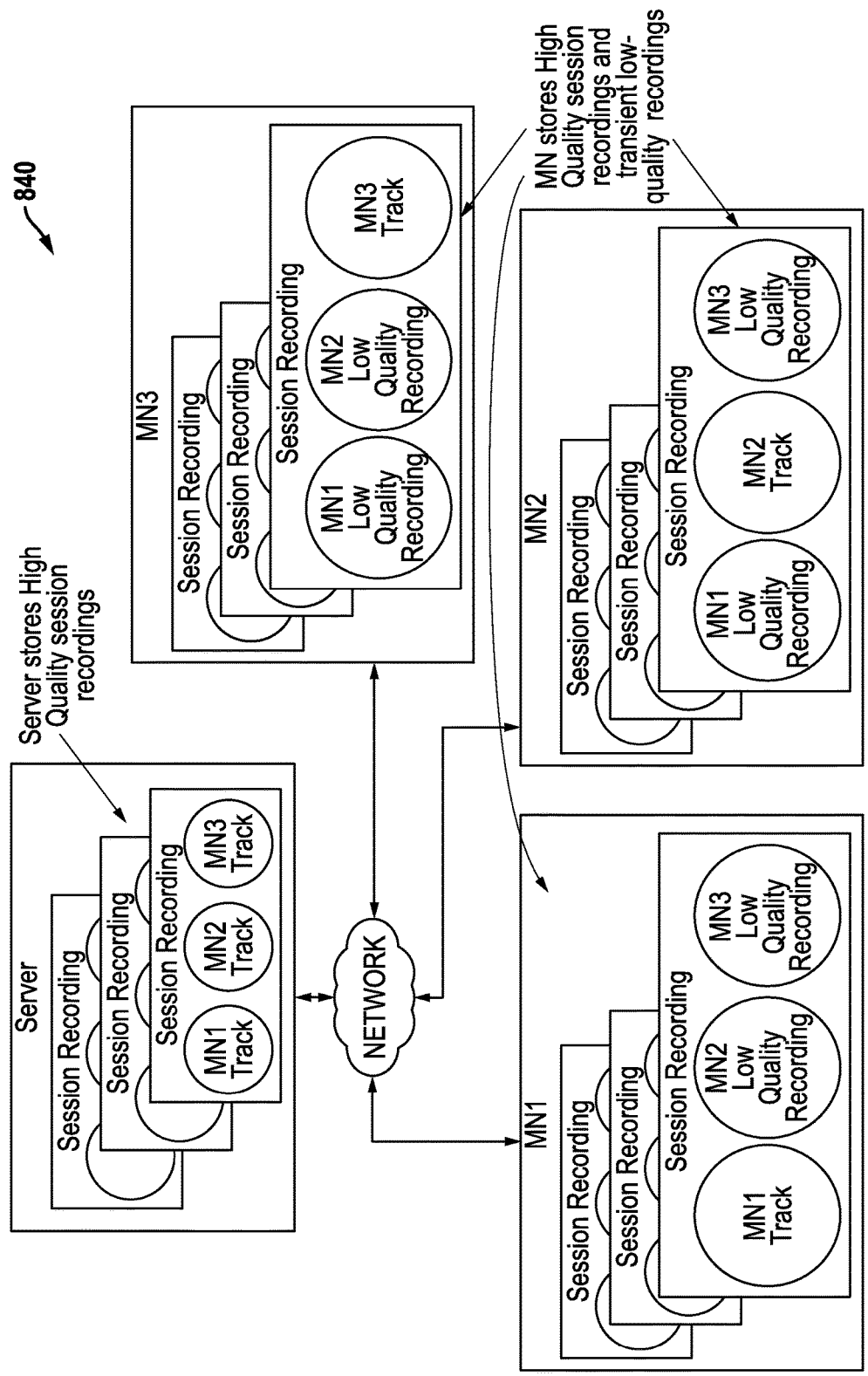
FIG. 8C is a block diagram of an example embodiment for a recording system and related recording service where session recordings are stored by a server and by MNs.

FIG. 8C is a block diagram of an example embodiment 840 for a recording system and related recording service where sessions are stored by a server and by MNs. Each MN initially stores high quality recordings for its local tracks and low quality recordings for the tracks from the other MNs in the music session. The high quality recordings are then uploaded by the MNs to the server and stored by the server. These high quality recordings can then be downloaded to the MNs to replace the initial low quality recordings made for the tracks from the other MNs. Once these high quality recordings are downloaded to an MN, the MN will have high quality recordings for each track in the music session. The high quality and/or low quality recordings can be played back by an MN individually or in combination by a user of the MN. Until the high quality recordings are downloaded, playback uses the high quality recordings from the local MN tracks and the low quality recordings from the peer MN tracks. Once the high quality recording are downloaded, the entire session recording can be played back at the MN using the high quality recordings.

Auto Mixing of Recording Via Latency Compensation. When the command to start a recording is initiated, there is a delay of at least the network delay between the sender and receiver before the recording command is actually started. Assume the initiating $MN_A$ is sending the record start command to $MN_B$ and $MN_C$, there are record start time delays (e.g., network delay plus processing delay) between $MN_A$ and $MN_B$ represented as $t_{AB}$ and between $MN_A$ and $MN_C$ represented as $t_{AC}$. Whereas the set of recordings ($R_m$, $R_{as}$, $R_{ai}$) started at $MN_A$ are synchronized with each other, the start time of the high fidelity recording at $MN_B$ and $MN_C$, namely $RA_{ai}$ and $RB_{ai}$ will have different start times of at least the delays $t_{AB}$ and $t_{AC}$, respectively. Without accounting for this delay, a final cut recording (e.g., $R_{FINAL}=\Sigma RA_{ai}+\Sigma RB_{ai}+\Sigma RC_{ai}$) will produce music that is time skewed.

It is noted that mixing of audio is represented herein using the summation symbol: "$\Sigma$". As one example, this audio mixing can be an average of the sum of the audio signals that have been normalized to given range, for example, ±1.0 floating point values, or 16-bit integer, or 32-bit integer, or some other selected range. Audio mixing could also be implemented using additional and/or different techniques, as desired.

Recording the network delay between $MN_A$ (e.g., the record start initiator) and its peers $MN_B$ and $MN_C$ is a good first order approximation of the amount of time skew that is needed to bring the recording in synchronization. However, the processing delay is not accounted for in this model.

Reference Clock Synchronization. An accurate reference clock common to all MNs in the session and timestamps made at each MN at recording stars can be utilized to help provide this synchronization. Each MN uses the common reference clock to timestamp each recording start with that clock time. With this reference clock timestamp, the following example algorithm can then be used to produce final mix:
1. Sort the high fidelity recordings ($RA_{ai}$, $RB_{ai}$, $RC_{ai}$) by timestamp
2. The oldest timestamp represent the recording that started latest ($t_{OLD}$)
3. For each recording $R_{ai}$, the delay ($t_{Di}$) relative to the latest start time is represented as $t_{Di}=t_{OLD}-t_{STARTi}$ where $t_{STARTi}$ is the record start time for $R_{ai}$.
4. The delay ($t_{Di}$) is the time offset in recording $R_{ai}$ that must be skipped to bring the recording in alignment with that of the recording having the latest start.
5. $R_{FINAL}$ is then produced by discarding the delay ($t_{Di}$) worth of data associated with each recording with the set of recordings ($RA_{ai}$, $RB_{ai}$, $RC_{ai}$) that does not have the latest start time, and then reading and mixing audio from the files from a time that will now match the latest start time $t_{OLD}$. When the first end-of-file is reached, the mixing process stops.

This common clock synchronization process enables auto generation of the final cut ($R_{FINAL}$). The MNs can also be allowed to manually calibrate the time offset, if desired.

As indicated above, the clock synchronization algorithm depends on the presence of a reference clock common to the MNs in the session. One method for implementing this is to use a distributed clock algorithm augmented with an algorithm to select a master node in the session. As such, each MN then runs a local reference clock that is calibrated to the elected master clock. The elected master clock then effectively serves as a time server. The music server can also provide a master clock and be used as the master node by the MNs for clock synchronization.

One technique that can be used to provide a common distributed reference clock for the MNs is through the use of the well known Cristian's Algorithm described in the article: Cristian, F., *Probalistic Clock Synchronization*, Distributed Computing, (3):146-158 (1989). As one example, this technique works between a process (P) and a time server (S), such as a time server available through the internet. The process requests the time from the time server. After receiving the request from process, the server prepares a response and appends the time (T) from its own clock. The process then sets its time to be the server time (T) plus half if the round-trip-time (RTT) for the communication. This technique assumes that RTT is split equally between the request time and the response time. Multiple requests can also be made by the process to the server to gain more accuracy, for example, by using the response with the shortest RTT. The process can determine RTT, for example, by the difference in its local time between when it sends its request to the time server and when it receives the response from the server. Other variations and techniques could also be utilized.

Distributed Metronome

A metronome helps musicians keep playing in time, or in sync. In a distributed music session, the delay incurred if a single metronome were used makes such an option range from undesirable to impractical. Even if multiple metronomes are used, the skew in start times will cause them to be naturally out of sync as illustrated in FIG. 9A.

Figure 9A:
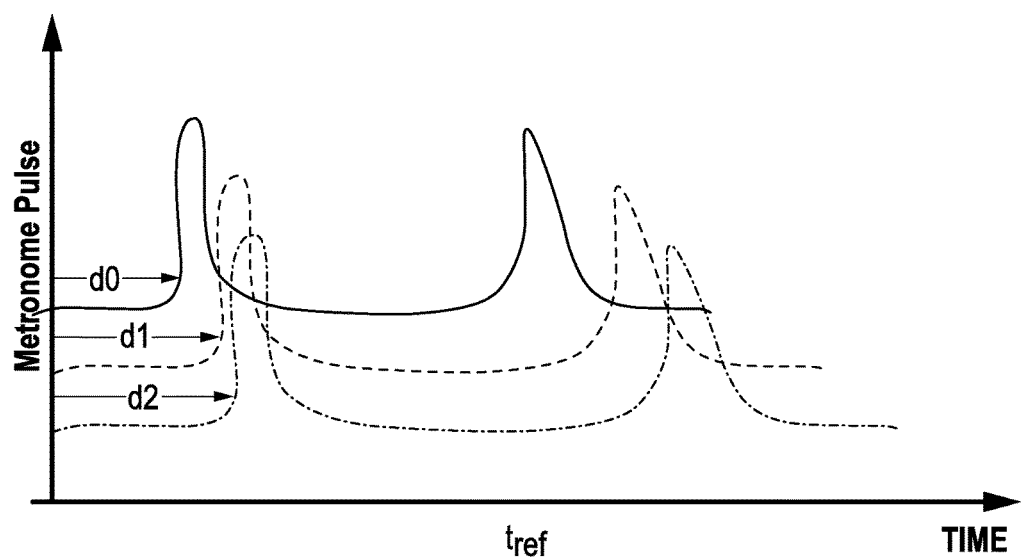
FIG. 9A is a signal diagram showing metronome pulses associated with three different local metronomes that are based upon a single metronome pulse.

FIG. 9A is a signal diagram showing metronome pulses associated with three different local metronomes that are based upon a single metronome pulse. Without the distributed metronome techniques described herein, each local metronome pulse will be offset based upon a different delay (d0, d1, d2) associated with that local music node.

A distributed metronome is therefore implemented to provide a local metronome at each respective location for the MNs in a session that is synchronized to a common reference clock in the session and that plays in synchronization with this common reference clock irrespective of the delay between the MNs. As such, the MN user hears only the output of the metronome from his/her own MN and not from any other metronome at the other MNs. Using the distributed metronome described herein, the start times are aligned as shown in FIG. 9B.

Figure 9B:
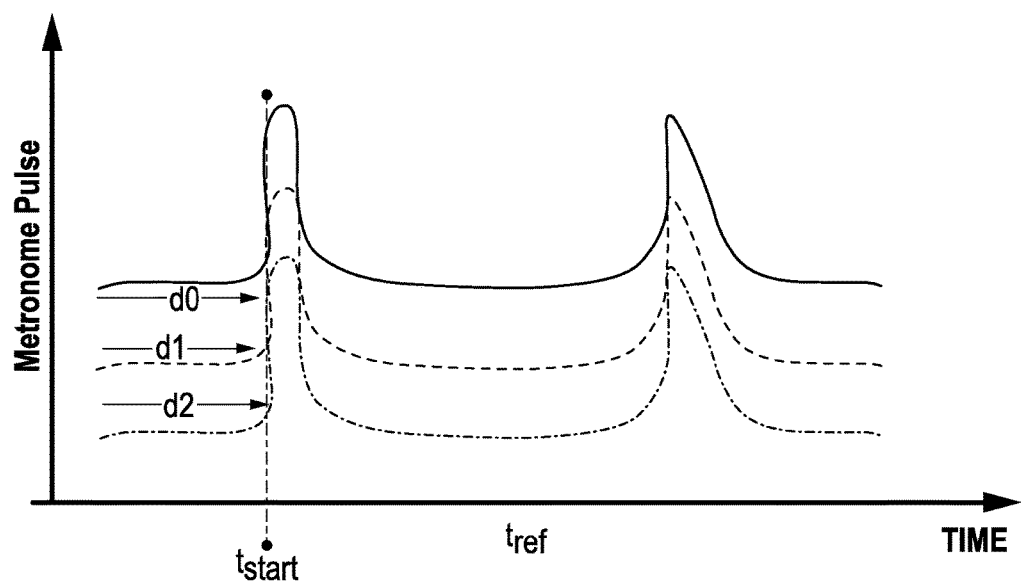
FIG. 9B is a signal diagram showing metronome pulses associated with three different local metronomes that have been synchronized.

FIG. 9B is a signal diagram showing metronome pulses associated with three different local metronomes that have been synchronized. With the distributed metronome techniques described herein, the delay offsets (d0, d1, d2) associated with the local music nodes are aligned in time based upon a start time ($T_{start}$).

For the purposes of recording timestamp as described above, the MNs in a session already have a reference clock system that can be used for the distributed metronome. While creating a metronome using a processing device running software instructions has been done previously, the problem associated with the interactive music systems described herein is how to ensure that when one MN user within a session starts or changes the setting of their metronome, all other metronomes for the MNs in the sessions will also start or be changed in synchronization. Once a local metronome is started at an MN, it is assumed that the clocks at the MN are accurate enough such that the MN plays the correct BPM (beats per minute) requested by the user. Further, each MN can be set at different BPM, if desired. The following describes an example process that can be used for the distributed metronome:

1. Each MN knows the network latency between it and every MN in the session, as described above, and the maximum latency ($t_{MAX}$) for its peer-to-peer connections can be determined from these latencies.
2. Let the reference clock time for the MN at which the metronome start is initiated be represented by $t_{REF}$. The initiating MN broadcasts a "metronome start" command to all peer MNs within the session indicating that the start time for the metronome is to be $t_{START}=t_{REF}+2t_{MAX}$. Twice the maximum latency ($2t_{MAX}$) is used as a conservative approach, although a lower start time bound of $t_{START}=t_{REF}+t_{MAX}$ could also be used, as well as other later start times.
3. A MN receiving the metronome start command waits until its reference clock time (t) is about the designated start time (e.g., $t \cong t_{START}$). The accuracy of local clocks are typically on the order of ±1 ms. If the designated start time ($t_{START}$) is earlier than the current reference clock time (t) for the MN receiving the start commend (e.g., $t_{START}<t$), then the command is late and the receiving MN re-broadcasts a new start time with an increase to the 2× multiplier for its maximum latency ($t_{MAX}$) to compensate for unexpected lateness of the command.
4. Every minute each MN rolls over and starts a new count off of metronome ticks. As such, the start time is important for the MNs to remain in sync.
5. If a user changes the BPM at his/her MN, a restart of the distributed metronome is broadcasted through a new "metronome start" command. This restart helps to ensure synchronization between the MNs in the session after BPM changes.

It is noted that audio from the metronome is preferably played only to the local MN output. Further control is also provided at each MN to allow a user to determine whether the local metronome output is heard in one or both ears, for example, if headphones are being used. Further, metronome audio is also not recorded by default, although the MN can be set to record the metronome audio as well, if desired.

Interactive Virtual Positioning within Music Session

Musicians performing at given location (e.g., stage) receive sound in a fully immersive sense. Their sense of presence comes from the direction of the sound, based on their relative position to each other and the acoustic properties of the location. The interactive virtual positioning embodiments described herein enable a reproduction of this immersive and presence experience by utilizing a number of existing technologies that are augmented as part of the interactive music system.

Figure 10A:
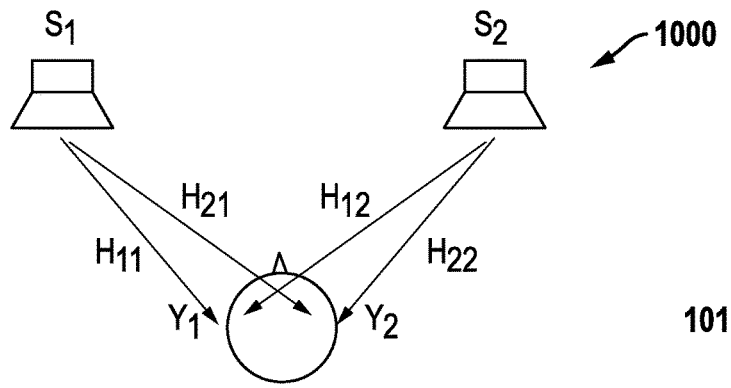
FIG. 10A is a diagram of sound location perception by a person hearing sounds from two sources.

FIG. 10A is a diagram 1000 of sound location perception by a person hearing sounds from two sources (S1, S2). A first source (S1) is received at different times at two points (Y1, Y2) on a person's head based upon different travel distances (H11, H21) for the sound. Similarly, a second source (S2) is received at different times at the two points (Y1, Y2) on the person's head based upon different travel distances (H12, H22). Sound location perception of a person is based upon differences between sound paths striking the head and being sensed by the person.

Using this sound location perception, a three dimension definition of a virtual environment is generated for the session. Each MN, sound source, or other element within the session can be placed at specific positions within this virtual space. Based on the instrument type selected by a user, the user is provided with a set of pre-defined configurations, such sitting violinist, or standing violinist. If the MN has multiple inputs, the system allows the user to indicate how those inputs are positioned within the virtual space. For example, a keyboardist could use one input for positioning the keyboard instrument within the virtual space and one input for positioning the keyboardist's voice within the virtual space.

Figure 10B:
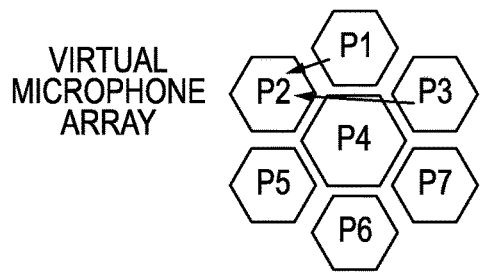
FIG. 10B is a diagram of an example locations or positions for music session elements within a virtual space.

FIG. 10B is a diagram 1010 of an example locations or positions (P) for music session elements within a virtual space. Each of the hexagons represent the position (P1, P2, P3, P4, P5, P6, P7) of an element, such as an MN, within the session. Each position will have a unique sound experience. For example, the perception at position P2 of sound generated from position P1 and position P3, as indicated by the arrows, will be different from the perception other positions, such as position P6, for this same sound. A virtual microphone array associated with each position, such as position P2, can be used to determine sound received at that position.

For each location or position, a head-related-transfer function (HRTF) is assigned by the user virtual position. Because the geometry of the virtual room is known and relative position of the sound sources have well defined three-dimensional (3D) coordinates, the HRTF can be used to compute the perception of sound presence that a user in that position would hear. Each position P represents a MN input and any other physical attribute of the source that is helpful to characterize the directionality of the sound that input produces (e.g., its sound field).

Figure 10C:
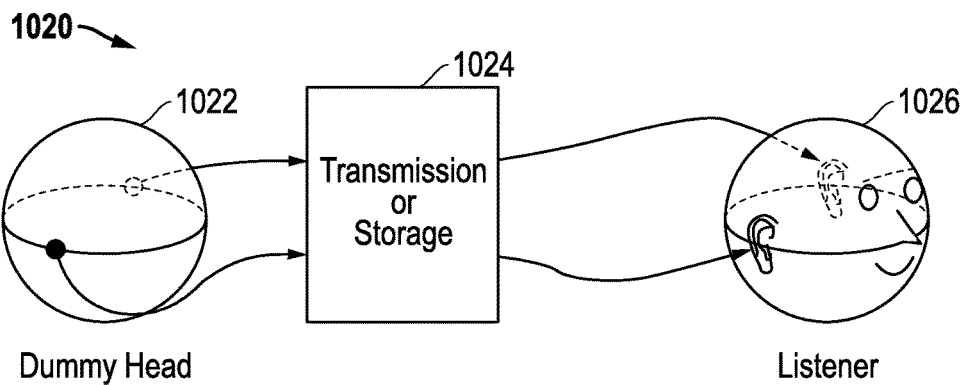
FIG. 10C is a diagram of an example dummy head that is depicted to a user and can be adjusted by the user to place and orient the user within the virtual environment for the music session.

FIG. 10C is a diagram 1020 of an example dummy head 1022 that is depicted to a user and can be adjusted by the user to place and orient the user within the virtual environment for the music session. Based upon the position of the dummy head 1022, the dummy head 1022 will receive audio signals from other elements within the music session. These audio signals are then packetized for transmission or storage, as indicated by block 1024 and as described herein. The resulting audio can then be output to a listener as represented by head 1026.

The user at a MN is allowed to select their desired virtual position through manipulation of a dummy head representation in the virtual space or setting for the music session. This positional data is also sent to and shared with other MNs within the session. The user may also choose to upload their HRTF specific data or to select from a set of generic pre-configured profiles to upload.

MTB (Motion Tracked Binaural) System. By emulating a virtual microphone array and using a head-tracker, a motion tracked binaural (MTB) system can be provided to each virtual musician/listener in a session. A MTB system can be used to produce the most natural and immersive sense of presence for the musician/listener.

Figure 10D:
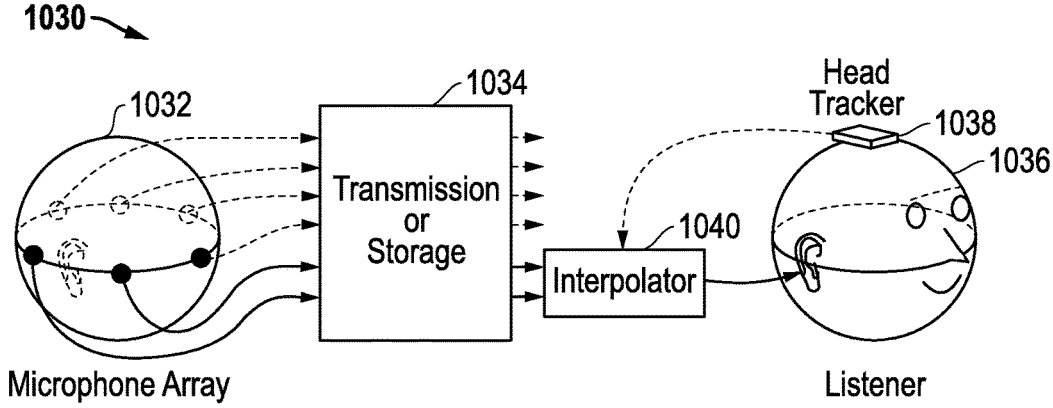
FIG. 10D is a diagram of an example dummy head that includes a virtual microphone array of two or more microphones.

FIG. 10D is a diagram 1030 of an example dummy head 1032 that includes a virtual microphone array of two or more microphones. This dummy head 1032 can also be depicted to a user and can be adjusted by the user to place and orient the user within the virtual environment for the music session. Based upon the position of the dummy head 1032, the microphone array related to the dummy head 1032 will receive audio signals from other elements within the music session. These audio signals are then packetized for transmission or storage, as indicated by block 1034 and as described herein. The resulting audio is output to an interpolator 1040, which then outputs to a listener as represented by head 1036. However, the listener can also have a head tracker 1038 worn, mounted or otherwise attached to the listener's head 1036 that tracks movements of the head 1036. The tracked movements are provided back to the interpolator 1040. The interpolator 1040 uses these tracked movements to adjust the output sound so that the listener's perception is that the listener is moving his/her head position within the virtual environment for the music session. As such, a virtual reality experience is provided for the listener within the virtual sound field for the performance within the music session.

The MTB system depicted in FIG. 10D, therefore, correlates the users head position with the head-position in the virtual space. Whereas a physical microphone array is used in typical physical setting, an actual microphone array is not needed for the embodiments described herein as the each user directly controls the movement of his/her virtual head in the virtual space defined for the music session.

The MTB system can provide a variety of features. For example, a virtual space definition can provided that models the acoustic properties of a virtual environment within which the music session is to virtually take place. A two-dimensional (2D) and/or three-dimensional (3D) graphical virtual position selection and placement mechanism of musician avatars can also be provided through each MN in the session. The user can also be allowed to adjust attributes of an avatar representing the user, including adjustments to height, number of microphones (e.g., sound sources), relative position of each microphone, and/or other desired attributes. A set of preconfigured musician attributes is also provided (e.g., drummer, pianist, guitarist, and/or other musician) and can be selected by the user. Further, once a performer/listener is positioned and assigned within the virtual space, the performer/listener may elect to listen to the session from another virtual position (e.g., out-of-body experience) within the virtual space. This virtual positioning is useful to understand the sound a virtual user at that location in the virtual environment will receive. The system also remembers and uses the HRTF data set or selected by a user, and this HTRF data is used in whatever virtual location the user selects.

The performer/listener position also provides a positional information for the source for the audio in the virtual space. An acoustic processor for each MN can then use this data along with the VU (volume unit) level information to compute a direction and volume received at another position within the virtual space. The acoustic processor can also compute reflections and any emulated ambient noise (e.g. crowd noise) as well as other sound effects, as desired, and mix these effects into the audio heard by the user at the MN.

As part of the user interface, a user is allowed to select the HRTF that best approximates their physical and auditory characteristics and/or any other desired HRTF. This user selection can be provided through a graphical menu selection or by asking the user for some basic measurement information of his/her physical features (e.g., head size, ear positioning, etc.). Alternatively, the user can be given instructions on how to determine physical measurements (e.g., taking and processing pictures of themselves) so that their physical dimensions can be obtained. Also, if a user has his/her HRTF measurements taken professionally or these HRTF measurements are otherwise determined, these HRTF data can be uploaded to MN or to the session server described herein. The server can be store this data and send it to the acoustic processor for the user when the user is listening in 3D mode.

Concert Broadcast Modes

The live music produced in a music session may be broadcasted. The following modes of broadcast can be utilized within the interactive music system embodiments: low latency live broadcast, high fidelity live broadcast, 3D virtual reality broadcast, 3D concert podcast, and/or other broadcast modes.

Low Latency Live Broadcast. In this broadcast mode, the server system operates as a broadcast server and assigns one of the MNs in the session to serve as a broadcast stream provider. The assigned MN encodes the output audio for the broadcast and sends it to the broadcast server. The output audio encoded at the MN selected as the stream provider is a mix of the incoming peer streams from the other MNs in the session and its local audio input. As the peer audio streams are transmitted and processed with low-latency as described above, the audio recovered from those streams may have the effects of packet loss, jitter queue starve/overflow artifacts, and/or other artifacts. As such, the low latency broadcast stream will also carry these artifacts, but will also be a relatively "instantaneous" representation of the live event being performed within the music session.

Figure 11A:
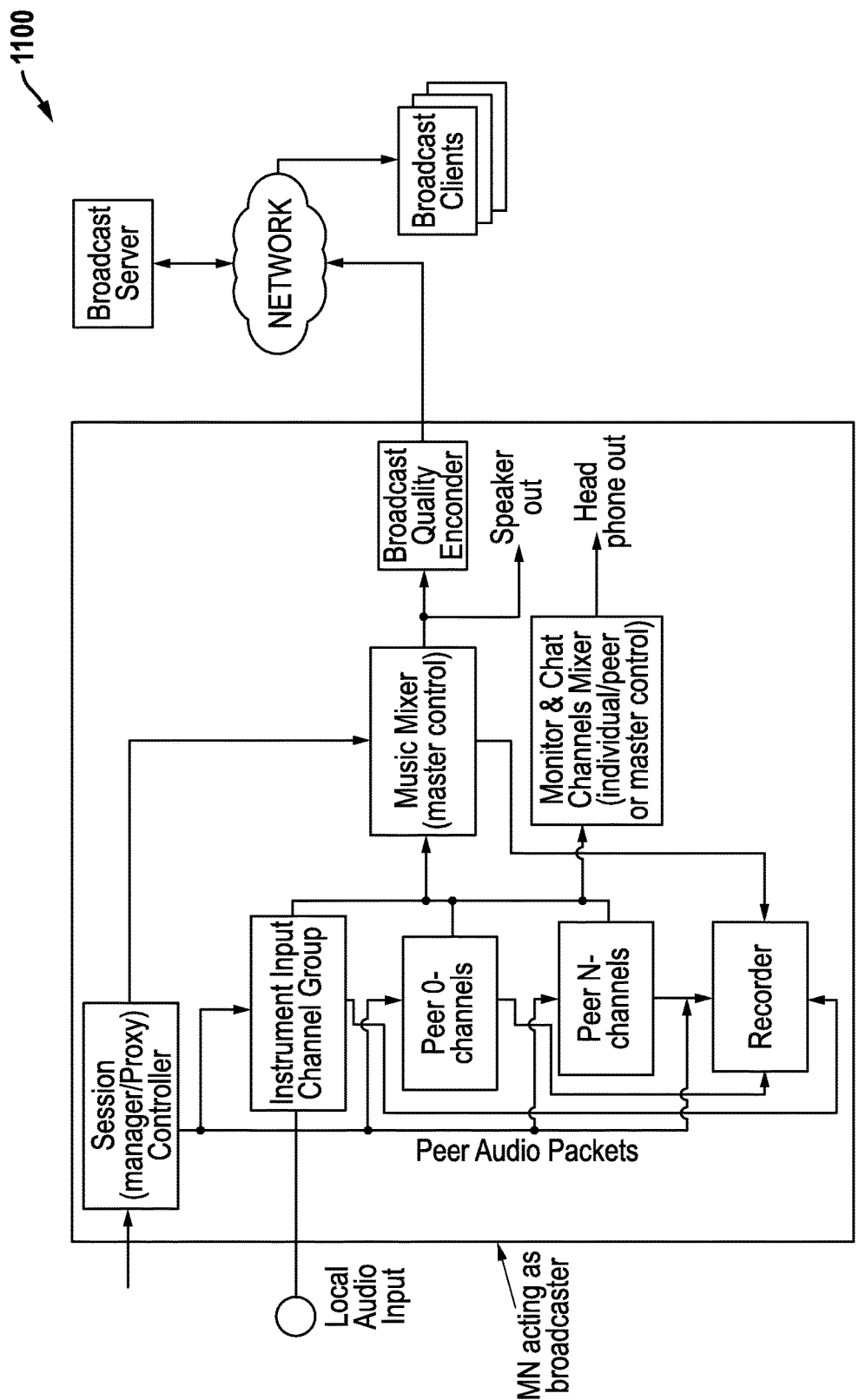
FIG. 11A is a block diagram of an example embodiment for a low latency live broadcast.

FIG. 11A is a block diagram of an example embodiment 1100 for a low latency live broadcast (e.g., low-latency concert broadcast mode). At an MN, the local audio inputs captured by an instrument ICP and the peer audio packets received through the network are mixed together using a music mixer. The mixer output is provided as a speaker output for the MN and is also provided to an encoder for output to the network as a live broadcast. The server operates as a broadcast server and makes the live broadcast available for streaming through the network to one or more broadcast clients.

High Fidelity Live Broadcast. In this broadcast mode, the input audio at each MN is encoded, packetized and transmitted via a reliable network protocol, such as TCP (transmission control protocol) to the broadcast server. Each audio packet is also configured to carry a timestamp of the session reference/master clock. In the server, the audio frames are recovered, and the timestamps are used to synchronize the audio frames. The synchronized audio are then processed through a server audio mixer, and the resulting audio is encoded and broadcasted. The server audio mixer could be a full function digital audio workstation (DAW), which can process the streams in a variety of ways, such as by adding audio effects, adding other audio tracks, and/or otherwise processing the streams. This cloud-based DAW can also be provided as a paid service that users may lease. The high fidelity streams can also be sent to a separate user-specified server that controls the mixing process and produces the audio stream to be broadcasted.

Figure 11B:
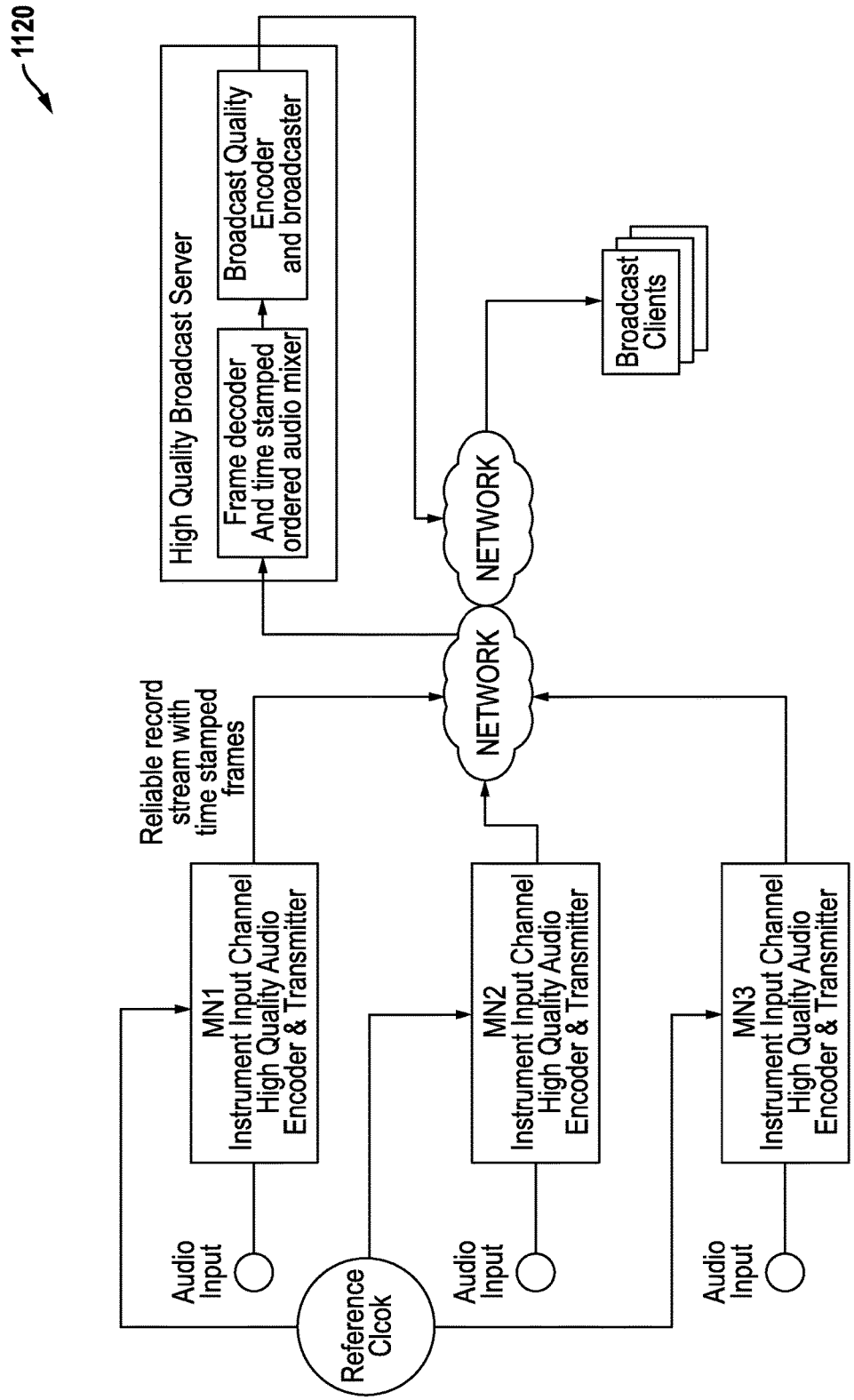
FIG. 11B is a block diagram of an example embodiment for a high fidelity live broadcast.

FIG. 11B is a block diagram of an example embodiment 1120 for a high fidelity live broadcast mode (e.g., high-quality concert broadcast mode). The high quality audio inputs captured at each MN are uploaded through the network to the server. The server decodes the audio frames from each MN with a frame decoder and mixes the audio frames together. Timestamps are added to the audio frames at each MN using a reference clock, and the server uses these timestamps to align the audio frames from each MN for purposes of mixing the audio frame together. An encoder receives the mixed output and generates an audio stream output that is high quality. The server then operates as a broadcast server to make this high quality live broadcast available for streaming through the network to one or more broadcast clients.

3D Virtual Reality Broadcast. As described earlier, the system provides an interface where a virtual space is defined and the musicians are assigned or select positions within the virtual space. This virtual positioning can also be provided to users to allow the "purchase" of specific seats or locations in the virtual space for the performance. For example, a user can be allowed to select a position from which he/she would like to listen to the event. As describe above, a binaural processor is embedded in the listen application and the user provides or selects their HRTF data. Additionally, the user may use a MTB system that provides head tracking and therefore provides the ability to have an even more realistic experience. The high fidelity tracks may be relayed directly to the listener device for acoustic processing, or the acoustic processor instance may be a service on a server. The acoustic processor uses the HRTF and motion tracking data to produce a final stereo mix that this specific to that user.

It is noted that the performers default position is what the session creator defines when the session is created. However, a listener is allowed the ability to "move" them in the virtual space. This movement provides a more personal experience to the user. A listener can also be assigned a fixed seat in the audience or can be free to "move" around. For example, a user who hears better from one ear than another may elect to be on a particular side of the virtual space for the performance. The concert environment may also be fixed by session creator, or the user may be allowed to change the concert locale or environment (e.g., change from Carnegie Hall to Madison Square Gardens).

3D Concert Replay or Podcast. The high fidelity tracks generated through the processes described above can be stored and replayed. As such, a user may have a 3D concert experience at any time through the stored audio tracks. For example, the stored 3D concert can be made available as a podcast that can be downloaded to a device, such as a tablet or phone, and replayed.

Large Group Music Session

In a purely P2P music session, the number of audio streams grows linearly with number of participating MNs. In part, this linear growth has three effects: (1) the bandwidth requirement grows linearly as the number of peer-to-peer MNs grow within the session, (2) at each MN the number of audio decoder instances and the compute power requirement grows linearly, and (3) the user interface can become cluttered with large numbers of MNs.

To enable large groups (e.g., choirs, bands, orchestras, big bands, and other large musical groups) to interact in a music session with good user experience, this following process can be used to enhance the user experience:

1. Each MN in the session determines a latency score with all other MNs in the session.
2. Each MN is tagged with a color representing the role the node will play in the session (e.g., red for violins, blue for trumpets, etc.)
3. The system sorts MNs in the session into groups based upon common parameters (e.g., color, latency, etc.). Let $G_i$ represent the $i^{th}$ group.

Figure 12A:
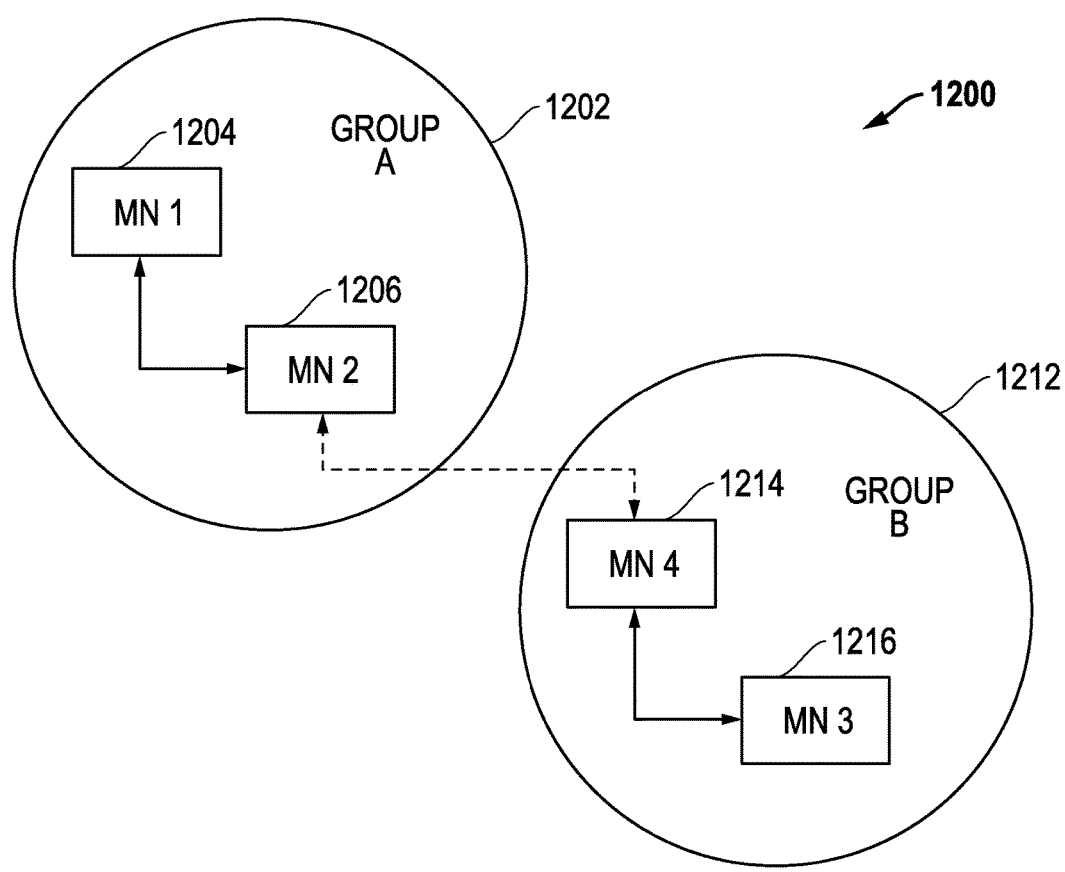
FIG. 12A is a block diagram of an example embodiment for MNs within two groups selected as bridges for inter-group communication.

4. Intra-group audio, which is audio for MNs in the same group, flow as normal such that each MN peer sends audio packets to every other MN peer in the group, directly or via a proxy server.
5. Inter-group audio, however, is configured to flow in such a manner that cycles are not created. This cycle free flow is controlled by using a spanning tree algorithm to create a cycle free communication tree between the groups.
6. One MN in each group is used to communicate with another group. The pair of MNs that serves the role of connecting adjacent group A with group B in the spanning tree are preferably selected based on the minimum latency between nodes in the groups. FIG. 12A described below illustrates this wherein MN2 in Group A and MN4 in Group B have been determined to have the lowest latency of all node-to-node connections between MNs in Group A and MNs in Group B after those connections have been probed.
7. The system max latency (S) is the highest audio latency. The system max latency (S) can be determined, for example, by performing an exhaustive breath first search from the MNs in the group session, and summing the inter-group link latency. If the maximum allowed latency in the interactive music system is $T_{MAX}$, then grouping of nodes is considered non-optimal if $S>T_{MAX}$. If $S \leq T_{MAX}$, the grouping of nodes is accepted and can further be considered a final solution.
8. When $S>T_{MAX}$, then the system attempts to reduce latency by adjusting the groupings. For example, the color grouping constraint can be removed, and the system can place MNs in groups until the system finds a grouping that meets the desired latency threshold (e.g., $S \leq T_{MAX}$). Many algorithms can be employed for achieving this type of graph analysis to determine if solutions is possible. Because the number of nodes in the group session will typically be relatively small (e.g., tens of MNs), the computation processing needed to search for and/or solve for a grouping solution is not prohibitively expensive to obtain or provide.

FIG. 12A is a diagram of an example embodiment 1200 for MNs within two groups selected as bridges for inter-group communication. For the embodiment 1200, a first group (GROUP A) 1202 includes two music nodes (MN1, MN2) 1204/1206, and a second group (GROUP B) 1212 includes two additional music nodes (MN3, MN4) 1214/1216. MN1 1204 and MN2 1206 communicate with each other as part of GROUP A 1202, and MN4 124 and MN3 1216 communicate with each other as part of GROUP B 1212. MN2 1206 is the bridge for GROUP A and communicates with MN4 1214, which is the bridge for GROUP B.

Figure 12B:
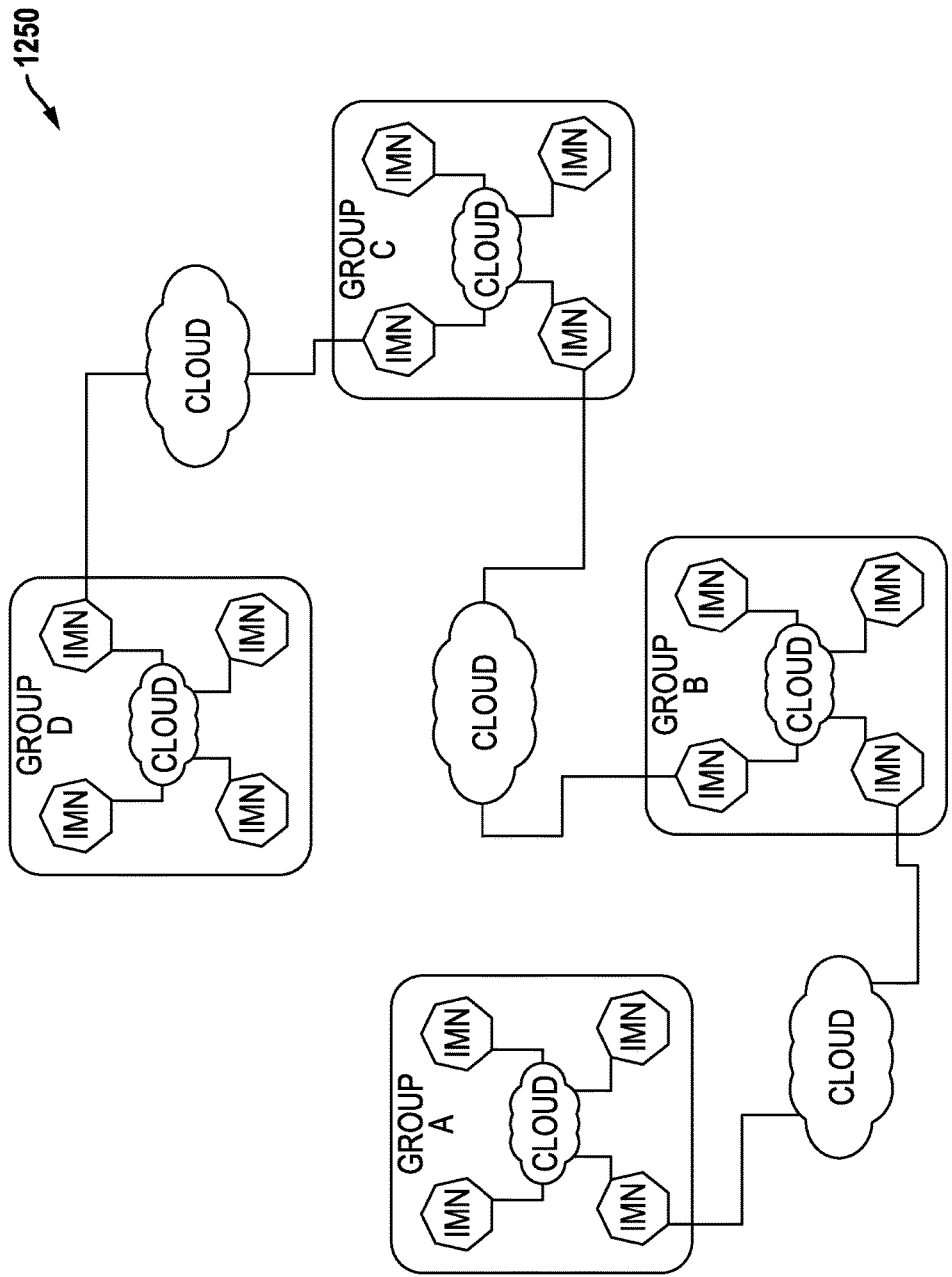
FIG. 12B is a block diagram of an example embodiment for inter-group communications for a larger interconnected group.

FIG. 12B is a diagram of an example embodiment 1250 for inter-group communications within a larger interconnected group (e.g., IMN clusters for a large group). For the embodiment depicted, four groups (GROUP A, GROUP B, GROUP C, GROUP D) are interconnected through clouds. Further, within each group, the interactive music nodes (IMNs) are also interconnected through clouds. It is also noted that the clouds represent one or more networks, such as network 110, through which network communications can occur.

The MNs that serve as bridge between groups are configured to perform additional functions. The incoming audio stream from peer MNs in the group ($R_{as}$) are decoded and mixed together by the bridge MN to form a group audio stream ($R_g$) such that $R_g = \Sigma R_{as}$. The bridge MN is then responsible for sending this mix to the other group with respect to which it is acting as a bridge. The bridge MN must also send its own input audio $I = \Sigma R_{ai}$ to two paths, namely to its intra-group MNs and to the bridge MN with the other group for which it is acting as a bridge.

MN2 in Group A and MN4 in Group B are described above as bridge MNs. The streams leaving MN2 from Group A to Group B through MN4 in Group B is represented as $S_{(A2, B4)} = I_{A2} + R_{gA}$. Similarly, MN4 in Group B sends audio to Group A through MN2 in Group A, and this audio is represented as $S_{(B4, A2)} = I_{B4} + R_{gB}$.

If the bridge node sends the audio input and intra-group audio as distinct audio frames (e.g., frames containing $I_{A2}$, and frames containing $R_gA$), the receiving bridge MN can differentiate what is from the bridge MN and what is from the other MNs in the group. If the bridge node produces a final mix so that it sends only that mix audio (e.g., frames containing $S_{(A2,B4)}$), the receiver bridge MN is unable to distinguish and therefore control mix of bridge node audio separately from its intra-group audio.

A bridge node also performs the role of receiving the audio from its peer bridge node and relaying that audio to its intra-group peers. So the audio output by bridge MN2 in Group A to its peers in Group A can be represented as $G_{A2} = \Sigma R_{Ai} + S_{(B4, A2)}$ where $\Sigma R_{Ai}$ is the set of inputs at A2. Similarly, bridge MN4 in Group relays audio from its peer bridge node along with its inputs to the peers in Group B as represented by $G_{B4} = \Sigma R_{Bi} + S_{(A2, B4)}$ where $\Sigma R_{Bi}$ is the set of inputs at B4.

High Latency Inter-Group Bridge. If A2 decodes $S_{(B4, A2)}$ and then mixes it with its inputs, it will process these packets through a jitter queue. The involvement of the jitter queue implicitly connotes a higher latency than if the packets were not decoded and mixed. However, doing this mixing will result in single stream of audio packets coming from A2 to its intra-group peers. This results in a lower bandwidth than sending distinct packets. The peers also will not be able to distinguish A2 input audio from that which came from the other group for which A2 is a bridge.

Inter-Group Cut-Through Mode. Rather than decode and mix the audio from the group stream, A2 may simply relay the packets to its group members. It may also aggregate its sending payload with payload of packets received in the inter-group stream. This operation does not require the $S_{(B4, A2)}$ packets to the processed through a jitter queue and is therefore a lower latency operation. In this mode, the audio frames for inputs to A2 remain distinct from those of the relayed group for which A2 is a bridge. As such, the intra-group peer MNs can represent and control the mix of these streams distinctly. This mode is a higher bandwidth than the high-latency relay mode.

A similar analysis may be done for group B and node B4. The following can be concluded:
1. The outgoing inter-group peer stream mix, namely $S_{(A2,B4)}$ and $S_{(B4, A2)}$ from a bridge nodes A2 and B4 respectively, is produced from mixing the intra-group streams received at those nodes. Because these streams are processed through jitter queues, the output streams experience latency. It is also noted that there is no point in doing cut-through of these frames because cut-through would simply collapse the notion of groups.
2. The relay of inter-group audio to peers intra-group may incur no delay at the bridge node, if cut-through mode is use. If not, the stream incurs jitter queue processing delay.

If K groups are along a communication path, then if the average jitter processing delay at the bridge nodes is $JQ_{avg}$, then the added delay introduced in session if cut-through mode is used at bridge nodes is $(K-1)/Q_{avg}$. If high latency mode is used, then added latency is $2(K-1)/Q_{avg}$, at the added benefit of lower bandwidth.

Large Group Director. Generally, in a large musical performance, a director/conductor leads the large group. In this large group implementation, one NM is marked or designated as the session director. As described below, a MN performer may provide hinting status that is shown at MNs in the session. Hinting status allows a performer to send non-auditory queues to MNs in the session. Whereas only the intra-group members hint status is shown in session view at a MN, the director MN status is shown at all MNs in the session. Although inter-group hint status could also be shown, intra-group hints are typically what are of interest to musicians within a large group.

Musician Hinting within Music Session

When musicians are physically in the same space, they pass many non-verbal cues to each other. When immersed in a virtual environment as created by the interactive music system embodiments described herein, musicians will likely be unable to convey such cues effectively even if video of themselves are streamed among them. As such, a hinting system and related hinting device can be used to so that musicians can broadcast status/cues to their peers in the music session.

Figure 13A:
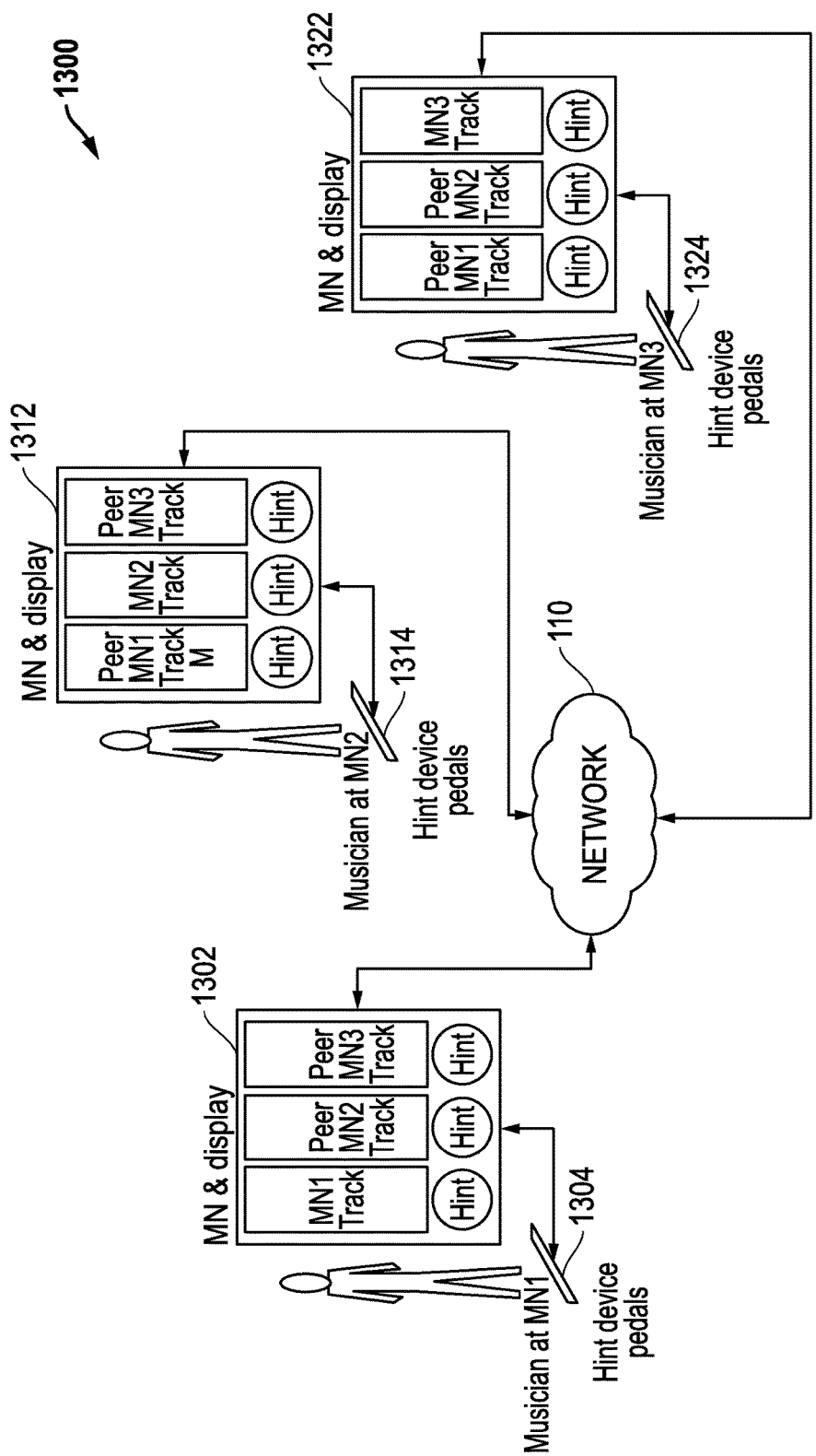
FIG. 13A is a block diagram of an example embodiment for a music hinting system that allows non-verbal cues to be communicated among MNs within a music session.

FIG. 13A is a block diagram of an example embodiment 1300 for a music hinting system that allows non-verbal cues to be communicated among MNs within a music session. For embodiment 1300, each MN includes a display 1302, 1312, and 1322, respectively, that displays information for its own music tracks and the peer music tracks within the music session. A visual hint element is also displayed for each MN within the music session. Looking to display 1302, for example, information for the MN1 track, the peer MN2 track, and the peer MN3 track are shown. In addition, a visual hint element is displayed for each of these tracks. Each visual hint element can be, for example, a circle or button image that visually changes (e.g., changes color, changes texture, changes brightness, etc.) based upon hint cues selected by the user. The other displays 1312 and 1322 can be similar to display 1302. Further, hinting devices 1304, 1314, and 1324 are coupled to each of the MNs, respectively, to provide hinting control for a user. As shown with respect to FIG. 13B, the hint devices 1304, 1314, and 1324 can be, for example, a hinting device with pedals or buttons that are engaged or selected by a user, such as through the action of the user's foot. The hinting devices 1304, 1314, and 1324 communicate user hinting selections to the MNs, and these hinting selections cause changes in the visual hint elements. Each MN also communicates its hinting selections to the other MNs in the music session, and these hinting selections are used at each MN to adjust the visual hint elements associated with each MN, respectively.

Figure 13B:
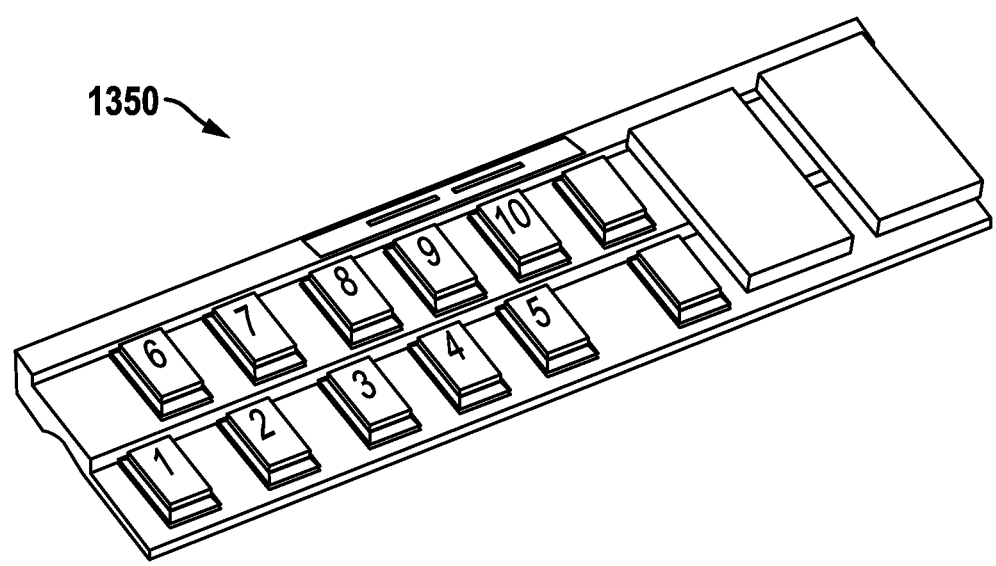
FIG. 13B is a diagram of an example embodiment for a foot-controlled hinting device.

FIG. 13B is a diagram of an example embodiment 1350 for a foot-controlled hinting device. This embodiment 1350 has two pressure sensitive pads as well as ten different selector buttons and control buttons (e.g., power, etc.). The hinting device electronically communicates with the MN using one or more wired or wireless communication connections (e.g., USB connections, Bluetooth connection, etc.).

The example embodiment 1350 for this hinting solution preferable has the following properties and capabilities:
1. It is operated by a person's foot. This is ideal because generally musicians have at least one foot not engaged for the vast majority of instruments played.
2. It communicates and works with the MN display, showing status sent by a musician on the display in low-latency.
3. The input/output from the device is processed through the MN with low-latency (e.g., response time of less than 10 ms).
4. It is simple to use.

For the embodiment depicted, a footpad control with 2 pressure sensitive pads is used, although 4 pads or other numbers of pads could also be used. Each pad can also include a light by or around it that indicates whether the pad is pressed and by its brightness representing how hard it is being pressed. The system has a foot rest pad, which has a rumble motor in/under it. Other haptic feedback mechanisms may also be used. An attention light is also present. The rumble motor or attention light is used to convey events specific to this user. The rumble/attention notifies the user that a peer has updated their status by pressing a pad. A microcontroller circuit in the pad converts the pressures sensor information and sends it over USB (or similar) IO interface to the MN host system communicating with the pad. The MN also sends down control commands to the pad, such as rumble on (and how hard)/off, attention on/off, and/or other commands. The user, for example, may choose to disable rumble and only rely on the attention light.

When a user presses one or more of the pads, the pressure and the pad number is sent through the IO interface to the MN. The MN broadcasts this information to the peers in the session. The status display of the user is updated in the display and if the recipient has a hint-system attached, the attention/rumble command is sent to it.

The system throttles the frequency at which rumbles are sent to the users foot to rate calibrated by the user, but activates the attention indicator for each event. The musician then looks at the status of the peer, and based on a previously agreed interpretation among them, the peer acts accordingly.

Packaged Tunes Service (MAAS—Tunes Sessions)

Music as a Service (MAAS)—Overview. When considering a distributed, real-time music service of this kind for interactive music sessions, the needs of different classes of musicians can be considered. Musicians who are members of a band can easily use and benefit from this kind of music service by simply joining and participating in freeform sessions because they already play regularly with their band mates, and because they have a shared repertoire of the band's music that they all know how to play together. Likewise, independent professional and/or highly accomplished musicians can benefit from this kind of music service because they have a strong network of other musicians to connect with, and because they can either jam in freeform mode, or they have a deep set of common music on which to draw while playing in sessions.

In contrast, amateur musicians, who far outnumber the more accomplished and professional musicians above, are not well suited to participate in a freeform, unstructured music service of this nature. They do not have well-established musical relationships with others, and they do not share a common repertoire of music pieces, nor do they have the confidence or the ability to just get online and start trying to play with others in a freeform environment.

The "music as a service" (MAAS) embodiments described herein in part address the needs of the amateur musician by providing a packaged tunes service with a number of features including Packaged Tunes, Packaged Tune Sourcing, Packaged Tune Library, Local Play, Online Matchmaking, and Online Play, which are described further below. Professional musicians, accomplished musicians, and band members can also take advantage of these innovations.

Figure 14:
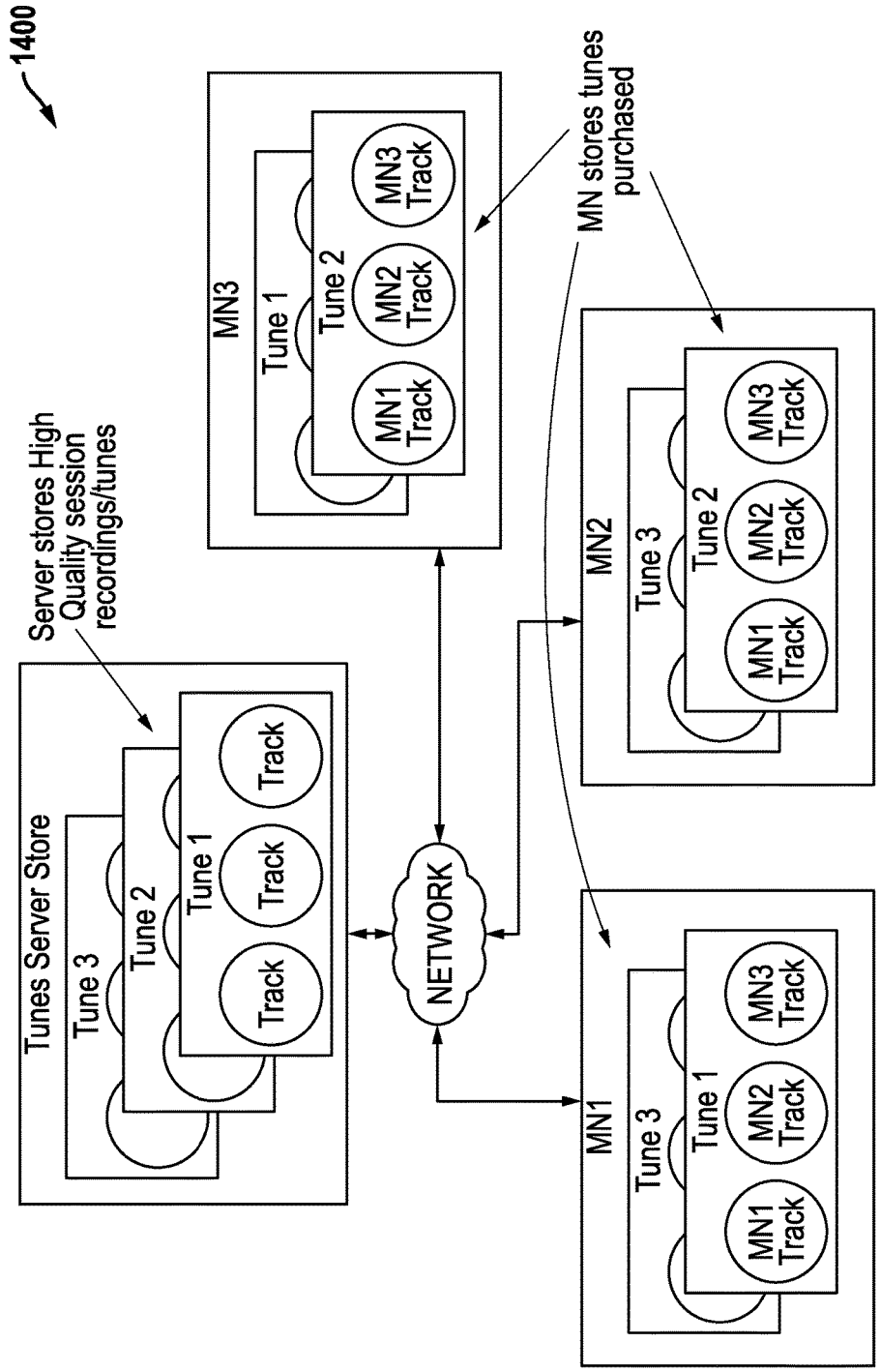
FIG. 14 is a block diagram of an example embodiment for a songs service environment that allows users to access and download songs/tracks/tunes for use with a MN or within a music session.

FIG. 14 is a block diagram of an example embodiment 1400 for a packaged tunes service environment that allows users to access and download packaged tunes for use with a MN or within a music session. The server stores one or more packaged tunes with each packaged tune including one or more tracks recorded from music sessions or obtained from other sources. The server operates as a tunes session server to allow MNs to download a tune including its respective track recordings. For the embodiment depicted, MN1 has downloaded the tracks for TUNE1 and TUNE3; MN2 has downloaded the tracks for TUNE2 and TUNE3; and MN3 has downloaded the tracks for TUNE1 and TUNE2. The server can also provide these downloads only after a purchase transaction has occurred, such that an MN is required to purchase a tune prior to being allowed by the server to download the tune and its track recordings. Further, the user interface at each MN is used to display information related to the various features of the tunes sessions service described below.

In part, the tunes session service allows users to produce and share or sell songs. The tunes session service also allows a user that has acquired a song to playback the song (e.g., tracks played back in sync, concurrently and mixed) while suppressing (e.g., muting) one or more tracks within the song. The playback may occur at a MN or any device capable of playing audio. The user(s) may also practice playing the tracks that are suppressed.

Packaged Tunes (Songs and Tracks). Packaged tunes (e.g. recorded tracks associated with songs or musical performances with one or more recorded tracks being associated with each song or musical performance) represent a structured form of content for a given piece of music. The content and data associated with each packaged tune may include:
  Recorded Tracks—These are the track-level recordings of each instrumental and/or vocal component that together make up the master mix of the complete musical performance.
  Master Mix—This is the master mix recording of the complete musical performance. It is optional and may or may not be included in the content.
  Music Notation—This is the music notation associated with each individual track (i.e., the musical notes to be played and lyrics for any parts to be sung). This may be displayed in sheet music form, or via an animated presentation of notes that are displayed on a musical staff in industry-standard form, with the display of the notes timed to correspond to the moment at which they should be played, or one or more other presentation styles.
  Meta Data—This content includes data such as the name of the piece of music, a description of the piece of music, the genre of the piece of music, the date the original recording was released, the artists and instruments played on the original recording, and other pieces of data as well.
  Unique ID (normalized)—Each packaged tune can be associated with a unique identifier (ID) to normalize the music library for the purpose of both commerce and royalty tracking, and for online matchmaking. The unique ID can be used to identify each packaged tune within the system.

Packaged Tune Sourcing. Packaged tunes may be sourced in different ways, depending on the varying desires of the parties involved. For example, the following are examples for how the content can be sourced:
  Original Performer. In one implementation, the packaged tune is licensed from the copyright holder in its original mastered and commercialized/distributed form. For example, a packaged tune could be licensed for "Freebird" by the band Lynyrd Skynyrd. In this instance, a custom license would be negotiated, and the musician would have access to the track-level masters of each instrumental and vocal performance that together make up this piece of music. The music notation for this piece of music may or may not be included in the content licensed from and delivered by the copyright owner.
  Cover Bands. In another implementation, if the music service operator prefers, or if the copyright holder does not wish to grant such a license, the music service operator may source packaged tunes from cover bands using a crowd-sourcing content model to aggregate a packaged tune music library. These cover bands may use the distributed music service to generate recordings for the packaged tunes, or may record in any manner they choose, and the music service operator may then upload the tracks that make up a packaged tune into the server systems for the service, regardless of the recording source. Music notation for the piece of music may or may not be included in the content provided by the cover band. In this case, the music service operator would pay a mechanical royalty to the copyright owner, and may or may not also pay a royalty of some kind (up-front, per unit sold, a combination of up-front and per-unit, or no royalty and instead the provision of greater exposure on the service) to the cover bands that generate the recorded tracks for the packaged tune.

Packaged Tune Library. As a user of the music service downloads each packaged tune (either with or without a purchase of a license to such packaged tune), that packaged tune is added to the personal packaged tune library of that user in the music service. As such, the tunes service is aware of which packaged tunes each user has downloaded.

Local Play. Once a packaged tune has been downloaded by a user, that user can enter a local session alone, and can play along with the recorded tracks that make up the packaged tune. Unlike some other aspects of the interactive music service described herein, the user MN is playing alone within the local play and is not communicating with other user MNs across the network. The local play can include one or more of the following features through the MN used by the user:
  Automatic Substitution—Depending on which instrumental tracks a user has configured and specified in the music service that he/she will play, when the user enters a local session, the music service will mute the appropriate recorded tracks automatically. For example, if a packaged tune has recorded tracks for electric guitar, bass guitar, and drums, and the user has a track configured to play his electric guitar, then the service will automatically mute the electric guitar recorded track so that the user can play live in place of this recorded track. The user may also choose to unmute the recorded track, or half-mute the recorded track to have an audible guide for the track that they are playing, optionally if desired.

Music Notation Display—The user may choose to have the music notation displayed for any track they are performing optionally, in any of the presentation styles noted earlier, or if they prefer to play by memory, they may opt not to display any music notation while playing.

Play Scoring—The music service may also optionally offer a play scoring service that measures how well the user plays his track or tracks, by monitoring which notes are played, when the attack for each note takes place in time, and how long each note is held. The play scoring service can then produce an aggregate play score that indicates how well the user can play each track. This play score can be used by the user to understand how they are doing as they improve through practice, and can also be used by the music service in the online matchmaking feature.

Online Matchmaking. Once a user has confidence in his ability to play certain tracks in a packaged tune alone or otherwise chooses to do so, the user can participate in online tunes sessions to play packaged tunes with other users of the interactive music service, combining the interactive music session service and the packaged tunes service. Online matchmaking is used to facilitate online music performances with packaged tunes by allowing users to find tunes sessions within which to participate. For example, online matchmaking suggests tunes sessions that a user may join through one or more of the following features:

Packaged Tune Sessions—When a user goes online, the user may create a special kind of session, a session specific to a particular, unique packaged tune. For example, a user could create a tunes session for the performance of the packaged tune "Freebird" by Lynyrd Skynyrd. In this case, the tunes session would be a packaged tune session that carries the unique ID for that specific packaged tune. Only users who have downloaded this specific packaged tune into their packaged tune library would be able to join this specific packaged tune session.

Packaged Tune Library—A user interested in joining a packaged tune session can then scan or search available packaged tune sessions. This search feature would automatically determine what packaged tunes are in the user's packaged tune library and would look for existing packaged tune sessions that are configured with the unique IDs of packaged tunes that are in the user's packaged tune library. A listing of the packaged tune sessions that match the packaged tunes in the user's packaged tune library can then be presented in an user interface as prospective packaged tune sessions to join.

Packaged Tune Lobby—As an alternative to one user creating a packaged tune session for one specific packaged tune, users interested in playing in packaged tune sessions may join a lobby area. The packaged tunes in each user's packaged tunes library within the lobby area are analyzed to determine their packaged tune IDs, and these packaged tune IDs are then compared to the packaged tune IDs for the packaged tunes within packaged tunes libraries for the other users in the lobby, as well as all the existing packaged tune sessions that have been set up for a specific packaged tune. The user can then scan a listing of all existing and prospective sessions, and can either join an existing packaged tune session, or can join one or more users who have not yet created/instantiated a packaged tune session. Joining other users will create/instantiate a packaged tune session with these multiple users around a specified packaged tune that all of these users have in their packaged tune library.

Automated Track Analysis—In suggesting and displaying tunes sessions, the online matchmaking also considers the instrumental and/or vocal tracks that a user has selected to play within any packaged tune session. For example, if a packaged tune session has tracks for electric guitar, rhythm guitar, bass guitar, lead vocal, backup vocal, and drums, and if an existing packaged tune session already has live tracks from other users who are playing drums and electric guitar, then a user interested in joining who wants to play the bass guitar track will see this track within the packaged tune session as a viable option for joining the session. However, if the user instead wants to play the drums track that is already being played, this packaged tune session will not been seen by the user as a viable option for joining the session. Similarly, if in the lobby area, two users who both want to play the electric guitar track for a packaged tune that both share in common in their packaged tune library would not be matched as potential users for a common tunes session.

Network Scoring—The network scoring described above is can also be used as a filter in the selection and ordering of packaged tune sessions available for a given user, as it will favor the presentation order of packaged tune sessions that are expected to provide a higher level of user experience, such as packaged tune sessions having low latency, low jitter, etc.

Play Scoring—Users may also see through the user interface the play scores of other users for the packaged tunes in each packaged tune session, enabling users to better select packaged tune sessions to join. For example, sessions having other users of comparable skill levels are likely good selections for a user to join in order to avoid either frustration or embarrassment for the user within the session. In addition to seeing the displayed play scores, the user may also select to filter out packaged tune sessions with users based upon specified play scores. For example, only users having play scores above or below a selected play score will be shown. Other play score parameters may also be selected such as ranges of play scores within which a user must fall in order to be shown.

Online Play. When a user enters a packaged tune session with other users, the automatic substitution and music notation display features described above with respect to the local play feature are also used and available for online play. Also, during or after a packaged tune session ends, each user in the packaged tune session is allowed to rate the performance capabilities of the other users in the session. AS such, impartial third party ratings of a user's skill level can be generated and stored with respect to the specific packaged tune that was part of the tunes session. These user ratings may then be used in the online matchmaking feature described above in addition to machine-based play scores that may be generated for a user.

Track Recordings and Skew. As described with respect to high fidelity recording above, during a session, each MN produces one or more high fidelity tracks ($R_{ai}$) that are uploaded to the server. As described above, these tracks are skewed in time relative to each other, based on the time delay in starting the recording at each location. To produce a final cut of each track, it is preferable to correct or adjust the start time skew in the high fidelity audio files. As also described above, an accurate reference clock, common to all MNs in the session is used to timestamp each recording start with that reference clock time. Similar to the example above, with this reference clock timestamp, the algorithm below can be used to produce final tracks that are synchronized:

1. Sort the high fidelity recordings ($R_{ai}$) by timestamp
2. The oldest timestamp represents the recording that started latest ($t_{OLD}$)
3. For each recording ($R_{ai}$), the delay ($t_{Di}$) relative to the latest start time is represented as $t_{Di}=t_{OLD}-t_{STARTi}$ where $t_{STARTi}$ is the record start time for $R_{ai}$.
4. The delay ($t_{Di}$) is the time offset in recording $R_{ai}$ that must be skipped to bring the recording in alignment with that of the recording having the latest start.
5. The final track recording ($TR_{ai}$) for each recording is produced by discarding $t_{Di}$ worth of data from the recording and then writing the result to the final track file. Automated or manual calibration can also be used to tune this process.

Each final track represents one or more instrument or voice that together as a set represents a song or performance. Assume N tracks are in a song. Then the final song track ($TR_{song}$) can be represented as a set of the individual tracks within the song such that $TR_{song}=\{TR1_{ai}, TR2_{ai}, \ldots TRN_{ai}\}$.

Tunes Service with Music Session. Further, using the tunes service with respect to a music session, a set of tracks may be played back for instruments that that are not available in the session while muting another set of tracks for instruments that are available in the session. Two examples for modes of doing song track playback are now described for the set of tracks ($TR_{song}$) that are played back to users in a music session.

Single Source Track Playback. The single source track playback mode is where one MN is the source of the song tracks being played back for all users in the session. This MN plays and streams the song tracks to other nodes in the session in low-latency and mixed with other input tracks at the MN. In this mode, the song playback tracks will experience all the effects of jitter and packet loss in the network being experienced by the MN.

Distributed High Fidelity Track Playback. In this distributed high fidelity track playback mode, the content of the tracks of the song are securely distributed to a prescribed set of MNs in the session. The set of MNs receiving the tracks can be determined by a number factors such as DRM (digital rights management) policies, MN capability, users' preference, other factors, and/or a combination of these factors. As with the live track recordings ($R_{ai}$), the interface for the session shows a common and session global track control for each song track at each MN location, enabling any user in the session to control the track volume, effects, mute, etc. for the whole session.

In this high fidelity mode, the song tracks at each MN are played back only to as outputs for that MN. Because the tracks are played back locally, the following benefits are provided: (1) no artifacts are introduced due to processing through a jitter queue and/or due to network artifacts, (2) high fidelity is provided because the tracks are not compressed for streaming, and (3) no latency is introduced.

This high fidelity mode requires that playback of tracks be started and played synchronized if synchronization is desired, for example, in a music session. The process described above for the distributed metronome can also be used for this synchronization. When a user presses the "play" button, a "play start" command is sent to the MNs in the session directing them to start playing. The following describes an example embodiment for this process:

1. Each MN knows the network latency between it and every MN in the session, as described above, and the maximum latency ($t_{MAX}$) for its peer-to-peer connections can be determined from these latencies.
2. Let the reference clock time for the MN at which the play start is initiated be represented by $t_{REF}$. The initiating MN broadcasts a "play start" command to all peer MNs within the session indicating that the start time for the "play" is to be $t_{START}=t_{REF}+2t_{MAX}$. Twice the maximum latency ($2t_{MAX}$) is used as a conservative approach, although a lower start time bound of $t_{START}=t_{REF}+t_{MAX}$ could also be used, as well as other later start times.
3. A MN receiving the play start command waits until its reference clock time (t) is about the designated start time (e.g., $t \cong t_{START}$). The accuracy of local clocks are typically on the order of ±1 ms. If the designated start time ($t_{START}$) is earlier than the current reference clock time (t) for the MN receiving the start commend (e.g., $t_{START}<t$), then the command is late and the receiving MN re-broadcasts a new start time with an increase to the 2× multiplier for its maximum latency ($t_{MAX}$) to compensate for unexpected lateness of the command.
4. Clocks at the MNs are assumed to be relatively matched in drift. Thus, the starting time is important for them to remain in synchronization.
5. Audio from the high fidelity tracks are played only to that MN output. Thus the track playback is with no latency and is synchronized across the session.

Match Making and Socialization Using Tunes Sessions. As described herein, after practice playing tracks in songs, a user may desire to play the track in a session with other musicians. Similarly, a session creator may desire to find users capable of playing particularly tracks of a songs in a session. The online matchmaking service allows discovery and matching of capability and need for song and track playback in music sessions. The following are further examples of how this service can be utilized:

1. Musicians list song tracks that they are capable of playing. They also indicate their competency level.
2. Session organizer list songs that they plan to play in a session and tracks they are seeking musicians to play. Session organizer also indicates the time/date of the session.
3. A musician can search for sessions matching his/her capability/interest within a geographic zone. He/she is also allowed to subscribe to the session.
4. Session organizer can search for musicians matching the session need. The session creator may invite, accept/reject subscriptions. Once the need of the session is met, the creator may close the session from accepting further subscriptions.
5. The system can rank the subscriptions to the listed session by a variety of one or more factors, which can include:

Friendship—the subscriber is a friend of the session creator.
    History—the subscriber has played the track for the song in previous sessions.
    Competency—the user indicated competency compared with the requested session competency.
    Latency—The expected or actual latency between the session creator designated MN and subscriber MN.

User scoring/ranking—based on the score of the subscriber on this track as well overall score. Users are enabled to score each other.

Other—one or more other selected factors.

Embodiments will now be further described with respect to APPENDIX A, APPENDIX B, and APPENDIX C below. APPENDIX A includes further details of MN registration and control with respect to network-connected devices, with respect to a network connection service (Network as a Service—NAAS) to provide lower latency network communications for music sessions. APPENDIX B below provides further functional block diagram examples for the interactive music system and related music nodes (MNs) and the server system(s). APPENDIX C below provides example APIs (application program interfaces) that can be utilized.

Appendix A—Network Data Streams and NAAS (Network as a Service)

The MN application works by sending and receiving audio stream data from one or more other MN application instances located in the network. Audio data is encoded and sent to multiple recipients and audio data is received from the same recipients, decoded, and mixed before being played. Because latency is important, care is taken to minimize latency perhaps at the expense of increased network bandwidth. One aspect of that is sending smaller chunks of audio data more frequently.

There are two sources of audio, one being music from an instrument or microphone, and the second perhaps being a chat sent from a microphone/headset. The chat audio is optional.

In one embodiment, the music stream includes up to 256 kilobits/second of captured and encoded audio data, chopped up into frames as small as 2.5 milliseconds (400 frames/second). This frame size provides for about 82 bytes per frame (assuming a byte is 8-bits). An optional chat stream an also be included with an additional maximum of 64 kilobits/second of audio data, or 21 bytes per frame. Headers or other wrappers are used around these two frames to distinguish their purposes (e.g., type, seq (sequence number), uid (user identifier)) for 9 bytes. So, as one example, 82+9 bytes are used for music, and 21+9 bytes used for chat, leading to a total of 91 bytes for music and 30 bytes for chat or altogether 121 bytes. An IP/UDP (internet protocol/user datagram protocol) header wrapped around that is an additional 28 bytes, for a total packet payload of 149 bytes per frame, 400 frames per second. The total resulting bit rate is 477 kilobits/second (from a combined input of 320 kilobits/second) for an increase in bandwidth of 49% due to overhead. It is noted that this is one example packet structure that can be used for network communications for the interactive music system embodiments described herein, and other packet structures could also be utilized.

The overhead matters as it increases our transmission time and load on network equipment. Many home users have asymmetric network connections which have a smaller upload capability than download. Often a home user is limited to only 1-3 megabits/second for upload. Corresponding download capabilities range from 5-30 megabits/second. If a jam music session is being carried on with 5 users, four of them remotely located, that means our total data upload requirement is 497*4=1,908 kilobits/second. This is very close to the limit of many a home user's upload capability, and out of reach for a significant fraction.

Also, for this five piece band and using the maximum frame rate, sending 1,600 frames per second are being sent up to the internet from each member. Experiments have shown that this frame rate can swamp most home networking equipment. When frames come too fast, frame processing gets bogged down. This can cause delays in passing the frames through to the internet from the local network. Temporary bursts can often be absorbed by buffering the excess frames and sending them as-soon-as-possible, but when frame rates are persistently higher than can be handled by buffering, another solution is employed: drop the excess. Example embodiments are described above for buffering using a jitter queue and dropping packets at the end of time windows.

While frames are being sent, the same 1,600 frames per second are being received, and likewise at 1,908 kilobits/second. This load will further degrade the performance of the home networking equipment. Often the result of this degradation is that frames are delayed or dropped outright. This can cause the audio streams to lose synchronization or sound fuzzy or even choppy. Late frames are the same as dropped frames, further degrading audio quality.

Finally, once frames are on the internet they can take complicated and variable paths to their destinations. Two users both on Time Warner's network in Austin will have a different path (and perhaps shorter) between them than two users where one is on one ISP (e.g., Time Warner) and the other is on another ISP (e.g., AT&T). And if the users are in different cities then that adds additional path variability. Finally, equipment congestion, failures, and maintenance might introduce even more path variability. Different paths have different capabilities and loads as well. Path variability matters because each path induces delay. For a given path, the delay may vary minute to minute, even second to second.

Thus, items to be concerned with for the network communications for the participants within the interactive music system include: (1) bandwidth, (2) delay, and (3) reliability.

So, NAAS (network as a service) embodiments described herein are used to improve upon the server services described above by reducing latency for communications within the interactive music system. While some latency still exists for audio encoding and decoding, the upload and download bandwidth requirements can be better managed using the NAAS embodiments, and the network path variability can be better managed for a large class of users.

Bandwidth

As indicated above, bandwidth is increased by 49% due to encoding of the audio, breaking it up into frames, and then wrapping it to form network communication packets. Bandwidth is also multiplied it by a factor that corresponds to the number of other participants in the session. Let's look at each step:

1. Encode—Audio encoding likely can not be significantly adjusted. Any attempt to compress audio more than it is already compressed will likely add delay (e.g., once the audio is presented to the networking layer).
2. Wrap (e.g., type, seq, uid)—Wrapping is useful to separate audio streams from different sources and manage missing and out of sequence frames.
3. Wrap with UDP—A protocol, such as UDP, is used to transmit the data across the internet. It is possible, however, to carry more data in a single UDP frame to eliminate 28 bytes per frame of excess wrapper. This variation is described in more detail below.

4. Upload to each participant—This has a large effect as it is not just a percentages bigger, it is integral factors bigger. When there are more than two participants in a session, the same exact data is being sent more than once to the different participants. If this data can be sent once and have it be resent or multicast to the other participants, bandwidth needs and latency could be greatly reduced.

Upload performs these steps in the order specified. The obvious thing to pick on, the biggest, is step 4. So if step 4 can be optimized by utilizing some sort of multicast capability, as many MNs as desired can be supported within a music session and only require 400 frames per second upload at a rate of 477 kilobits/second. This is well within the capability of most home internet users. This is a dramatic savings in both upload bandwidth and frame count. Also, more home routers can handle this lower frame rate, and so the number of potential users increases.

This is called upload scattering.

Download performs these steps (more or less) in the reverse order. Multiple participants across the internet uploads and sends audio data to, and the local MN subsequently downloads this data, unwraps it, and decodes the audio streams. The MN then combines the various audio streams into a single audio stream which is played out at the MN, such as through a speaker. As indicated above, the user has the option of controlling the volume of each individual participant's contributions to what is being heard.

The obvious best case would be to download a single audio stream and play it out of a speaker. This would require significant processing in the internet at server systems to completely unwrap and decode the audio streams from each participant, combine them into a single stream, taking into account volume settings for each stream, then encode and rewrap it before downloading to a participant. As with upload, this would support (assuming infinite computational ability in the internet) as many participants as would be liked in a session and only require 400 frames per second download at a rate of less than the 477 kilobits/second upload requirement.

The computational ability in the internet server systems is called into question, of course, as it adds additional delay and expense, plus difficulty accounting for each participant's volume settings and mechanisms for manipulating those, etc. Also it requires code in the internet server systems to decode and encode audio, mix it, wrap and unwrap, etc. This is not an easy capability to deploy and maintain, debug, etc.

For one embodiment, during each 2.5 millisecond slice of active session time, one frame from each participant will be received on average. These frames are combined together in the internet NAAS server systems, and these combined frames are downloaded from the server systems by the MNs as a single UDP packet. This combining of frames reduces download frame count from the server systems, and also reduces bandwidth requirements.

The audio data from frames (e.g., audio data from audio data frames or audio plus video data frames) in packets received from multiple MNs can also be combined together by the NAAS server systems, and this combined audio data can be downloaded from the NAAS server systems to the MNs as a single UDP packet. This combining of audio data from communicated frames reduces the packet rate that is used to for processing by the MN router and also reduces bandwidth requirements on the receiving MN Internet service provider (ISP).

To quantify these savings, assume four remote participants generating 121 bytes of UDP payload per frame (see above). That's a total of 484 bytes of payload if these frames are mashed together. Adding a UDP wrapper, this becomes 512 bytes total size, or 1,638 kilobits/second. This is not a big improvement over 1,908 kilobits/second for normal non-optimized download (14%). But, only download 400 frames/second are downloaded instead of 1,600, which is of course a quite dramatic improvement. Home routers will be happier.

So, rather than sending payloads immediately to the intended recipient, the server waits to see if it can gather up a few more to group together. However long it waits, it is delaying the earliest packet by that much.

This is called download aggregation.

Delay

Another factor affecting our audio quality is delay. The total delay of a frame is the total of all the delays along the path from one participant (A) to another (B). This includes the following at least:
 Encoding delay (2.5 ms)
 Processing to wrap and transmit (small delay)
 Transmit to home network equipment (4 ms)
 Transmit from A to A's ISP (variable delay)
 Wander from A's ISP to B's ISP (variable delay)
 Transmit from B's ISP to B (variable delay)
 Transmit from home network equipment (4 ms)
 Processing to receive and unwrap (small delay)
 Decoding delay (jitter buffer delay)

The big delays here have to do with the ISP delays and internet delays. If A and B are both in the same locale and use the same ISP, this is as good as it can get (except if they are in the same house).

Figure 15A:
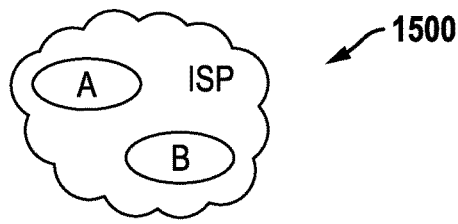
FIG. 15A is a block diagram of an embodiment including two music nodes (A, B) communicating with each other through an ISP.

FIG. 15A is a block diagram of an embodiment 1500 including two music nodes (A, B) communicating with each other through an ISP.

Likely the data moves from A to B on equipment located on private high speed networks operated by the ISP. Still the delay could be 5-10 ms if located in the same locale.

When A and B are one the same ISP in different locales, then the fun begins. Topology and style varies greatly among different ISP, but it is likely that some of the data will traverse some public networks. Some ISP might tie each locale to the internet directly, while another may tie all their private networks together and then tie them to the internet at a few key points.

When A and B are on different ISP it looks a lot like the above case, but perhaps even more complicated. Suppose A is on Time Warner in Austin and trying to route data to B on Comcast in Austin. What if A's data first hits the Internet in Dallas and then has to get to Minneapolis to get into Comcast? Data moving across town goes from Austin to Dallas to Minneapolis and then back to Austin. And who's to say that data moving across the internet from Dallas to Minneapolis is a single hop?

Figure 15B:
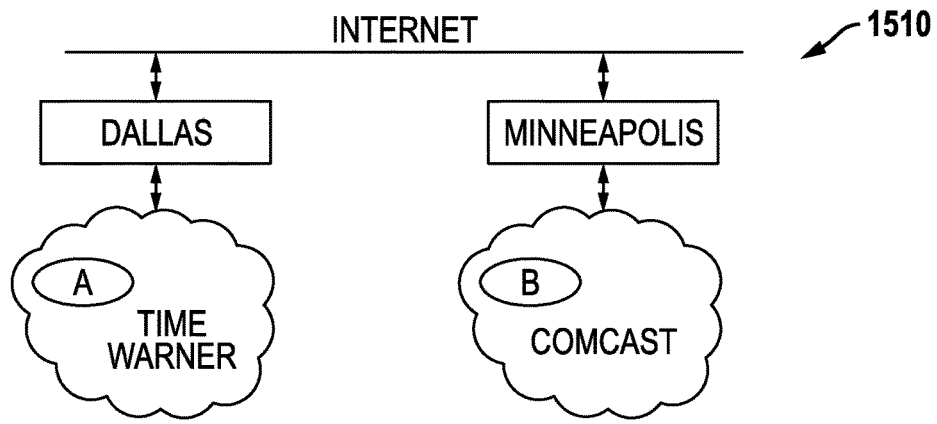
FIG. 15B is a block diagram of such an embodiment including two music nodes (A, B) communicating with each other through different ISPs.

FIG. 15B is a block diagram of such an embodiment 1510 including two music nodes (A, B) communicating with each other through different ISPs. For the embodiment depicted, A is located in Austin and uses Time Warner as its ISP, which has its direct internet backbone connection systems in Dallas. B is located in Austin and uses Comcast as its ISP, which has its direct internet backbone connection systems in Minneapolis.

To address these delays, NAAS server systems can be located at strategic points on both Time Warner's and Comcast's networks in Dallas. Data trying to move between the two in Austin might merely need to utilize the NAAS server in Dallas to jump directly from Time Warner's network to Comcast's network. Customers in Dallas would benefit the most, perhaps, but users within a few hundred miles of Dallas might certainly be better off than otherwise.

Figure 16:
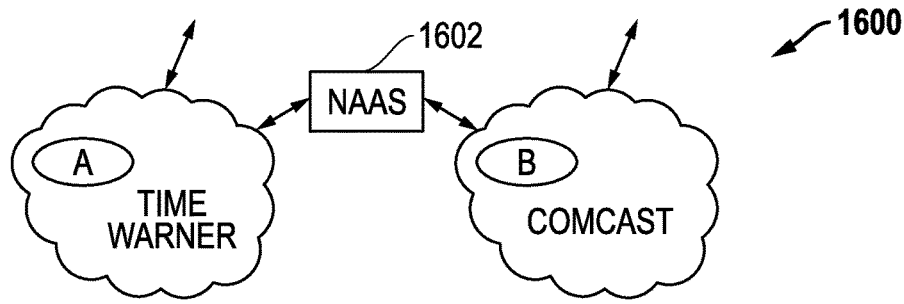
FIG. 16 is a block diagram of an embodiment including NAAS (network as a service) server systems connecting two independent ISPs.

FIG. 16 is a block diagram of an embodiment 1600 including NAAS server systems 1602 connecting two independent ISPs. For the embodiment depicted, A is located in Austin and uses Time Warner as its ISP, B is located in Austin and uses Comcast as its ISP. However, unlike FIG. 15B, the NAAS server systems 1602 provide network connection services between the two different ISPs and thereby reduces latency of communication between the music nodes (A, B).

This is called path optimization.

A more advanced system might allow user A to hit one of our servers near his locale, the data flows across a backbone network to another of our servers near B's locale, and is then delivered to B.

This can be called advanced path optimization.

Setting Up a Session without NAAS

Figure 17:
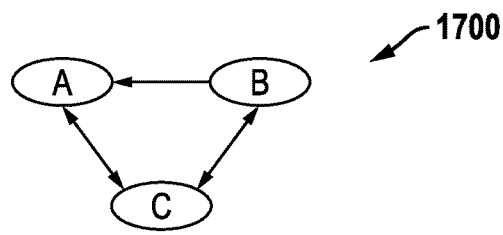
FIG. 17 is a block diagram of an embodiment including three music nodes (A, B, C) communicating with each and the server systems to set up a non-NAAS music session.

Just to put it all in context, let's look at how a non-NAAS session is setup. The first participant creates a session and then invites the other two to join. In the end, they are each sending audio streams to the other two:

FIG. 17 is a block diagram of an embodiment 1700 including three music nodes (A, B, C) communicating with each other and the server systems to set up a non-NAAS music session.

A is the name of a participant, as are B and C. The solid line between each pair of participants indicates the bi-directional flow of data. To accomplish this setup, here are the necessary steps:
1. A starts the session
2. B joins the session
3. B is told about A
4. A is told about B
5. C joins the session
6. C is told about A
7. C is told about B
8. A is told about C
9. B is told about C As each participant is "told" about another, the told participant begins to send data to the participant it was told about.

In a like manner, the session is torn down in a similar set of steps:
1. C leaves the session
2. A is told that C left
3. B is told that C left
4. B leaves the session
5. A is told that B left
6. A stops the session There are fewer steps because when C leaves, C doesn't need to be told anything about A or B, etc. It is noted that example message sequences for starting and stopping a non-NAAS session are described below.

Figure 20A:
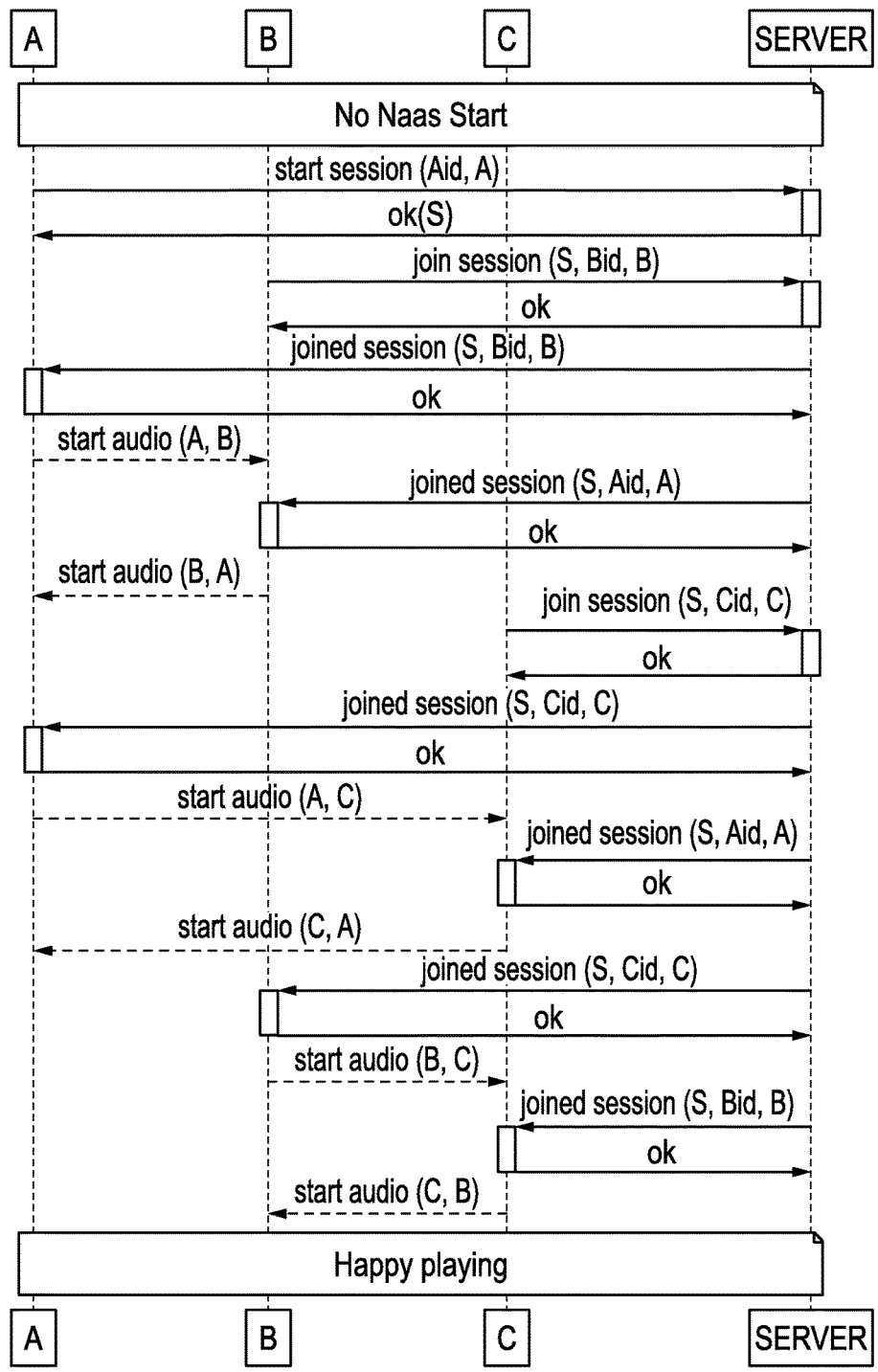
FIG. 20A is a swim lane diagram of an example embodiment for a music session start by music node A where music nodes B and C then join the session.

FIG. 20A is a swim lane diagram of an example embodiment 2010 for a music session start by music node A where music nodes B and C then join the session. The swim lane diagram includes the interactive music system server and music nodes A, B, and C.

Figure 20B:
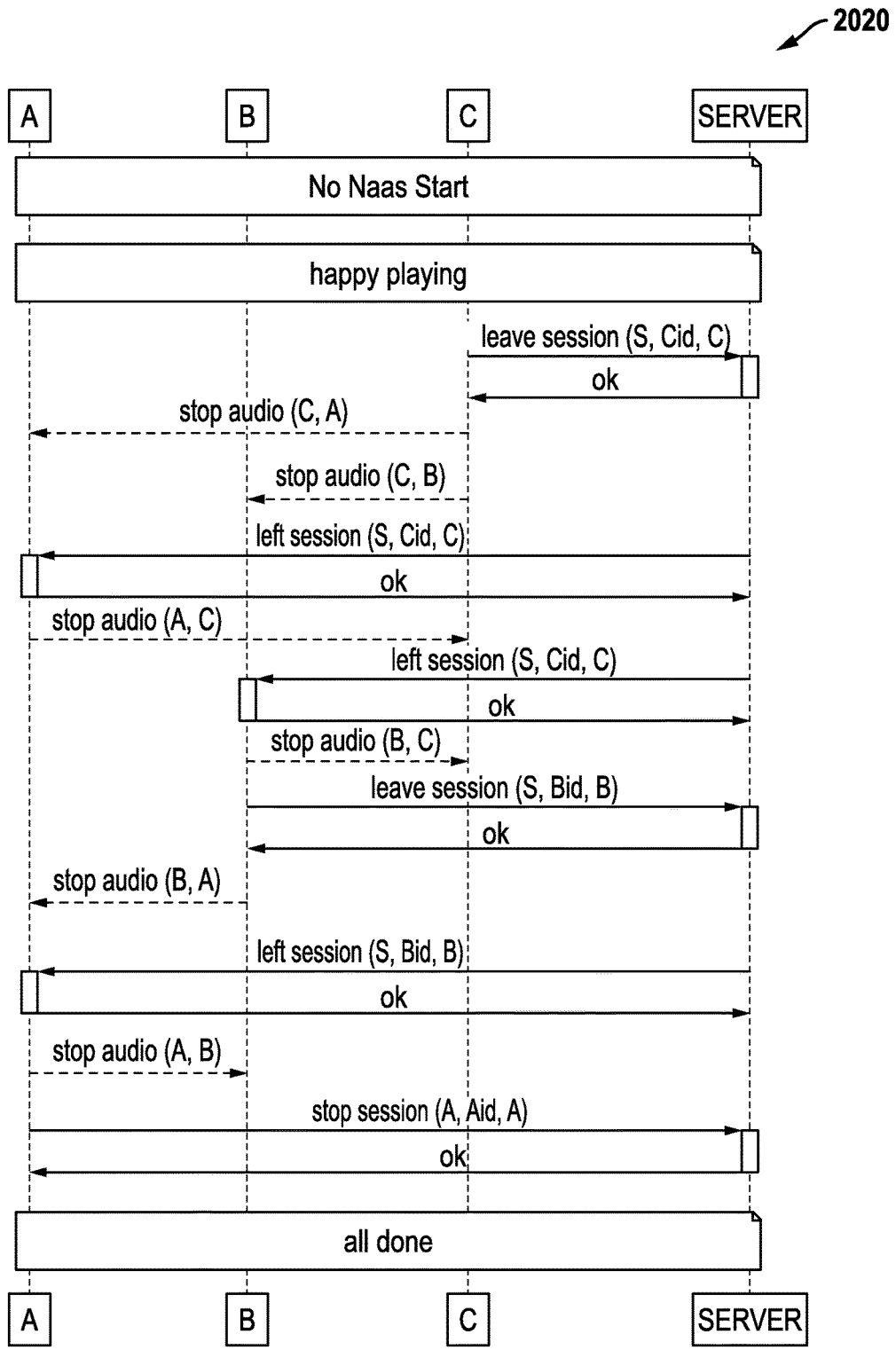
FIG. 20B is a swim lane diagram of an example embodiment for a music session stop where music nodes B and C leave the session.

FIG. 20B is a swim lane diagram of an example embodiment 2020 for a music session stop where music nodes B and C leave the session. The swim lane diagram includes the interactive music system server and music nodes A, B, and C.

How NAAS Works

To be effective, NAAS server systems are preferably directly connected to as many ISP networks as are important in a given locale. This means one interface for each ISP network (e.g., ISPs for MNs 1-4 in FIG. 18A discussed below) and thus one address per ISP network as well. In order to determine which address of a NAAS server a participant should use, it is useful to know the ISP network for the participant and match that to the ISP's network address on a NAAS server. If the participant's ISP is not represented (e.g., ISP for 5 in FIG. 18A below), then one way to determine which address is best is to test them all. Given the difficulty of "knowing" and "matching," it seems better to just have the participant test each address of a representative sample of nearby NAAS server systems to determine the proper address to use. It is further noted that the network interfaces for the NAAS server systems include both physical interface implementations or virtual interface implementations or combinations thereof.

Figure 18A:
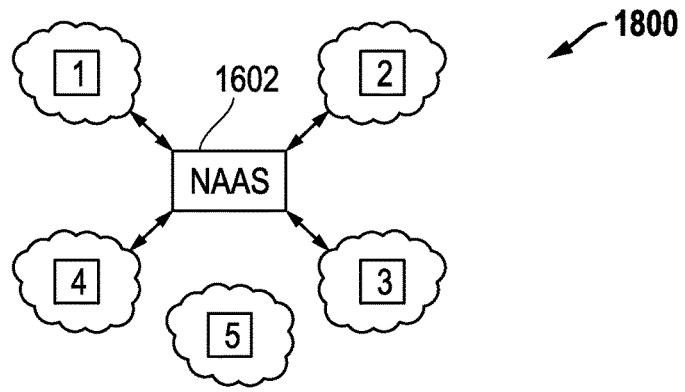
FIG. 18A is a block diagram of an embodiment including NAAS server systems providing communications among four of music nodes for a music session.

FIG. 18A is a block diagram of an embodiment 1800 including NAAS server systems 1602 providing communications among four of music nodes for a music session. The NAAS server systems 1602 have direct connections to the ISPs for music nodes 1, 2, 3 and 4, but does not have a direct connection to the ISP for music node 5.

The participant will send data to the best address of the NAAS, and the NAAS will forward the data to the other participants in the session using the address for each of them. Data coming from the NAAS to a participant will be "from" the best address at the NAAS for that participant.

Figure 18B:
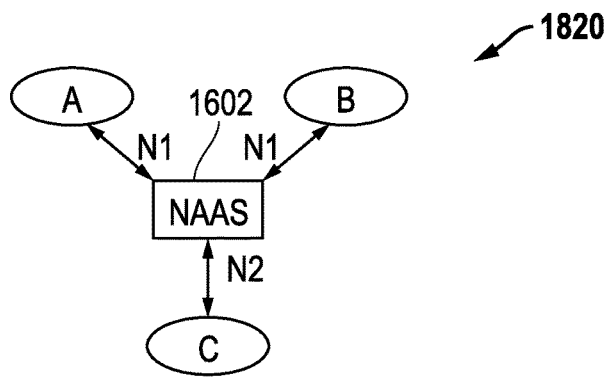
FIG. 18B is a block diagram of an embodiment including three music nodes (A, B, C) communicating with each other through two different ISPs.

Let's suppose there are three participants, A, B, and C in a session. A and B are on ISP network 1, while C is on ISP network 2. A and B will use the NAAS address for ISP network 1, while C will use that for ISP network 2:

FIG. 18B is a block diagram of such an embodiment 1820 including three music nodes (A, B, C) communicating with each other through two different ISPs. Because A and B are on the same ISP, the NAAS server systems 1602 use one direct connection (N1) for communications to/from A and B. For C which is on a different ISP, the NAAS server systems 1602 use another direct connection (N2) for communications to/from C.

When A sends data to N1, NAAS sends it to B and C. Data sent by B to N1 will go to A and C, and data sent by C to N2 will go to A and B. Data sent to A from NAAS will be from N1, likewise N1 for B, and N2 for C. This is the situation when all three of A, B, and C are authorized to use NAAS. Here it is in tabular form:

| If Received From | Using Interface | Then Send To | Using Interface |
| --- | --- | --- | --- |
| A | N1 | B | N1 |
| A | N1 | C | N2 |
| B | N1 | A | N1 |
| B | N1 | C | N2 |
| C | N2 | A | N1 |
| C | N2 | B | N1 |

The first row is read as "if data is received from A using interface N1, then NAAS should send it to B using interface N1." The information in row 3 is a mirror image of the information in row 1. This fact can be used to compress the tables (not shown above).

Note also that the received data is matched against only the first two columns of each row. Where multiple rows are matched, all are triggered. In the table above, "received from A/N1" matches two rows, one "then send to B/N1" and one "then send to C/N2."

As the play session is started and participants join it, the NAAS server system is updated with these rules. As participants leave, the rules corresponding to the participant are removed. Any data arriving from a source not in the table is ignored.

Note that A only sends one copy of the data to NAAS. NAAS forwards two copies, one to B and one to C.

The NAAS server can be implemented with or without download aggregation, if desired. For example, download aggregation cannot be provided, and upload scattering and path optimization can be provided by the NAAS server systems. As such, when not all the participants in a session are enabled to use NAAS, then those participants do not get to use the features of NAAS directly. They will continue to send packets individually to each other participant. But instead of sending to NAAS participants directly, they will send to the appropriate NAAS address for such participants instead.

For traffic that goes through the NAAS server system, single stream up packet communications and multicast out packet communications to other MNs in the music session can be used. This multicasting saves bandwidth and packet rate on the sending MN, and can also enable delivery of bandwidth hungry payload like video, which could otherwise require too much bandwidth to send to other MNs in the music session, for example, due to typically asymmetric bandwidth (e.g., constrained uplinks)

It is further noted that to connect MNs over greater distances via latency optimized links, MNs may connect to different NAAS server systems, and the different NAAS server systems can be connected with a high-speed backbone, or direct communication links can be provided between such NAAS server servers. It is also noted that if all MNs in a session are connected (e.g., proxied) through a NAAS server system, the MNs can have the NAAS server capture and process audio or video plus audio recordings, download them after the session to the MNs, and/or upload them automatically to another network destination (e.g., YouTube, etc.). It is further noted that if MNs in a session are connected(e.g., proxied) through a NAAS server system, the MNs can have the NAAS server mix the audio data from the MNs at the NAAS server system and send back the fully processed and mixed audio data (e.g., audio mix) to each MN in the music session. This avoids each MN from processing and mixing the streams of all MNs to form mixed audio. In addition, it is noted that the NAAS server system can be configured to store a recording of the audio mix within one or more data stored systems, and the NAAS server system can then broadcast the audio mix recording to one or more network destinations. It is still further noted that the NAAS server systems are preferably placed at IXPs (Internet Exchange Points) and directly connected to these IXPs. An IXP is the network infrastructure device or devices where the ISPs physically cross connect with each other and communicate peer traffic across their networks. As such, if a NAAS server system is physically co-located at an IXP, this NAAS server system will effectively be cross connected to the major ISPs that service a region through this IXP, and NAAS proxied latency will be minimized for MNs communicating through the NAAS server system.

Figure 19:
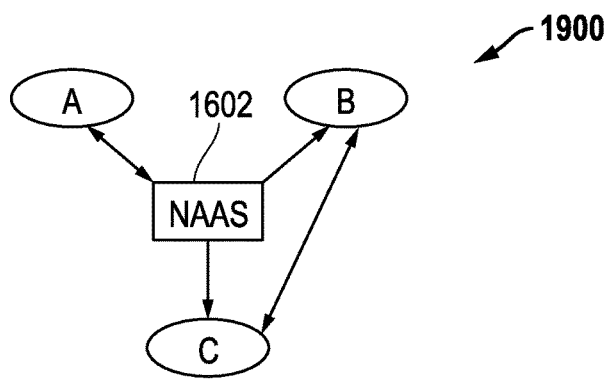
FIG. 19 is a block diagram of an embodiment including three music nodes (A, B, C) where only A is a NAAS participant.

FIG. 19 is a block diagram of an embodiment 1900 including three music nodes (A, B, C) where only A is a NAAS participant.

Supposing that B and C are not NAAS participants, and only A is a NAAS participant. The above table is modified as follows:

| If Received From | Using Interface | Then Send To | Using Interface |
|---|---|---|---|
| A | N1 | B | N1 |
| A | N1 | C | N2 |
| B | N1 | A | N1 |
| C | N2 | A | N1 |

The rules relating to B sending to C and C sending to B are absent. B and C must continue to send directly to each other:

In this way A sees a reduction in his upload bandwidth utilization, while B and C don't. A's data sent to B and C also enjoys path optimization, as does B and C's data sent to A. But B and C's data sent to each other is not path optimized, and neither B nor C sees any reduction in upload bandwidth utilization.

Note that if B is a NAAS user as well as A, then C will reap full benefits of being a NAAS member without having to pay. In general this is true whenever N−1 participants are NAAS users.

As described in the session setups below, automated discovery of lowest latency path from an end user MN to one interface on a NAAS server system can be determined, for example, by ping testing against all the interfaces/ISPs across some subset of the NAAS server systems in different regions. This automated discovery can also be repeated over time that the interface used by the MN is dynamically adjusted over time based upon the latency determination. Further, NAAS server systems pinged as part of this latency testing can be limited by parameters such as geographic location and related distances in order to avoid NAAS servers where geographic distances makes them an unlikely low latency candidate. Different NAAS server systems can also communicate with each other as part of this latency testing.

There is a possibility that, since A and B are on the same ISP network, that A and B would be better off sending directly to each other. A is now faced with a tradeoff: enjoy the benefit of upload scattering, or use the better path to B. In order to make that choice, A would need to test whether sending to B via N1 was better than sending directly to B. If the choice was made to use the direct path, NAAS would have to be told to remove any entries from the configuration table involving A to and from B. A would also want to test B's address first to see if it was indeed the best path to use.

Thus, each MN in a music session can make an automated determination of latency for peer-to-peer communications and latency for NAAS server communications (e.g., proxied latency) to see which latency is better with respect to communications to each other MN in the music session. The lowest latency communications can then be used for the music session. It is noted that the NAAS server latency can be determined for two MNs (e.g., MN1, MN2), for example, by adding MN1-to-NAAS latency plus NAAS-to-MN2 latency (e.g., equals NAAS proxied latency MN1 to MN2). This NAAS server latency can then be compared with latency for simple peer-to-peer (MN1-to-MN2) latency. The lower latency path can then be selected and used for communications for the music session.

It is further noted that if possible, this session traffic can be routed based on lowest latency connection determinations (e.g., peer-to-peer path or NAAS proxied path), and this can then be adjusted if packet rate or bandwidth constraints cause the lower latency path to be unsatisfactory for session communications. For example, if packet rate and/or bandwidth constraints present communication problems, an intelligent tradeoff can be made between the different connection paths (e.g., between the peer-to-peer path and the NAAS proxied path) so that communications stay within bandwidth and/or packet rate constraints while reducing average or median latency across the connections in the session. Further, MNs may continuously check the latency to NAAS/peers and may elect, or be directed by the NAAS server, to dynamically migrate connections to another NAAS or from NAAS mode to peer-to-peer mode (or vice-versa) if network conditions or NAAS load parameters or other parameters indicate these adjustments are to be made. For example, a ping test can be followed by a decision to migrate that causes an MN to leave and re-join a music session with the new parameters in effect. Other variations could also be implemented while still taking advantage of this session migration, and a variety of session migrate protocols can be used to make a determination of when an MN migrates and/or is instructed to migrate by the server.

Session Setup with NAAS

Setting up a session with NAAS (everyone enabled) looks like this:
1. A starts the session
2. A told to test NAAS addresses (N1, N2, N3, N4)
3. A determines that N1 has the lowest latency
4. B joins the session
5. B told to test NAAS addresses (N1, N2, N3, N4)
6. B determines that N1 has the lowest latency
7. NAAS is told to add a rule (A, N1, B, N1)*
8. B is told about A (N1)**
9. A is told about B (N1)
10. C joins the session
11. C told to test NAAS addresses (N1, N2, N3, N4)
12. C determines that N2 has the lowest latency
13. NAAS is told to add a rule (A, N1, C, N2)
14. NAAS is told to add a rule (B, N1, C, N2)
15. C is told about A (N2)
16. C is told about B (N2)
17. A is told about C (N1)***
18. B is told about C (N1)
* The notation "add a rule (A, X, B, Y)" means "add a rule that when data shows up from A using X it is sent to B using Y and vice versa."
** The notation "told about A (X)" means "told that A has joined the session and audio data should be sent to address X."
*** When A is told about B (N) and later C (N), A only needs to send to N once. NAAS will then send the data to both B and C. The jam software should only send to whatever unique collection of addresses it has. (NAAS users will only have the one address they picked, but for non-NAAS users not all the addresses will be unique.)

Figure 21A:
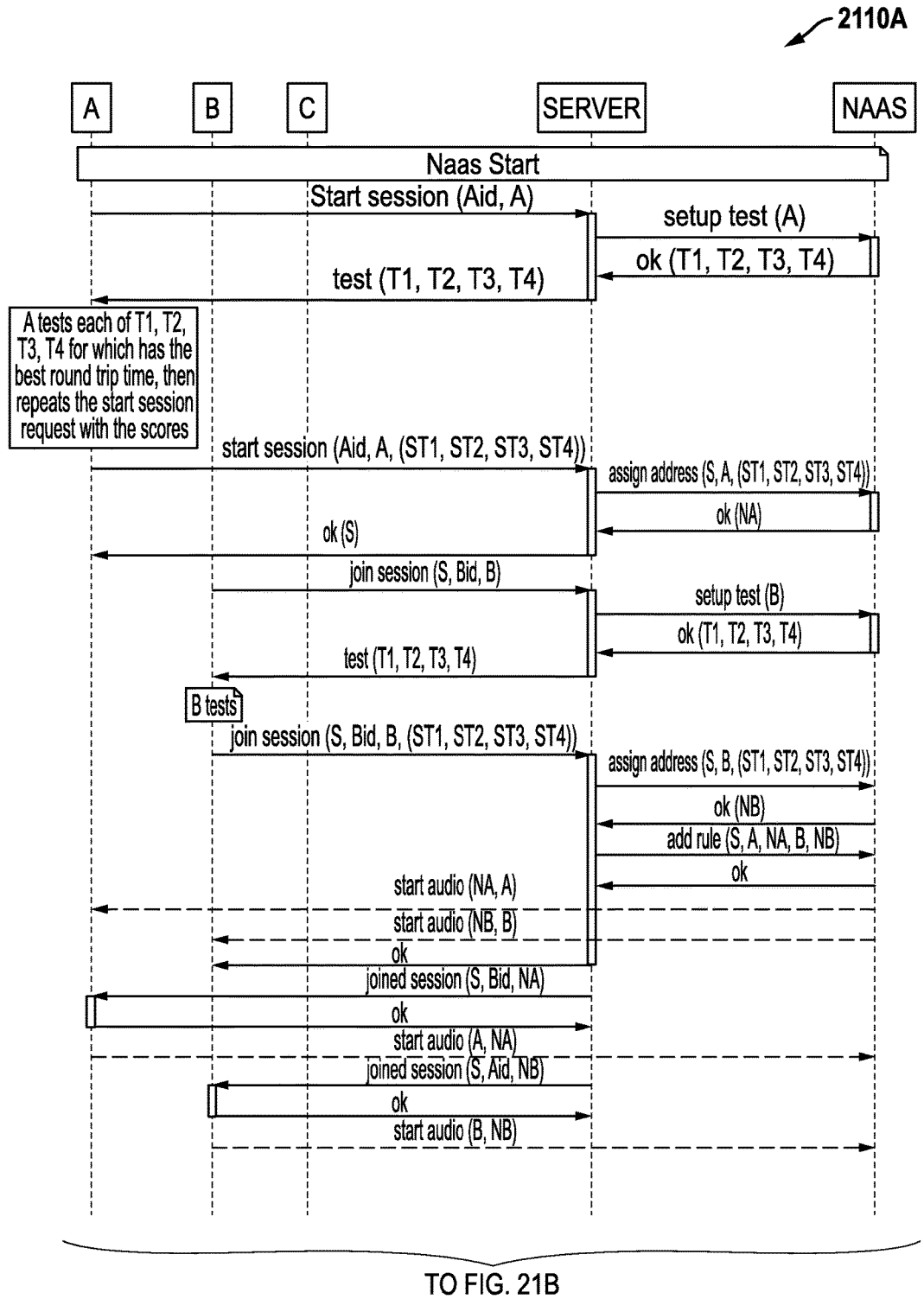
FIGS. 21A-B provide a swim lane diagram of an example embodiment for a music session start by music node A where music nodes B and C then join the session and where all three nodes (A, B, C) are NAAS participants.
Figure 21B:
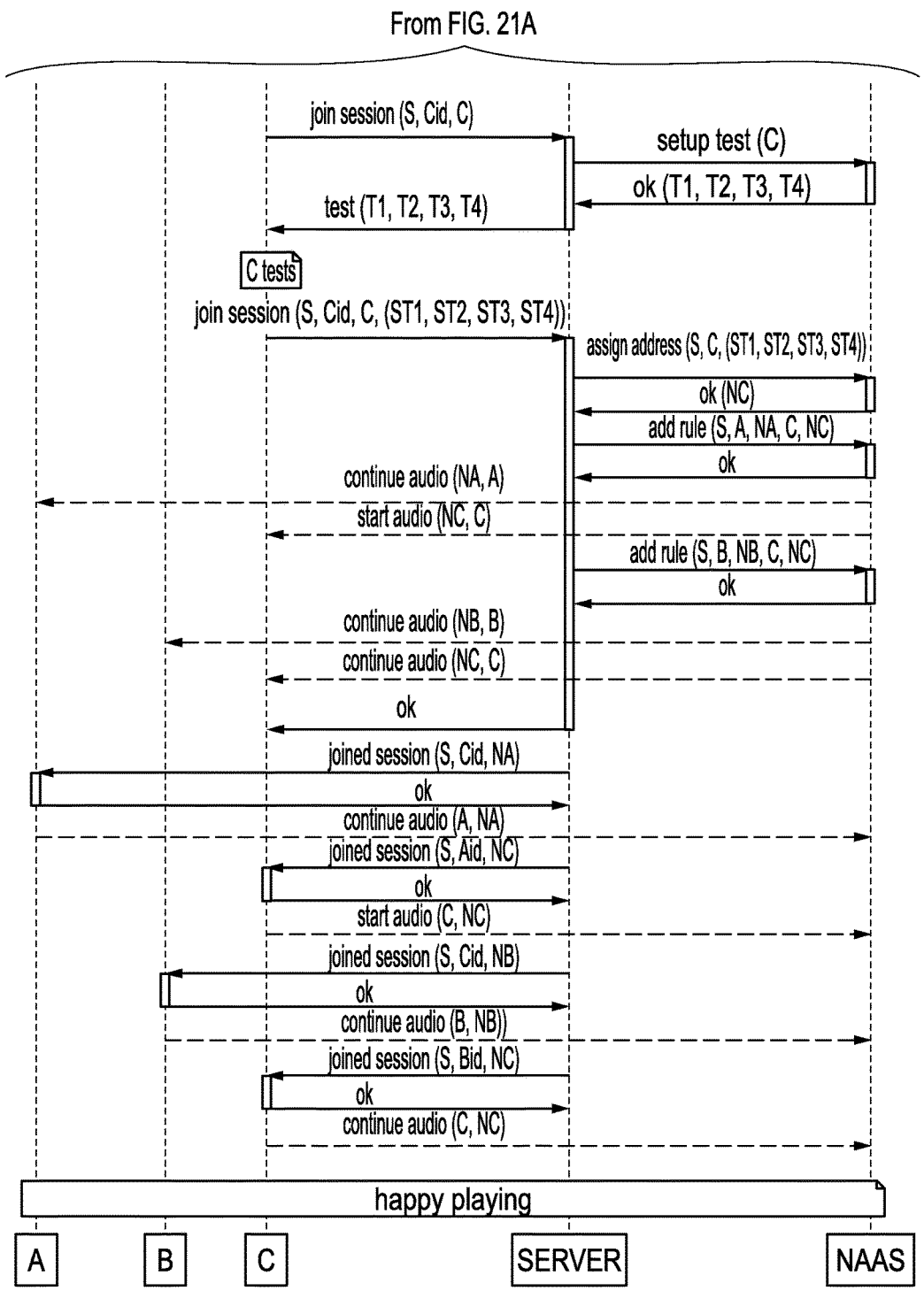

FIGS. 21A-B provides a swim lane diagram of an example embodiment for a music session start by music node A where music nodes B and C then join the session and where all three nodes (A, B, C) are NAAS participants. The swim lane diagram includes the NAAS server, the interactive music system server, and music nodes A, B, and C. Also, it is noted that embodiment 2110A in FIG. 21A is connects at the bottom to the top of embodiment 2210B in FIG. 21B.

Figure 21C:
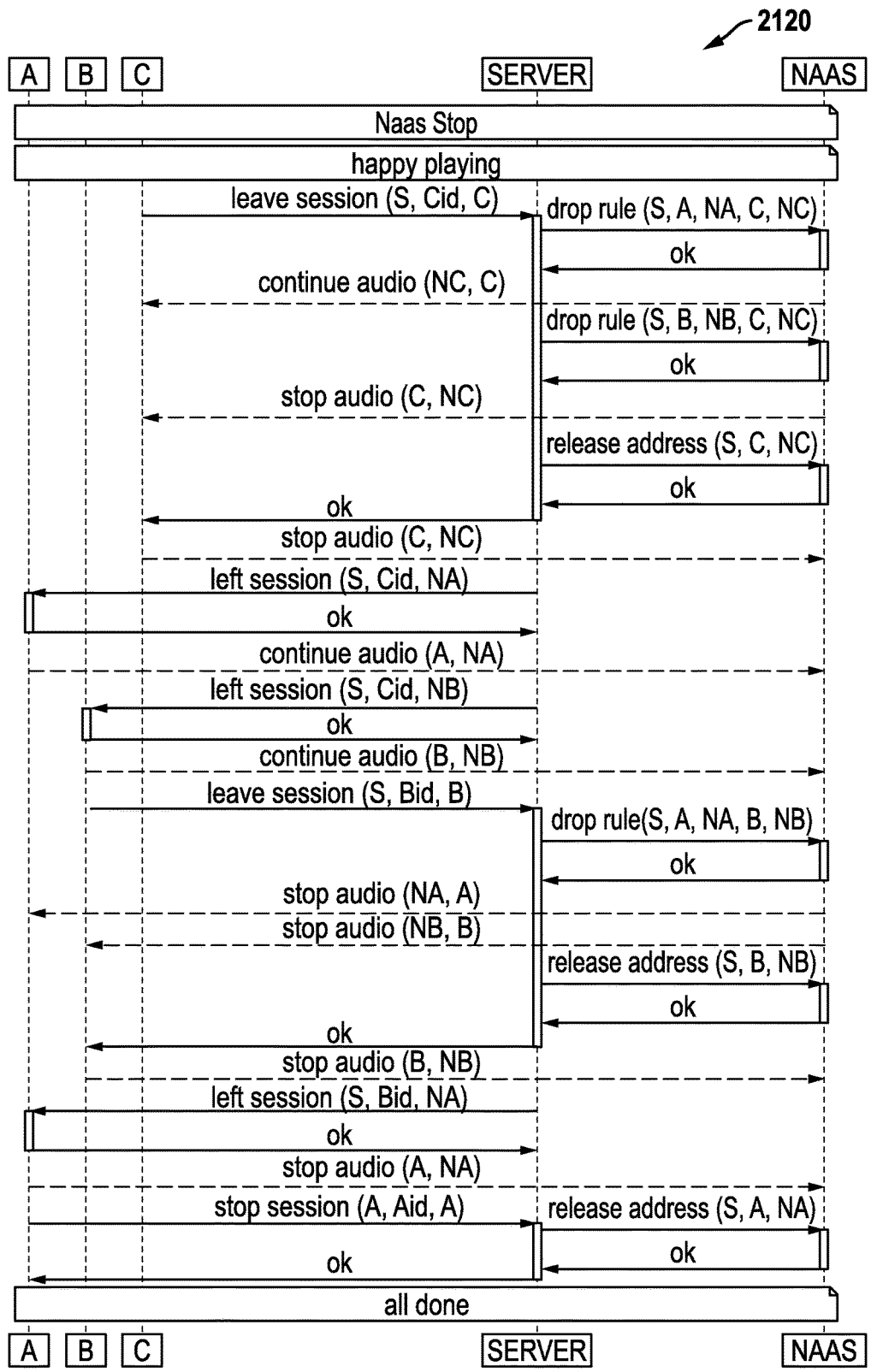
FIG. 21C is a swim lane diagram of an example embodiment for a music session stop where music nodes B and C leave the session and where all three nodes (A, B, C) are NAAS participants.

FIG. 21C is a swim lane diagram of an example embodiment 2120 for a music session stop where music nodes B and C leave the session and where all three nodes (A, B, C) are NAAS participants. The swim lane diagram includes the NAAS server, the interactive music system server, and music nodes A, B, and C.

Session Setup with Mixed NAAS and Non-NAAS

Setting up a session with A enabled for NAAS while B and C are not (changes are bracketed and italicized):
1. A starts the session
2. A told to test NAAS addresses (N1, N2, N3, N4)
3. A determines that N1 has the lowest latency
4. B joins the session
5. B told to test NAAS addresses (N1, N2, N3, N4)
6. B determines that N1 has the lowest latency
7. NAAS is told to add a rule (A, N1, B, N1)
8. B is told about A (N1)
9. A is told about B (N1)
10. C joins the session
11. C told to test NAAS addresses (N1, N2, N3, N4)
12. C determines that N2 has the lowest latency
13. NAAS is told to add a rule (A, N1, C, N2)
14. [NAAS is told to add a rule (B, NJ, C, N2)]
  * because B and C are not members
15. C is told about A (N2)
16. C is told about B [(N2)]
17. A is told about C (N1)
18. B is told about C [(NJ)]

Note that NAAS was not told about B to/from C, and B was told to send to C instead of C (N1), and vice versa for C sending to B instead of B (N2).

Figure 22A:
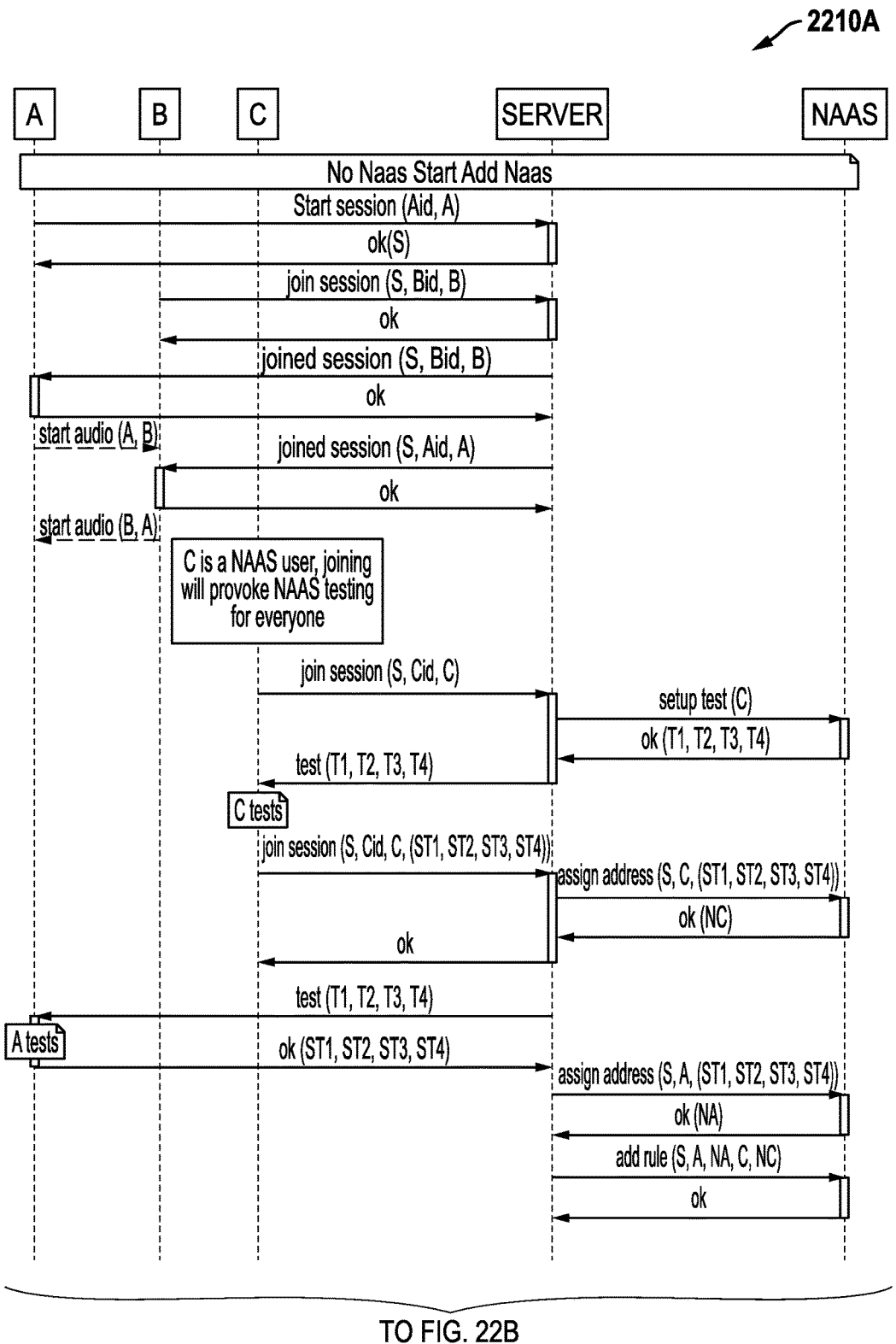
FIGS. 22A-B provide a swim lane diagram of an example embodiment for a music session start by music node A where music nodes B and C then join the session and where only music node C is a NAAS participants.
Figure 22B:
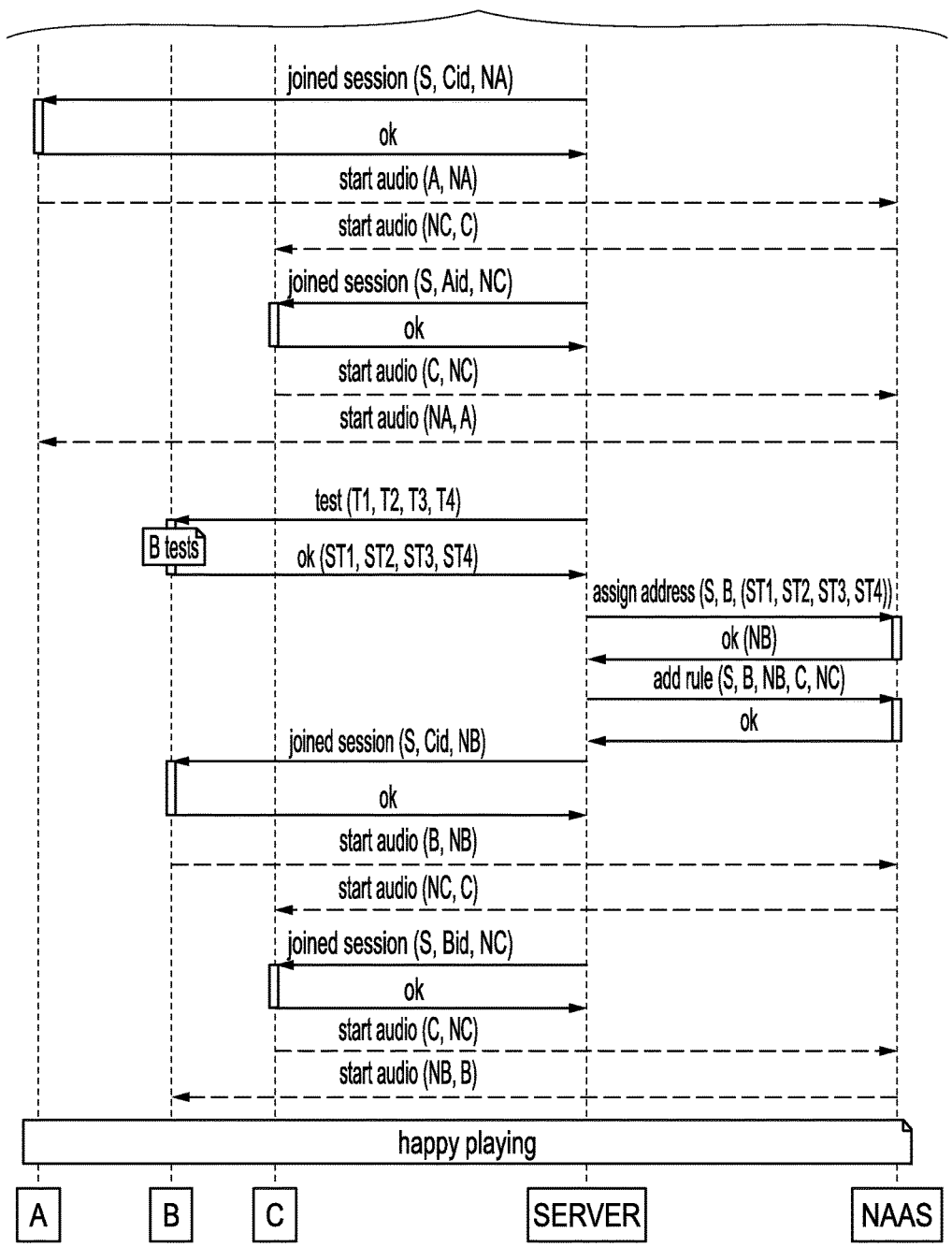

FIGS. 22A-B provide a swim lane diagram of an example embodiment for a music session start by music node A where music nodes B and C then join the session and where only music node C is a NAAS participants. The swim lane diagram includes the NAAS server, the interactive music system server, and music nodes A, B, and C. Also, it is noted that embodiment 2110A in FIG. 21A is connects at the bottom to the top of embodiment 2210B in FIG. 21B.

Figure 22C:
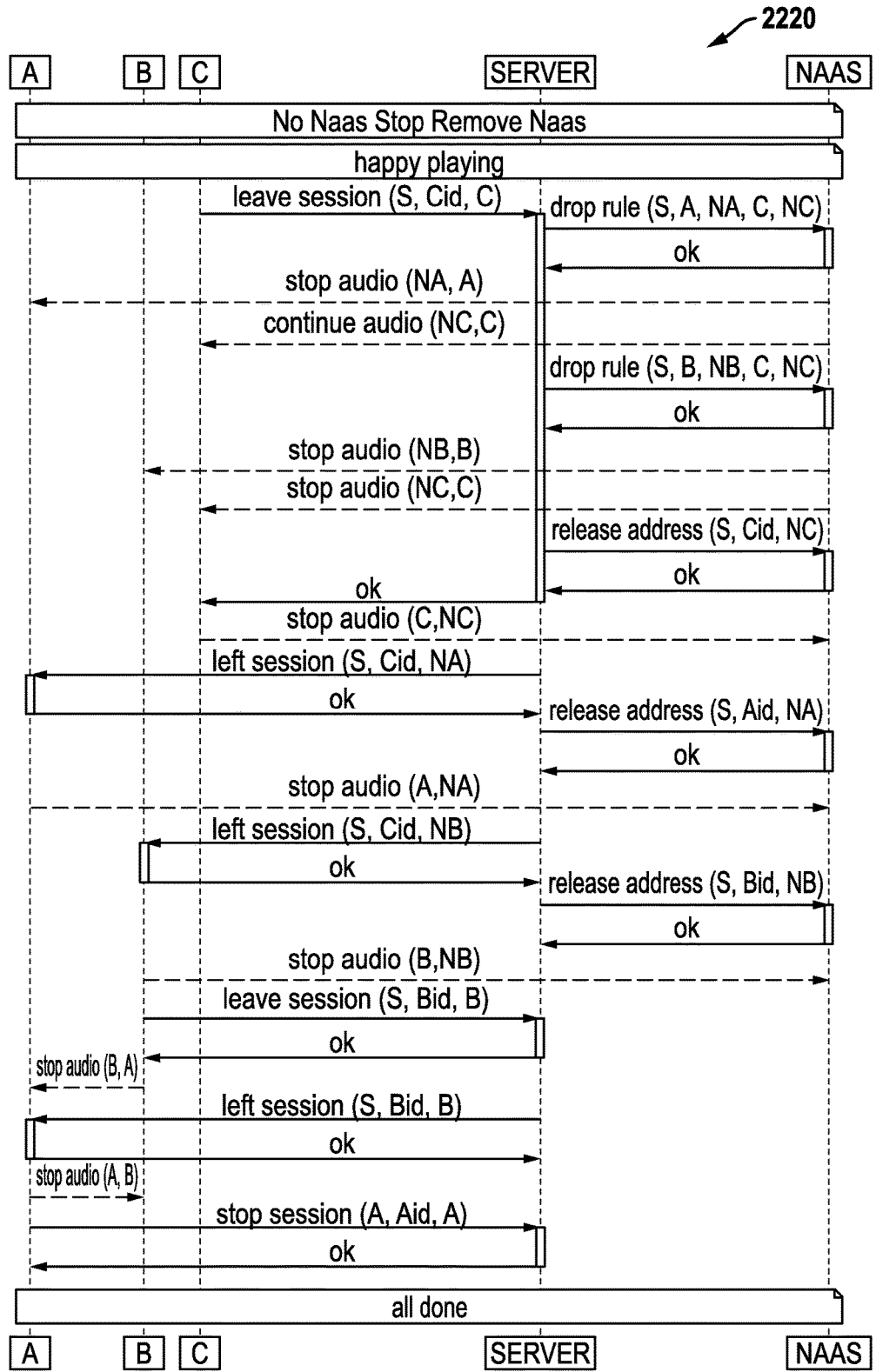
FIG. 22C is a swim lane diagram of an example embodiment for a music session stop where music nodes B and C leave the session and where only music node C is a NAAS participants.

FIG. 22C is a swim lane diagram of an example embodiment 2120 for a music session stop where music nodes B and C leave the session and where only music node C is a NAAS participants. The swim lane diagram includes the NAAS server, the interactive music system server, and music nodes A, B, and C. L Message Sequence Diagrams Example control messages and sequences for setup and tear down are provided with respect to FIGS. 20A-B, 21A-C, and 22A-C as indicated above. It is noted that for these swim lane diagrams testing is shown once, and then left it out of the main diagrams for simplicity. Start and stop are similar and are also shown once then omitted for simplicity. Further, it is noted that these swim lane diagrams provide example embodiments, and variations could be implemented.

Looking to the message sequence diagrams, FIG. 20A shows the session management messages that flow between music nodes when no NAAS is involved. In this flow, there are three music nodes A, B and C. Each MN have a unique session id respectfully Aid, Bid, Cid. When a MN sends a message, the message includes its IP (Internet Protocol) address/name, session id and the id of the peer that it wants the message to be delivered. The server uses this information to validate the source and destination before relaying the message to the destination music node. In FIG. 20A, A sends a "start session (Aid, A)" message to server. The server uses the information in the message to instantiate a session object with id S, with the properties that A requested. The server returns S to A. Properties of the session can include the genre of music, the skill level of musicians that may join the session, whether the session is public or private, etc. A session object in the server is searchable by users looking for music sessions to join.

After the creation of session S, by A, user at music node B discovers the session by one of several methods. The server may sends a notification message (e.g., email or instant message) to user at B, inviting the user to join the session. The user at B may also search the server and discover the existence of session S. After the user at B discovers the existence of session S, the server provides a join session link for S that user at B clicks to request to join the session. Thus, a user at music node B sends a join session message from B to the server as "join session (S, Bid, B)". The server validates the existence of S and that user at music node B has the rights to join it, and if true, adds music node B to the session and returns OK. If B is not allowed join the session, no further communication occurs to B with respect to the session.

At this point, the server notifies music node A that music node B has joined the session with the message to A, "join session (S, Bid, B)". Concurrently a message is sent to music node B with the message "join session (S, Aid, A)". When these messages are received at A and B respectfully, they now have each other's session id and music node name/IP address. This information is used by music node B to send a message via the sever to music node A as "start audio (A, B)". Similarly music node A sends a message to B with request "start audio (B, A)". Both A and B use the server to negotiating the message flow needed to allow them to send audio to each other.

Similarly to the user at music node B, a user at music node C discovers session S and requests to join with a message to the server, "join session (S, Cid, C)". If C is allowed to join S, then the server notifies A and B that C has joined the session with message "join session (S, Cid, C)". Concurrently, C is notified to join sessions with B and A with "join session (S, Aid, A)" and "join session (S, Bid, B)". The successful execution of the join session messages is followed by messages "start audio (A, C)", "start audio (B, C)" initiated by C to A and B respectively. Similarly A sends message "start audio (C, A)" to C, and B sends "start audio (B, C)" to C.

Music nodes A, B and C are now in session S.

FIG. 20B shows the graceful process of leaving a session when no NAAS is involved. A graceful departure from a session implies that the user at the music node (MN) requested to leave. An ungraceful departure happens when the music node (MN) is no longer able to communicate with the music node (MN) peers or with the server. In this case, the heart-beat messages that flow from the music node to the server stops and the server proceeds to remove the music node from the session by sending messages to nodes that are still in the session that carry the same message as if the unresponsive node had requested to leave the session.

The user at music node C requests to leave the session S. Music node C sends a message to the server "leave session (S, Cid, C)". The server then sends messages to A and B respectfully, "left session (S, Cid, C)". Concurrently, C sends messages to A and B to stop audio messages. C sends "stop audio (C, A)" to A and to B it sends "stop audio (C, B)". The server removes C from session and nodes A and B removes C as a peer that they will communicate with in the session.

Similarly, when music node B leaves the session, it sends to server "leave session (S, Bid, B)". The server then sends message "left session (S, Bid, B)" to A. Music node B also concurrently sends "stop audio (B, A)" to music node A. Music node A removes B from the set of peers it will communicate with. The server removes B from the music nodes in the session S.

Finally, music node A leaves the session and being the creator of the session, it may choose to terminate the session with a message "stop session (S, Aid, A)". Otherwise it sends message "leave session (S, Aid, A)" to the server. Typically, the stop session is implicit, when the last node in the session leaves the session. When the server receives this message, it deletes the session object and by definition, the session ceases to exist.

FIG. 21A shows the message flow for a music session setup where a NAAS server is involved. Here the NAAS server has four ISP (Internet Service Provider) terminations T1, T2, T3 and T4 respectively. The NAAS server is hosted at an Internet exchange point, where it can have direct connection into networks of various ISP vendors, represented by connections T1, T2, T3 and T4. The number of ISP terminations can be more or less. Logically, the NAAS may be viewed as being a super music node, that is has access rights to all music sessions. The service uses business logic to filter user music nodes that may participate in a session with the NAAS.

In this flow, music node A starts a session by sending a "start session (Aid, A)" message to the server. If music node A is not allowed to use the NAAS, the logic described before in FIG. 20A is followed. If A is allowed to use the NAAS, then the server sends a message to the NAAS informing it that A is joining the session. This message is called a setup (A). The semantics of a setup message is that A should invoke algorithm that test which ISP termination (T1-T4) on the NAAS gives the lowest latency of communication between the NAAS and music node A.

If the NAAS is able to accommodate more clients, it replies to the setup message to the server with "ok (T1, . . . , T4)". The NAAS registers music node name A as a node that it is authorized to communicate. The server forwards a message to music node A to test which interface on the NAAS it has the lowest latency communication, "test (T1, T2,T3,T4)". Music node A invokes a network latency-testing algorithm, and the NAAS generates start session update message to server with latency information from the NAAS, "start session (Aid, A, (ST1, ST2, ST3, ST4))". The server instantiates the session S and replies OK to A. The server relays this information to the NAAS as "assign address (S, A, (ST1, ST2, ST3, ST4))" which caches this information by associating the interface with the lowest music node A and session S. If two or more interfaces have the same delay, an algorithm is used to select one (e.g., load balancing, lower mac address, etc.). It also binds the interface address with the lowest latency to A, as the preferred address that it will use to send messages to music node A. This interface is referred to as NA. The NAAS replies OK to successfully caching and binding from a "assign address" message.

Later, the user at music node B discovers session S and initiates a request to the server with "join session (S, Bid, B)". Similar to A, the process described for a "test (T1,T2, T3,T4)" is invoked with music node B to find the lowest latency to the NAAS. Music node B ultimately replies to the server with "join session (S, Bid, B, (ST1, ST2, ST3, ST4))" which results in message "assign address (S, B, (ST1, ST2, ST3, ST4))" sent to NAAS. The NAAS determines which ISP/network interface is the lowest latency path for communicating with B and binds that interface with B and session S. This interface is referred to as NB. It also uses the session id S, to recognize that music nodes A and B need to communicate and add a forwarding rule "add rule (S, A, NA, B, NB)". This rule authorizes messages to flow between node A and B in session S via interface NA and NB. The NAAS replies OK to the "assign address" message and the server then relays OK to B's "join session" request. The reply to B carries the NAAS network interface for A that B should use to communicate with music node A.

Concurrently, the server sends message "join session (S, Bid, NA)" to music node A and "join session (S, Aid, NB)" to music node B. Music nodes A and B do not send messages directly to the network address of each other. Rather, they send messages to each other via the NAAS, which serves as a packet relay. As such, at this point the NAAS instructs both A and B to start sending audio with command "start audio (NA, A)" and "start audio (NB, B)". Music node A sends audio messages to B by sending to the NAAS interface IP address NA. The NAAS receives the message from A, determines the message destination is music node B, and relays the message to B by sending it out interface NB to music node B IP address. Similarly, messages from B to A are sent to the NAAS address NB. The NAAS determines the destination of the message is music node A and sends the packet out network interface NA to music node A. Thus, audio flows between A and B relayed via the lowest latency path they have to the NAAS.

FIG. 21B illustrates the message flow that occur when music node C requests to join a session that includes music nodes A and B which are already in a session with a NAAS as shown in FIG. 21A. As before, the server instructs C to perform a latency test against the NAAS with test (T1,T2, T3,T4)". Music node C then reports the result to the server which then sends "assign address (S, C, (ST1, ST2, ST3, ST4))" to the NAAS server. The NAAS binds the corresponding lowest latency interface NC to node C. The NAAS uses the session id S, to determine that C is joining the session involving music nodes A and B, and adds forwarding rules "add rule (S, A, NA, C, NC)" and "add rule (S, B, BA, C, NC)". This authorizes the flow of packets between music nodes A, B and C.

The server then notifies A and B that C has joined the session with "join session (S, Cid, NA)" and "join session (S, Cid, NB)" sent to A and B respectively. Similarly, messages "join session (S, Aid, NC)" and "join session (S, Bid, NC)" are sent to music node C. Thus C send messages to NAAS address NC to communicate with A and B.

With these rules in place, "continue audio" messages are sent to nodes A and B to "start audio" messages to node C. It is noted that because the NAAS handles packet relay to music node C, music nodes A and B do not need to do anything further to send audio to music node C. Any audio packet by any music node in session S will be broadcasted by the NAAS to the member music nodes using the bounded interface for communicating with the destination music node. Music node C is also told to start sending audio to A and B by sending to NAAS address NC. The server command to music node C is "start audio (NC, C)".

A hybrid mode of operation is where the server may direct music nodes to use peer-to-peer latency test. If the latency between peers is lower than the path via a NAAS server, the server may direct the peers to use the non-NAAS mode of communication, described in FIGS. 20A and 20B.

FIG. 21C shows the message flow when music node C leaves a session involving a NAAS. Music node C sends message "leave session (S, Cid, C)". The message is relayed to the NAAS, which translates this as an action to drop the rules that allow communication with music node C in session S. Thus, the NAAS executes commands "drop rule (S, A, NA, C, NC)" and "drop rule (S, B, NB, C, NC)" and finally releases the binding of node C to interface NC with command "release address (S, C, NC)".

After each drop rule command, messages are sent to the corresponding music node to "stop audio (C, NC)". Finally, the server notifies the music nodes that C has left the session with "left session (S, Cid, NA)" and "left session (S, Cid, NB)" sent to music nodes A and B respectively.

Similarly, when music node B leaves the session, messages to remove the rules in NAAS that allow communication with B are issued, and the bindings interface binding for B is dropped. Finally, music node A leaves the session by requesting a "session stop (A, Aid, A)". This causes all resources (e.g., forwarding rules and interface bindings) associated with session S at the NAAS to be released. The server also destroys the session object S.

FIGS. 22A-B illustrate the message flows when a mix of NAAS authorized and non-authorized music nodes are in a session. If all clients in a session are not authorized to use the NAAS service, then they will use the peer-to-peer message flow described earlier for FIGS. 20A and 20B. If all music nodes are NAAS authorized, the communication setup/tear down flow is described in FIGS. 21A and 21B. When a mixed authorization of music nodes access to a NAAS exist, it may cause the automatic elevation of the privileges of non-authorized nodes, so that a QoS/SLA (Quality of Service/Service Level Agreement) guarantee to the authorized music node can be met.

Looking back to FIGS. 22A-B, an initial case is shown where music nodes A and B are in a session that does not involve a NAAS. This result may be because they are not authorized, because the direct path latency between them is better than via a NAAS, or because of other sets of business logic or operational conditions (e.g., NAAS server is down for maintenance). The flow used for A and B to enter the session is as described earlier for FIG. 20A. When music node C attempts to join the session, the server determines that the NAAS should be used. Music node C is directed to perform latency against the NAAS interfaces T1, T2, T3 and T4. Ultimately an "assign address (S, C, (ST1, ST2, ST3, ST4))" is executed at the NAAS and music node C address is bound to lowest latency interface to the NAAS as NC.

The server recognizes that music node C is joining a session involving music nodes A and B that are in a non-NAAS session. As music node C is now bound to the NAAS, the server directs music nodes A and B to perform network test against the NAAS. This results in music node A and B. The message sequence shows the flow for music node A first joining C in the session (FIG. 22A), followed by a similar sequence to music node B (FIG. 22B). The message sequence is as described earlier in FIG. 21A for music node B and C joining music node A in a NAAS session. FIG. 22B shows the latter part of the session join sequence.

FIG. 22C shows the leave session sequence, which is similar to the case described in FIG. 21B. The last music node to leave the NAAS session destroys the session.

One further implementation is that the last NAAS authorized music node to leave the session causes the session to destroyed and rebuilt as non-NAAS music session.

Appendix B—Further Example Embodiments

This appendix provides further functional block diagram examples for the interactive music system and related music nodes (MNs) and server system(s).

Figure 23A:
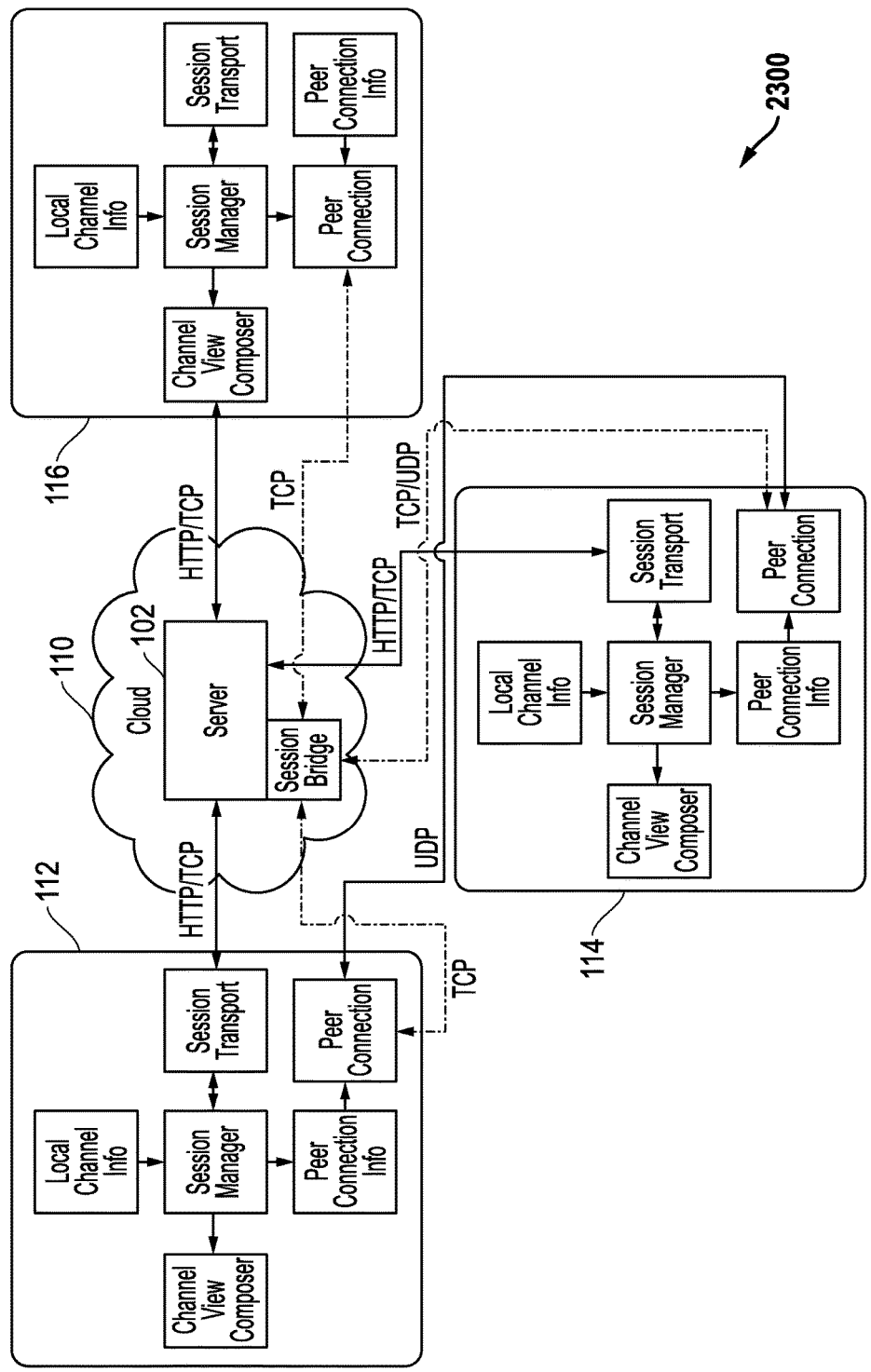
FIG. 23A is a block diagram of an example embodiment for internode session managers and data flow for an interactive music system including peer connections and sessions transport communications.

FIG. 23A is a block diagram of an example embodiment 2300 for internode session managers and data flow for the interactive music system including peer connections and session path transport communications. The MNs 112, 114, and 116 each include a music session manager that receives local channel (e.g., music track) information and uses peer connection information and peer connection block to communicate with the other MNs. These communications can be, for example, implemented using UDP packets, using TCP/UDP packets communicated through a session bridge associated with the server 102, and/or through some other network communication technique. Each MN 112, 114, and 116 also includes a session transport module that communicates with the server and each other through HTTP/TCP (hyper text transport protocol/transmission control protocol) packets. The session manager communicates with the session transport module and uses a channel view composer to display channel (e.g., music track) information to the user. The server 102 is connected to the MNs 112, 114, and 116 as a cloud-based service through the network 110.

Figure 23B:
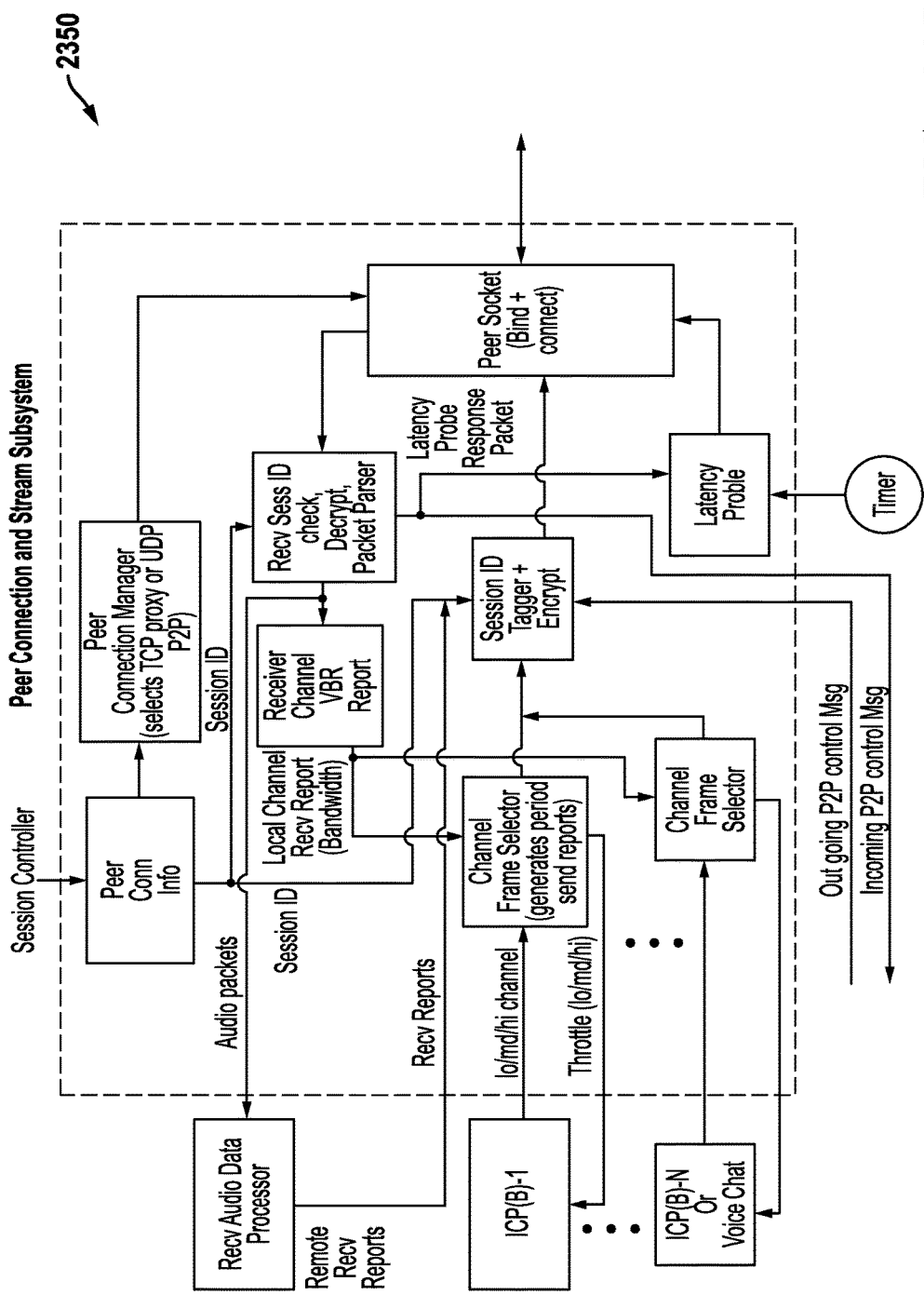
FIG. 23B is a block diagram of an example embodiment for peer connections.

FIG. 23B is a block diagram of an example embodiment 2350 for a peer connection block. A peer socket provides a communication interface for network communications with other MNs. A peer connection manager uses peer connection information to determine the communication protocol to use. For example, TCP can be used for communications through the server as a proxy, and UDP can be used for direct peer-to-peer communications. Input audio and chat data is received from ICPs and is formatted with additional session information for transport to the other MNs. Received audio packets from the other MNs are parsed and output to the receive audio data processor. Encryption of outgoing packets and decryption of incoming packets can also be used. A latency probe module generates probe and response packets for the latency probe operations for the MN.

Figure 24:
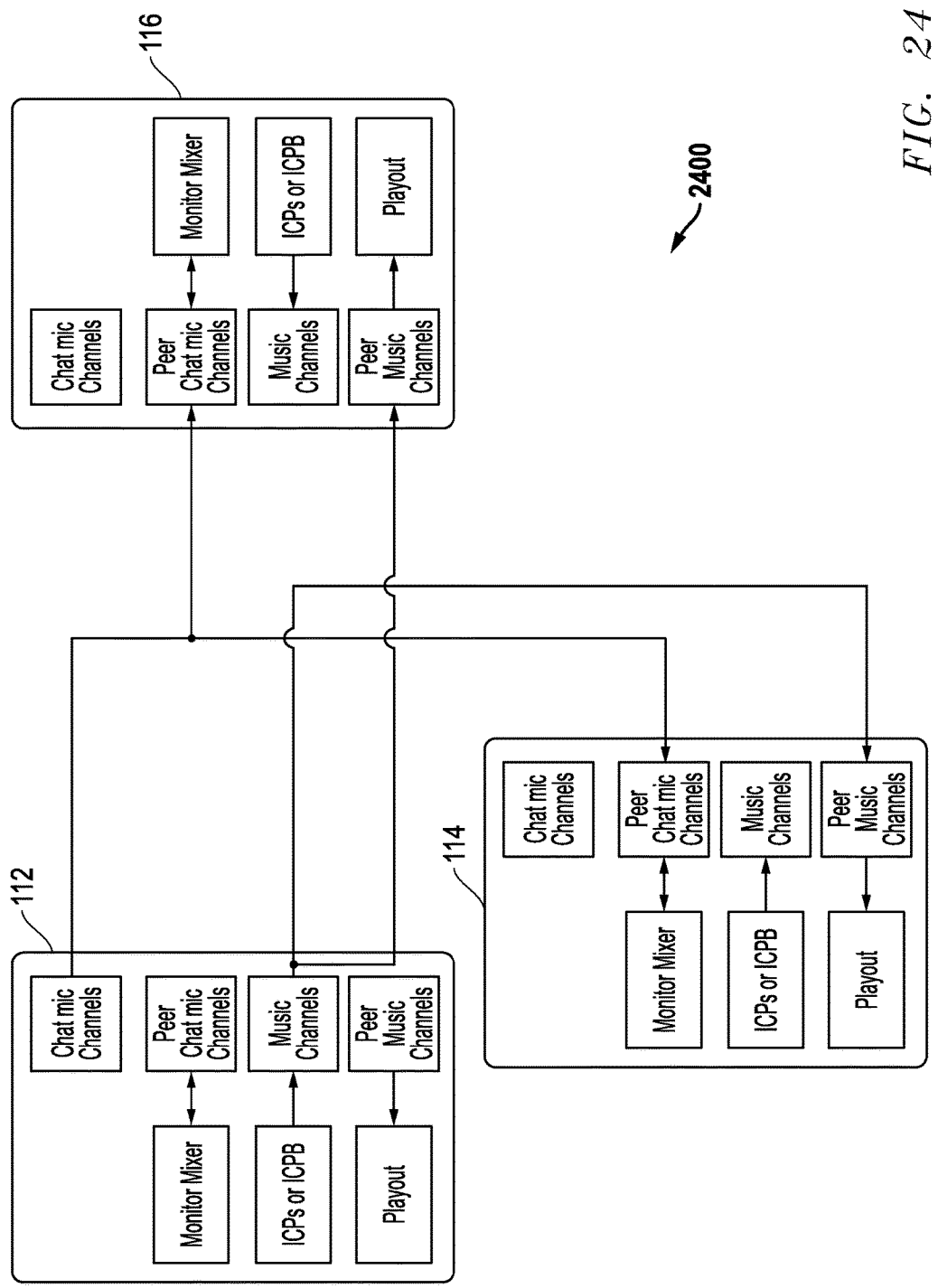
FIG. 24 is a block diagram of an example embodiment for music and chat communications from an MN to other MNs within a music session.

FIG. 24 is a block diagram of an example embodiment 2400 for music and chat communications from an MN to other MNs within a music session. Each of the MNs 112, 114, and 116 include a monitor mixer for chat channels, ICPs or a bonding ICP (ICPB), and a playout module. Chat channels and music channels are output by each MN. Peer chat channels are processed by the monitor mixer, and peer music channels are processed by the playout module. For the embodiment depicted, MN 112 is shown as communicating its chat microphone channel and its music channels to MNs 114 and 116. The uplink bandwidth can be represented by the sum of the chat microphone bandwidth (BW) plus the music channel bandwidth (BW) times the number of peers (e.g., Uplink Bandwith=(Chat Mic BW+Music Channel BW)*Peers). Fewer music channels help reduce bandwidth requirements hence the need for ICP bonding (e.g., at the loss of individual instrument channel control at the peer receiver). For example, if the chat microphone bandwidth is 32 Kb/s, the music channel bandwidth is 64 Kb/s, and a session includes 5 people, each person will need an uplink bandwidth of (32+64)*4=384 Kb/s.

Figure 25:
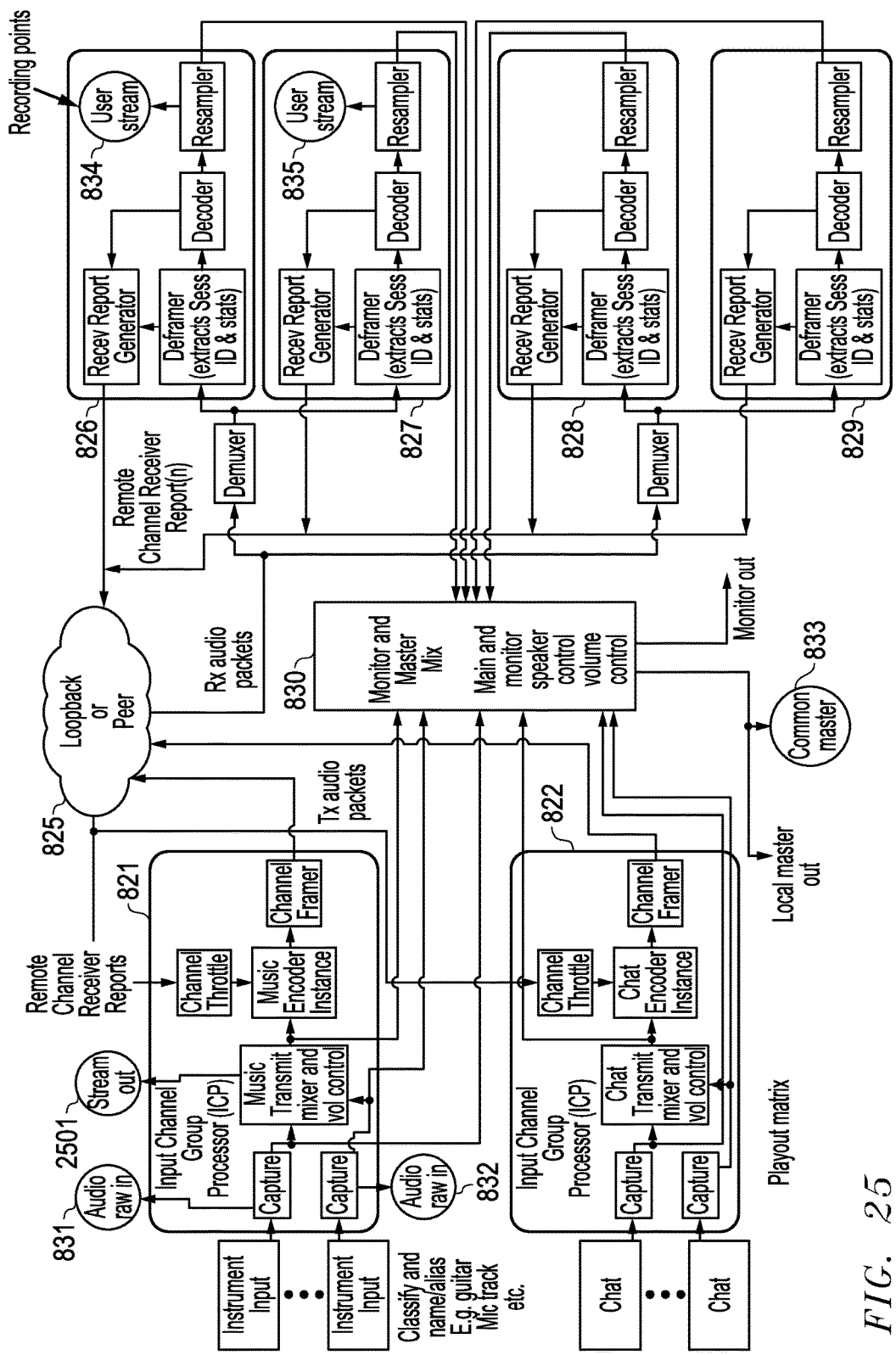
FIG. 25 is a block diagram of an example embodiment for a MN system embodiment including local ICPs (input channel processors) and peer ICPs (input channel processors).

FIG. 25 is a block diagram of an example embodiment 2500 for a MN system embodiment including local ICPs (input channel processors) and peer ICPs (input channel processors). Embodiment 2500 is similar to embodiment 820 of FIG. 8B with an additional recording point 2501 being shown. It is noted that other recording points could also be used.

Figure 26:
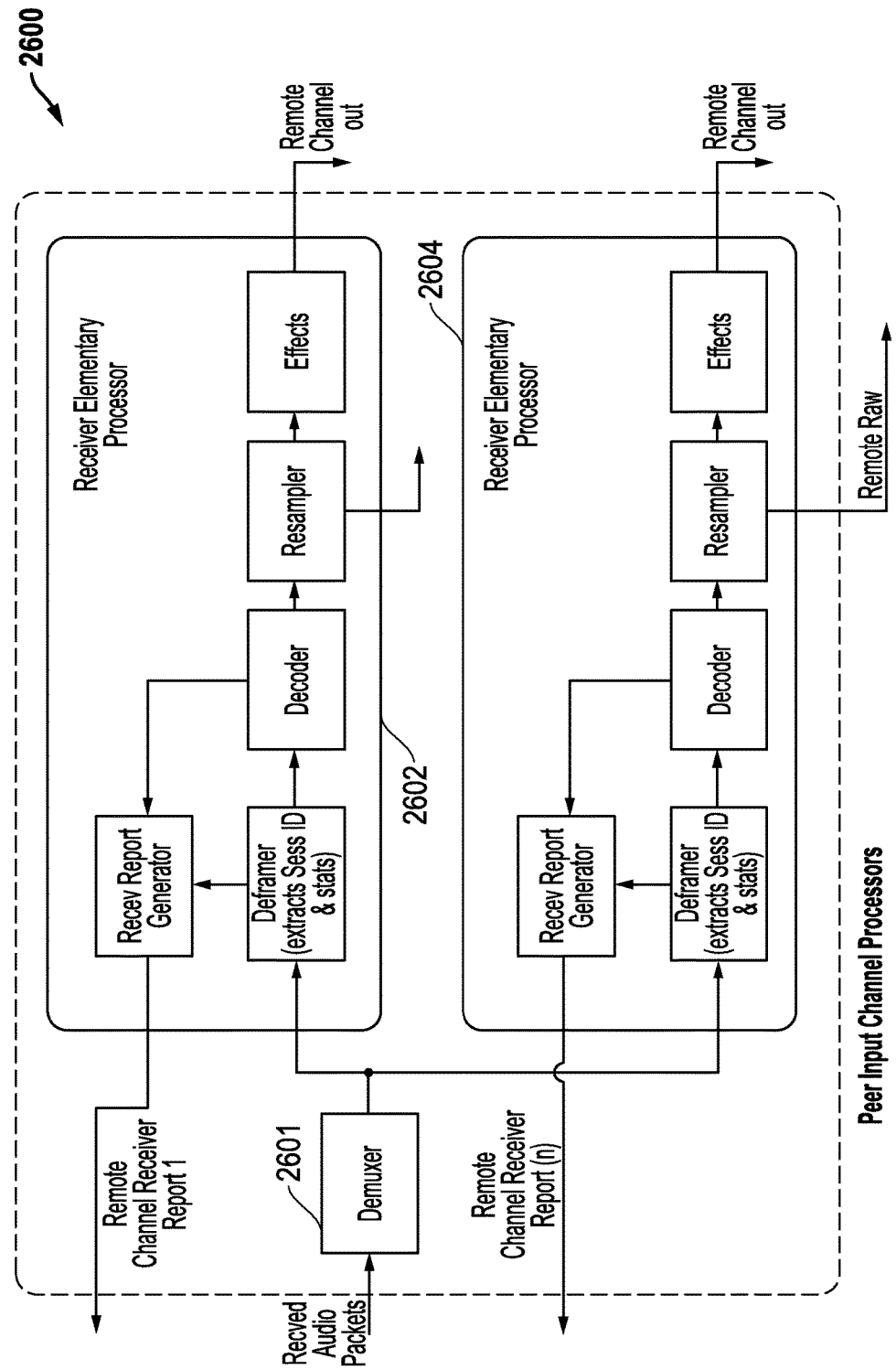
FIG. 26 is a block diagram of an example embodiment for a peer input channel processor.

FIG. 26 is a block diagram of an example embodiment 2600 for a peer input channel processor. Audio packets from peer MNs are received and de-multiplexed by a de-multiplexer (demuxer) 2601. The demuxed audio packets for a first peer MN are provided to receive processor 2602. This continues for each peer MN with the demuxed audio packets for an Nth peer MN being provided to receive processor 2604. Each of the receive processors 2602 . . . 2604 include a deframer (e.g., extracts session identifier, session statistics, etc.), a receive report generator, a decoder, a resampler, and an effects module. Each of the receive processors 2602 . . . 2604 provides a remote channel out for peer MN it is handling and also provides a raw remote audio output for that peer MN, as well.

Figure 27A:
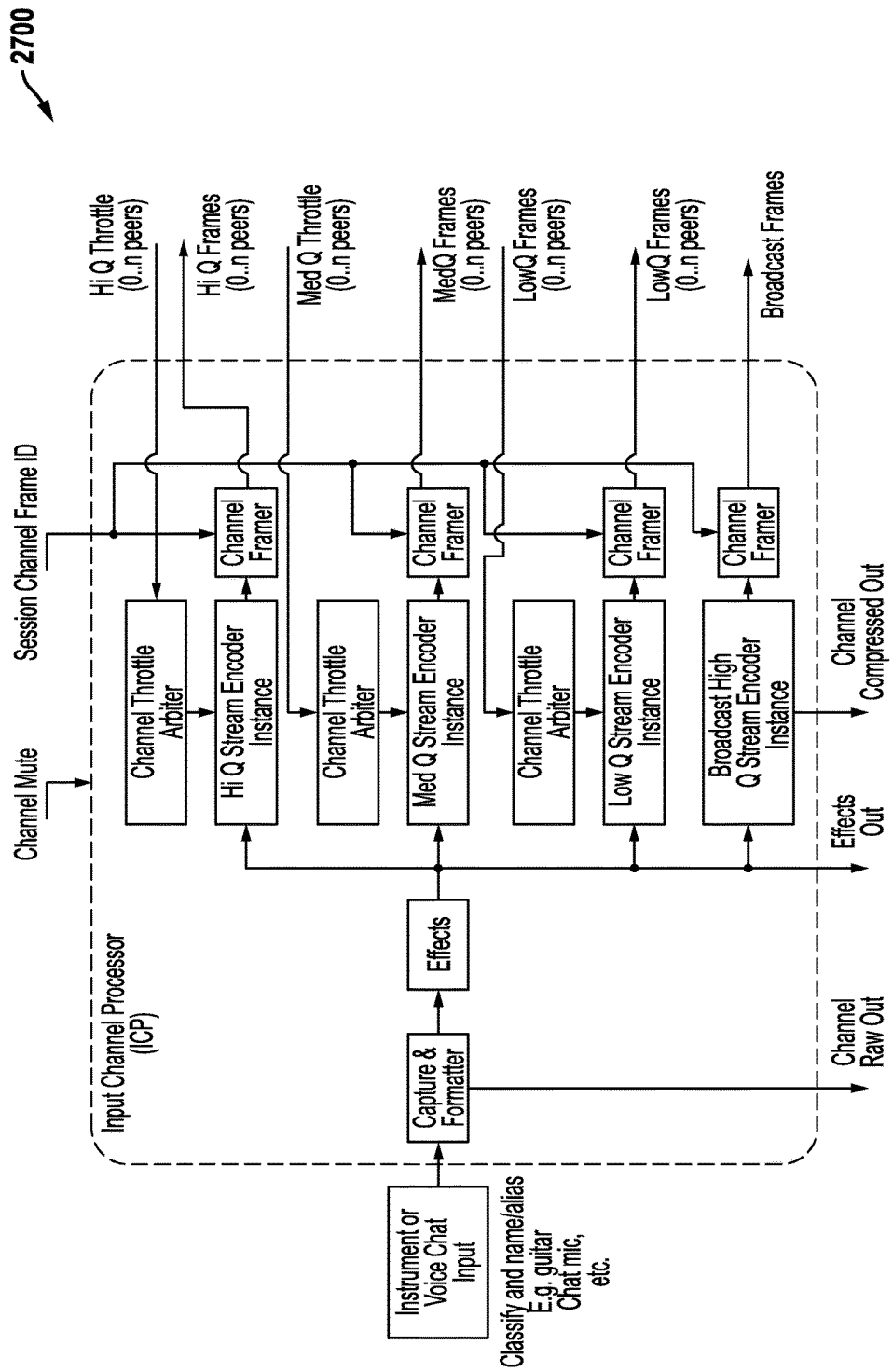
FIG. 27A is a block diagram of an example embodiment for a local input channel processor that captures audio inputs from an instrument (e.g., guitar, keyboard, voice, etc.), voice chat, or another audio input.

FIG. 27A is a block diagram of an example embodiment 2700 for a local input channel processor that captures audio inputs an instrument (e.g., guitar, keyboard, voice, etc.), voice chat, or another audio input. Instrument or voice input is captured by a capture and formatter block and then provided to an effects block. Raw captured audio and effects audio are both output. A channel throttle arbiter, a stream encoder, and a channel framer are provided for high quality stream processing, medium quality stream processing, and low quality stream processing of the captured audio. A high quality broadcast encoder also receives the captured audio, and a channel framer receives the output of the high quality broadcast encoder. High quality, medium quality, and low quality throttle control signals associated with the peer MNs (e.g., from 0 to n peer MNs) are received by the channel throttle arbiters, respectively. The ICP outputs high quality audio frames, medium quality audio frames, and low quality audio frames to the peer MNs based upon these control signals. Broadcast frames are also output by the ICP. Other inputs and outputs are also provided.

Figure 27B:
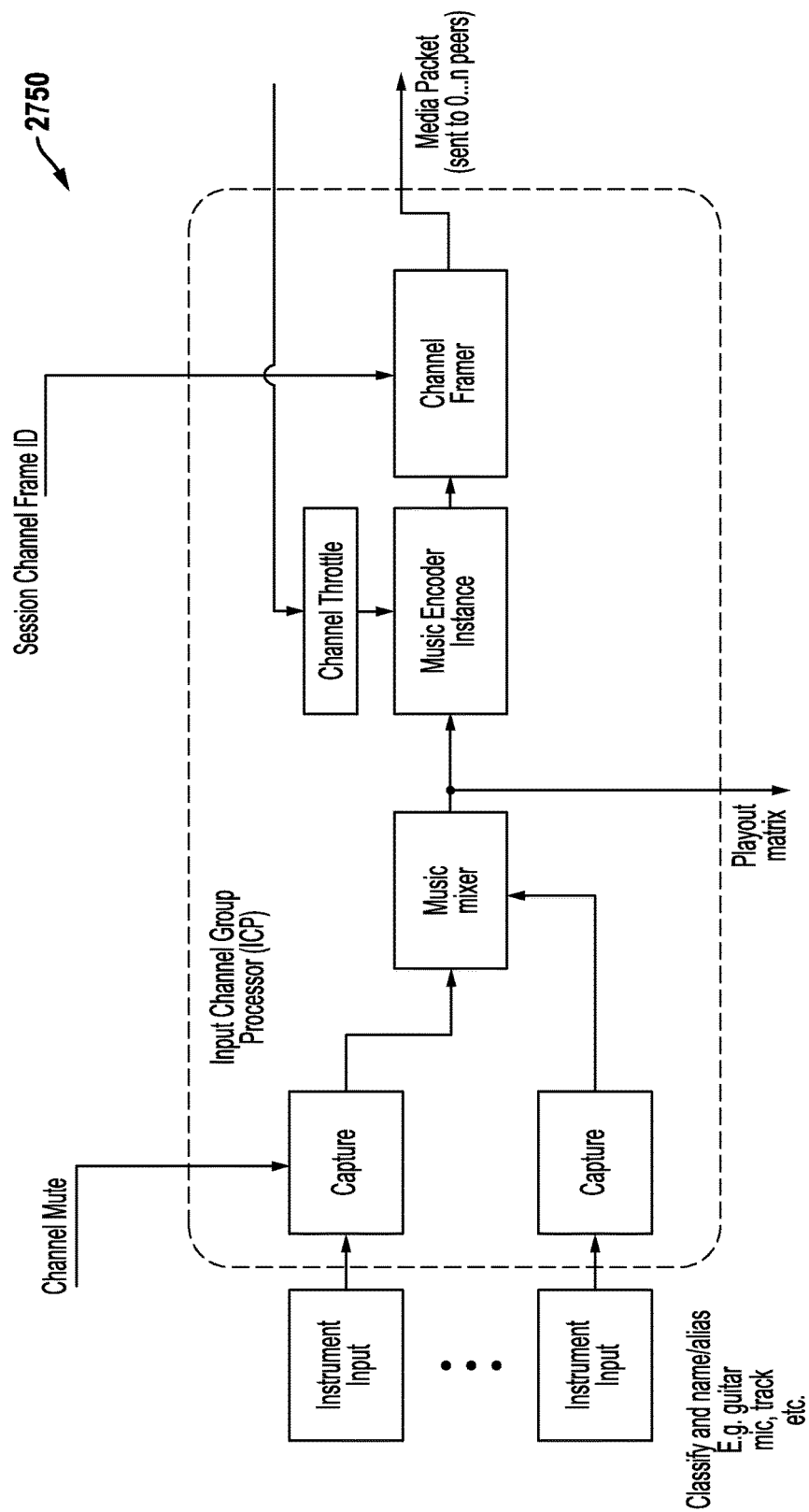
FIG. 27B is a block diagram of an example embodiment for a local input channel processor that captures audio inputs for a group of instruments.

FIG. 27B is a block diagram of an example embodiment 2750 for a local input channel processor that captures audio inputs and bonds them together for a group of instruments. Multiple instrument or voice inputs are captured by capture blocks and the captured audio inputs are mixed together by a music mixer to generate a group audio output. The output of the mixer is received by an encoder, and the encoded audio is provided to a channel framer. The channel framer outputs the group media packets to the peer MNs (e.g., from 0 to n peer MNs). A channel throttle receives controls from the peer MNs and provides controls to the music encoder. Other inputs and outputs are also provided.

Figure 27C:
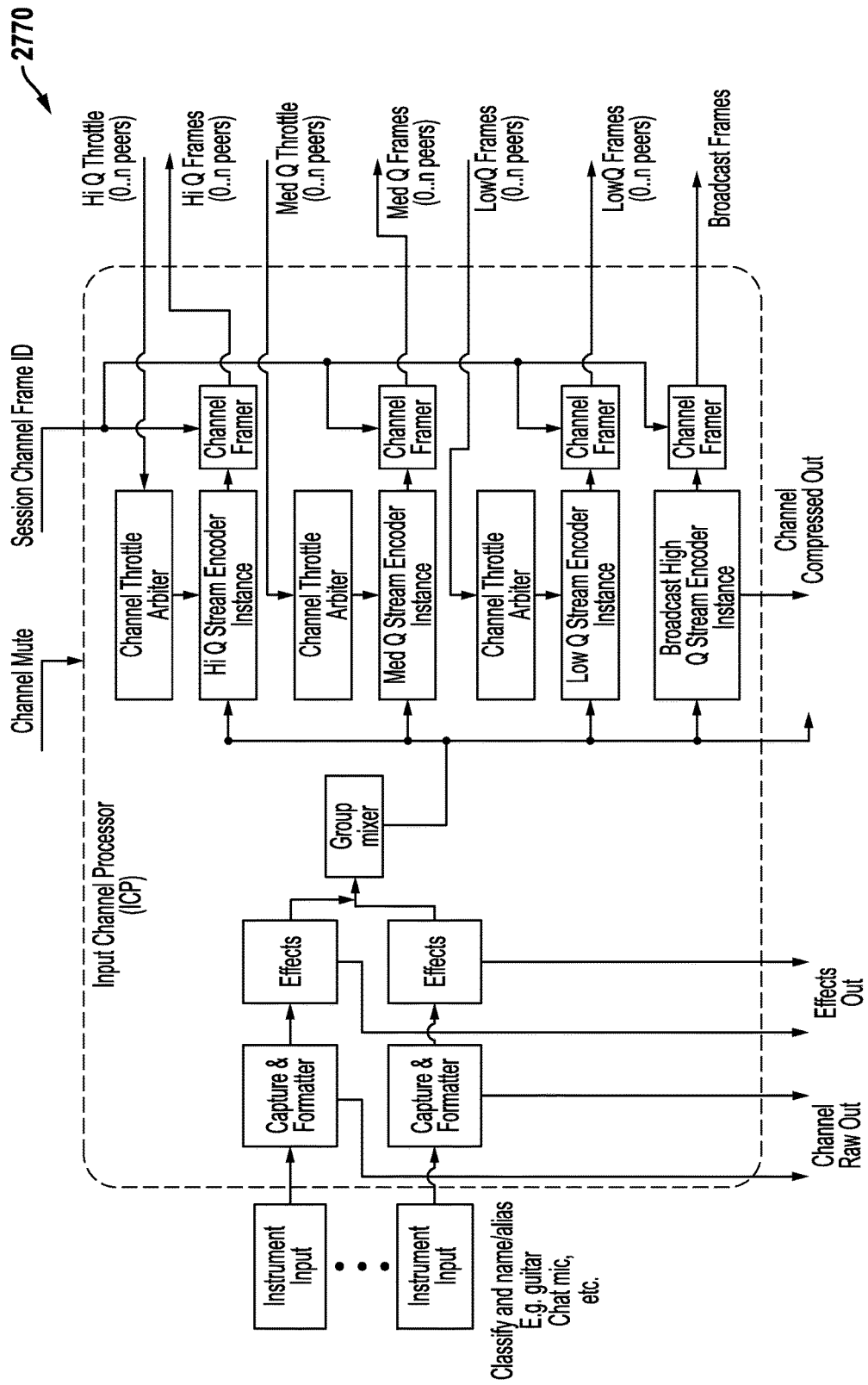
FIG. 27C is a block diagram of an example embodiment for a local input channel processor that captures audio inputs for a group of instruments and aggregates or bonds these inputs using a group mixer.

FIG. 27C is a block diagram of an example embodiment 2770 for a local input channel processor that captures audio inputs for a group of instruments and bonds these inputs together using a group mixer (e.g., input channel processor bonding). Embodiment 2770 captures multiple inputs and bonds them with the group mixer as provided by embodiment 2750 in FIG. 27B and also provides raw outputs and effects outputs as provided by embodiment 2700 of FIG. 2A. Embodiment 2770 also provides the high quality, medium quality, low quality, and broadcast level processing of embodiment 2700 of FIG. 2A.

Figure 28A:
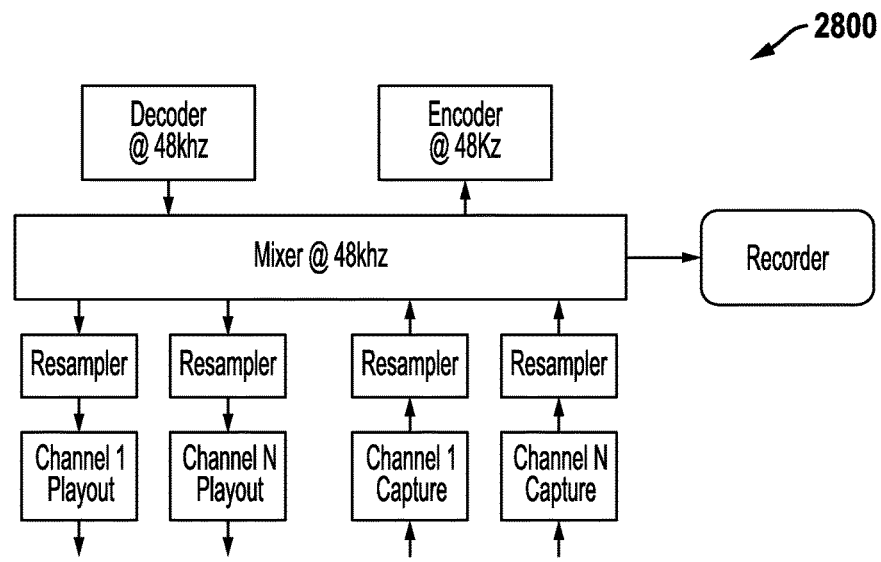
FIGS. 28A-B are block diagrams of example embodiments for mixers that can be utilized.
Figure 28B:
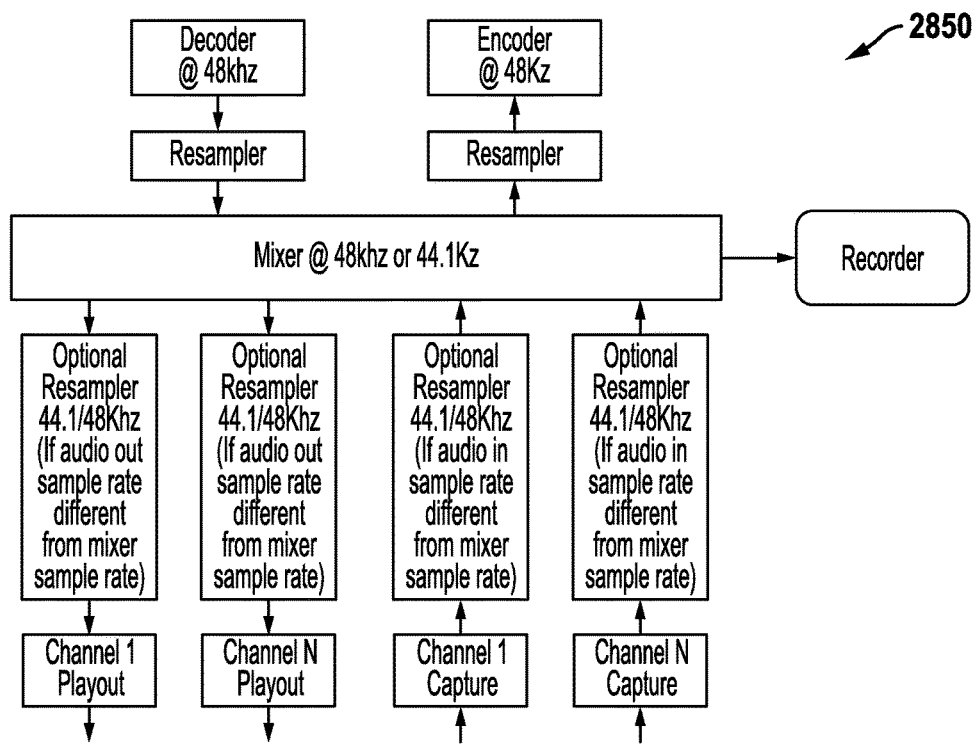

FIGS. 28A-B are block diagrams of example embodiments for mixer architectures that can be utilized. Embodiment 2800 of FIG. 28A includes 1 to N audio channel capture blocks that provide captured audio to a mixer at 48 kHz sample rate. Embodiment 2800 also includes 1 to N audio channel playout blocks that receive outputs from the mixer. A decoder and an encoder operating at 48 kHz are also provided. Resamplers are also used as needed to resample the captured audio or the output audio. A recorder also receives mixed audio from the mixer and makes recordings. Embodiment 2850 of FIG. 28B is similar to embodiment 2800 except that a 48 kHz or a 44.1 kHz sample rate is used. Optional resamplers are again provided if needed to resample the captured audio or output audio. Also, resamplers can be used with respect to the decoder and encoder if operating at a different sample rate than the mixer.

Figure 29:
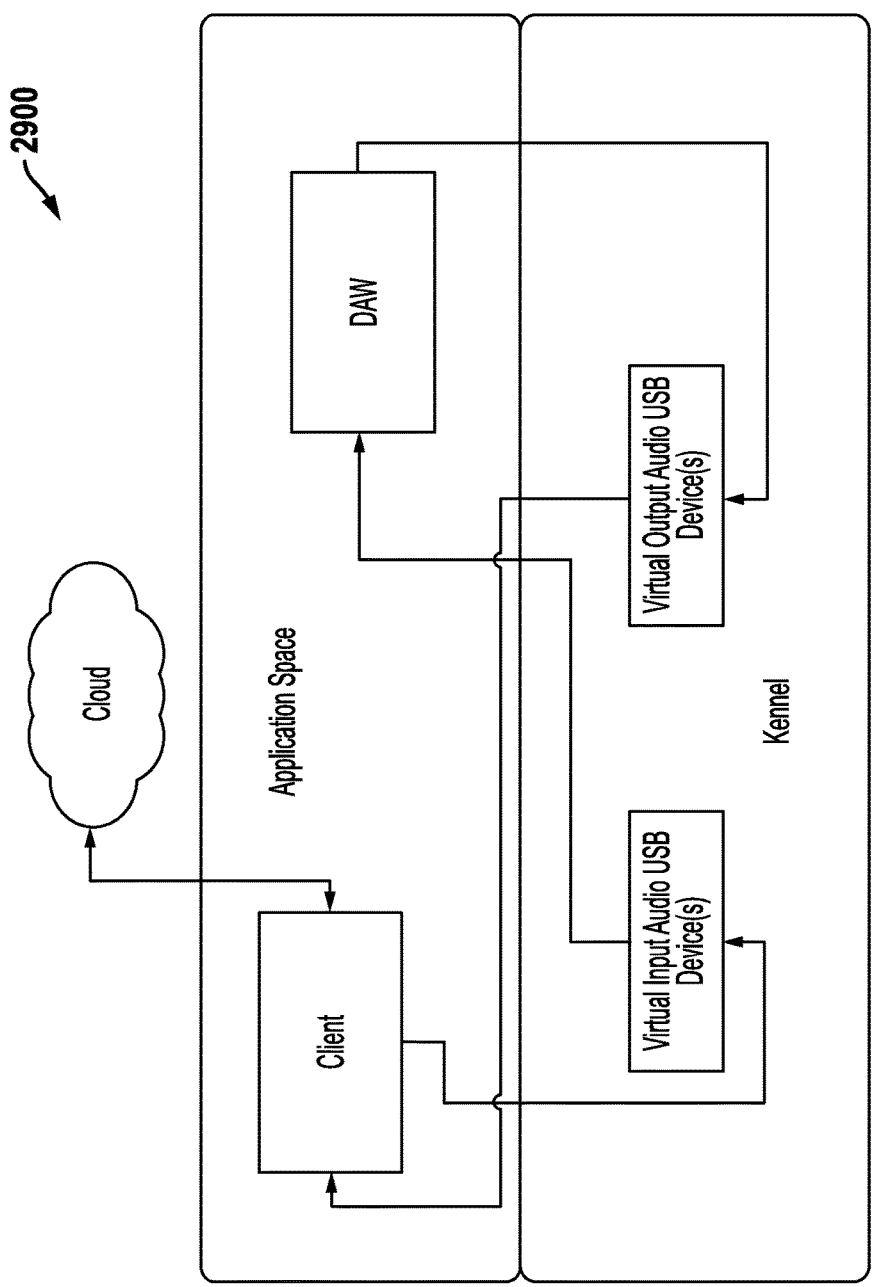
FIG. 29 is a block diagram of an example embodiment for virtual device bridge software that includes an application space having a client module and a DAW (digital audio workstation) module and a kernel having virtual audio inputs and outputs.

FIG. 29 is a block diagram of an example embodiment 3000 for virtual device bridge software that includes an application space having client module and DAW (digital audio workstation) module and a kernel having virtual audio inputs and outputs. The application client in a application space for a software stack communicates with a virtual audio input device in the kernel. A DAW within the application space receives an output from the virtual audio input device and provides audio outputs to a virtual output audio device in the kernel. The virtual output audio device provides audio outputs to the client application. The client application also communicates audio packets with the network or cloud.

Figure 30A:
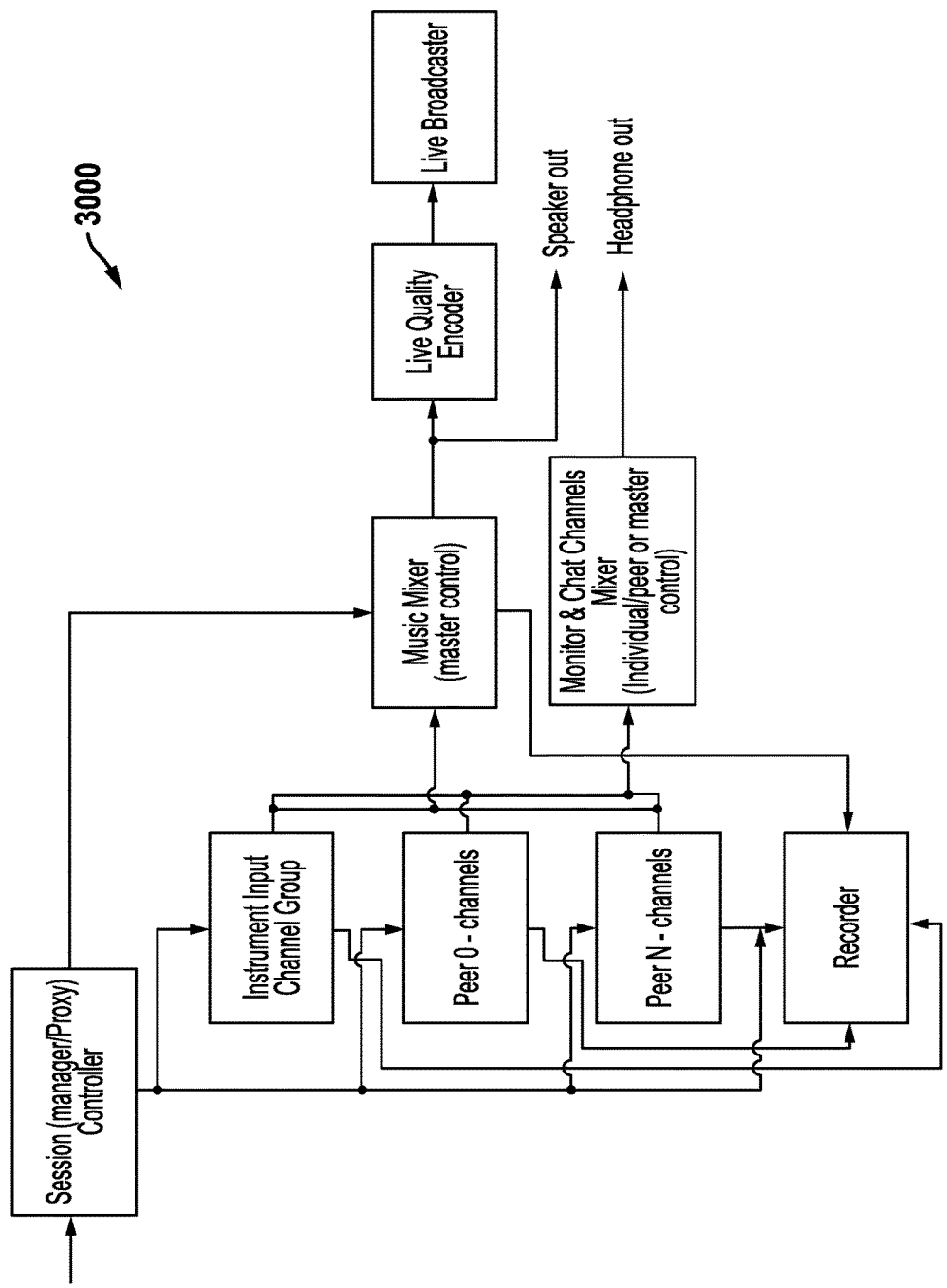
FIGS. 30A-B are block diagrams of example embodiments for DAW data flow.
Figure 30B:
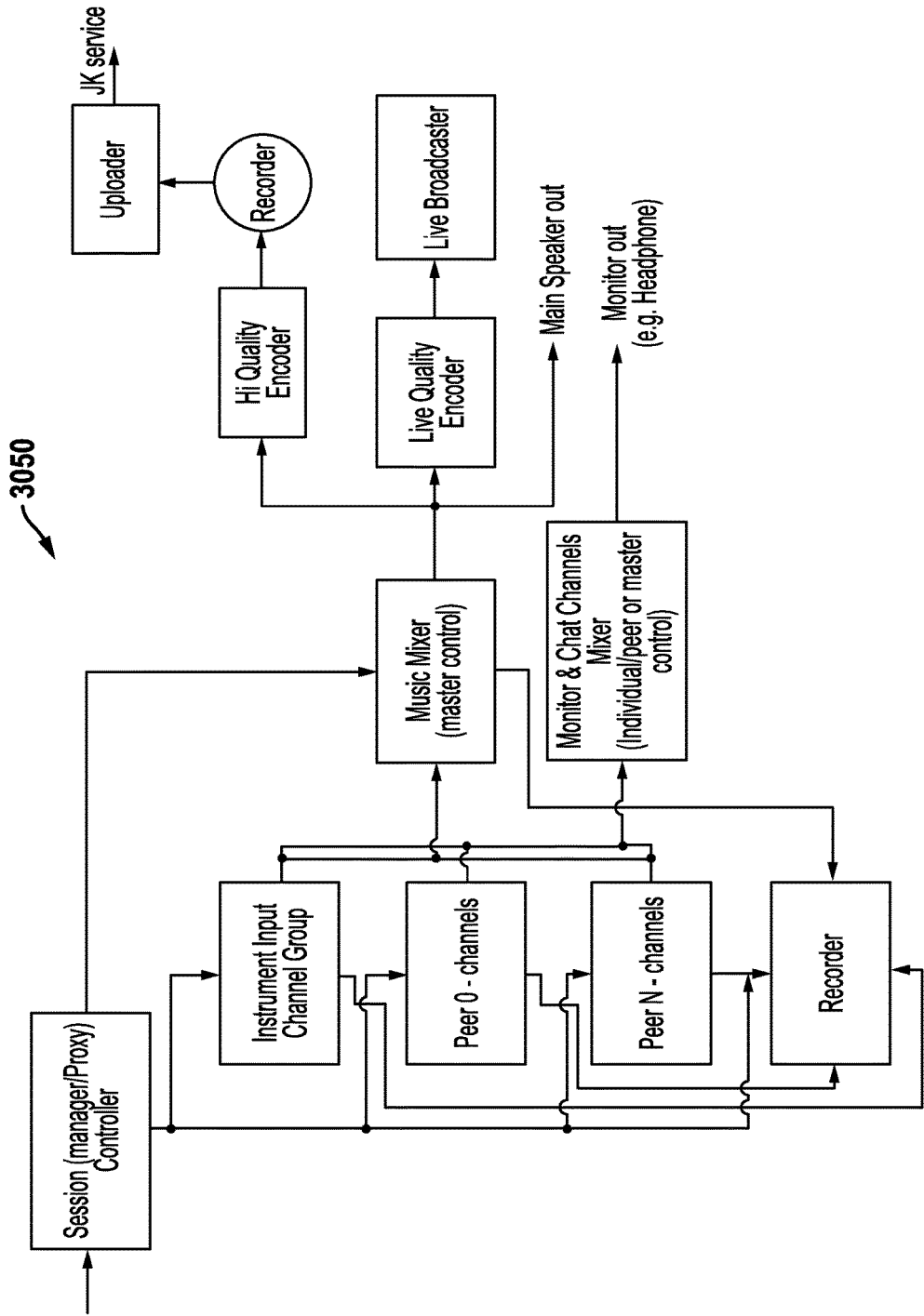

FIGS. 30A-B are block diagrams of example embodiments for DAW data flow. Embodiment 3000 of FIG. 30A is similar to embodiment 1110 of FIG. 11A where the MN includes a live quality encoder and operates as a live broadcaster. Embodiment 3050 of FIG. 30B is also similar to embodiment 1110 of FIG. 11A where the MN can operate as live broadcaster but also includes a recorder and an uploader to send the live broadcast to a server system where the server provides a broadcast service.

Appendix C—Example API Descriptions and Details

Example API Descriptions

Here are the calls that the Client may make to the Server:
{Ok, Sid, AddrPort[ ]} startSession(Uid uid, AddrPort addr, AddrPortScore[ ] scores)
{Ok, AddrPort[ ]} joinSession(Sid sid, Uid uid, AddrPort addr, AddrPortScore[ ] scores)
Ok leaveSession(Sid sid, Uid uid, AddrPort addr)
Ok stopSession(Sid sid, Uid uid, AddrPort addr)
Here are the calls that the Server may make to the Client:
Ok joinedSession(Sid sid, Uid uid, AddrPort addr)
Ok leftSession(Sid sid, Uid uid, AddrPort addr)
AddrPortScore[ ] test(AddrPort[ ] addrs)
Here are the calls that the Server may make to NAAS:
AddrPort[ ] setupTest(AddrPort client)
Ok cancelTest(AddrPort client)
AddrPort assignAddress(Sid sid, AddrPort client, AddrPortScore[ ] scores)
Ok releaseAddress(Sid sid, AddrPort client, AddrPort assigned)
Ok addRule(Sid sid, AddrPort client1, AddrPort assigned1, AddrPort client2, AddrPort assigned2)
Ok dropRule(Sid sid, AddrPort client1, AddrPort assigned1, AddrPort client2, AddrPort assigned2)
Here are the calls that the NAAS may make to the Server: None.
Clients may not contact NAAS directly and vice versa.

Example API Details

{Ok, Sid, AddrPort[ ]} startSession(Uid uid, AddrPort addr, AddrPortScore[ ] scores)
  The client requests a new session be created. Uid is the unique id of the user making the request, and addr is the publicly visible address and port number of the client's UDP socket. Scores is initially passed as null.
  The user generally won't know their own publicly visible address or uid, but the user does know the port number of their socket. This is all the user need supply. The web server, upon receiving the request, fills in the uid and the publicly visible address before acting on the request.
  If this user is enabled to use NAAS and if NAAS is available, the initial request with null scores will be failed with Ok indicating "Test", sid returned as null, and an array of AddrPort to test. The client will test each AddrPort in the prescribed manner and resubmit the startSession request with the resulting scores.
  Status is returned in Ok as well as the newly minted Sid if the request succeeded. The sid is used to manipulate the session including inviting others to join. If NAAS is not enabled for this user, NAAS is not available, or if scores are submitted, the returned AddrPort array will be null.
  Note that testing is required of every client who joins a session which includes NAAS. This includes clients in sessions which did not acquire NAAS capability until a NAAS enabled user joined. See Server to Client call test.
{Ok, AddrPort[ ]} joinSession(Sid sid, Uid uid, AddrPort addr, AddrPortScore[ ] scores)
  The client requests to join an existing session. Sid is the unique id of the session, uid is the unique id of the user making the request, and addr is the publicly visible address and port number of the client's UDP socket. Scores is initially passed as null.
  The user generally won't know their own publicly visible address or uid, but the user does know the port number of their socket. This is all the user need supply. The web server, upon receiving the request, fills in the uid and the publicly visible address before acting on the request.
  If this user is enabled to use NAAS and if NAAS is available, the initial request with null scores will be failed with Ok indicating "Test" and an array of AddrPort to test. The client will test each AddrPort in the prescribed manner and resubmit the joinSession request with the resulting scores.
  Status is returned in Ok. If NAAS is not enabled for this user, NAAS is not available, or if scores are submitted, the returned AddrPort array will be null.
  Note that testing is required of every client who joins a session which includes NAAS. This includes clients in sessions which did not acquire NAAS capability until a NAAS enabled user joined. See Server to Client call test.
Ok leaveSession(Sid sid, Uid uid, AddrPort addr)
  The client requests to be removed from the session. Sid is the unique id of the session, uid is the unique id of the user making the request, and addr is the publicly visible address and port number of the client's UDP socket.
  The user generally won't know their own publicly visible address or uid, but the user does know the port number of their socket. This is all the user need supply. The web server, upon receiving the request, fills in the uid and the publicly visible address before acting on the request.

If NAAS resources are allocated to this user, the resources are freed (cancelTest, dropRule, releaseAddress).

If this is the last participant in the session, the session is also removed (stopSession). If other participants remain in the session, they are informed that this user has left (leftSession).

Status is returned in Ok.

Ok stopSession(Sid sid, Uid uid, AddrPort addr)

The client requests that the session be destroyed. Sid is the unique id of the session, uid is the unique id of the user making the request, and addr is the publicly visible address and port number of the client's UDP socket.

The user generally won't know their own publicly visible address or uid, but the user does know the port number of their socket. This is all the user need supply. The web server, upon receiving the request, fills in the uid and the publicly visible address before acting on the request.

The session is marked for destruction (nobody may join).

Remaining users are notified that the other users have left the session (leftSession).

If NAAS resources are allocated to this session, the resources are freed (cancelTest, dropRule, releaseAddress).

The session is removed.

Status is returned in Ok.

Ok joinedSession(Sid sid, Uid uid, AddrPort addr)

The server notifies that the specified user has joined the session. Sid is the unique id of the session, uid is the unique id of the user that joined, and addr is the publicly visible address and port number of the client's UDP socket (or the assigned NAAS address of the receiving user if NAAS is involved).

The receiving client should begin sending to the specified address/port if it isn't already.

If the uid had previously "joined" with a different address, the new address replaces the old and operation continues.

Status is returned in Ok.

Ok leftSession(Sid sid, Uid uid, AddrPort addr)

The server notifies that the specified user has left the session. Sid is the unique id of the session, uid is the unique id of the user that left, and addr is the publicly visible address and port number of the client's UDP socket (or the assigned NAAS address of the receiving user if NAAS is involved).

The receiving client should stop sending to the specified address/port unless any other participants also have that same address (eh, if NAAS is involved).

Status is returned in Ok.

AddrPortScore[ ] test(AddrPort[ ] addrs)

The server notifies the client that a test of addresses is required to determine which address is the best for this client. This test is required when NAAS has become involved in the session. The user should execute a ping test on each address and return the scores to the server. See startSession and joinSession for implicit test operations using this same technique.

A UDP packet sent to the specified address will be returned (echoed) as it was received. The client should construct a packet of some moderate size (135 bytes will do) with an embedded high precision timestamp and sequence number, then send it to the address and receive the response. Enough packets should be sent to ensure a good sample. The first packet (sent and received) often takes substantially longer than the rest, and so should be excluded from the stats.

Min/max/average of the rest should be returned in the scoring structure, in millisecond units, as well as the count sent/received. The client should send a packet, wait up to 50 ms for the response, and send the next one as soon as the response is received or deemed missing, perhaps sending a total of 10-20 packets. Late packets should be ignored if they finally arrive (by using the sequence number). Stats should be calculated starting with the second packet received, and only include received packets.

AddrPort[ ] setupTest(AddrPort client)

The server requests that NAAS setup a test environment for the specified client address and return all appropriate addresses for the test.

If NAAS fails somehow to setup the test, null is returned.

Ok cancelTest(AddrPort client)

The server requests that NAAS remove a previously setup test environment for the specified client.

Status is returned in Ok.

AddrPort assignAddress(Sid sid, AddrPort client, AddrPortScore[ ] scores)

The server requests that NAAS use the scores to assign an address appropriate for the specified client address. Sid is the unique id of the session, and client is the publicly visible address and port number of the client's UDP socket.

Any previously test setup is cancelled.

The assigned address is returned, or if there was a problem assigning an address, null is returned.

Ok releaseAddress(Sid sid, AddrPort client, AddrPort assigned)

The server requests that NAAS remove any previous assigned address. Sid is the unique id of the session, client is the publicly visible address and port number of the client's UDP socket, and assigned is the previously assigned address.

Any rules involving the client and assigned addresses will be dropped (see addRule, dropRule).

Status is returned in Ok.

Ok addRule(Sid sid, AddrPort client1, AddrPort assigned1, AddrPort client2, AddrPort assigned2)

The server requests that NAAS add a rule mapping one client to another. Sid is the unique id of the session, client1 is the public address of the first client, assigned1 is the assigned address of the first client (per assignAddress), client2 is the public address of the second client, and assigned2 is the corresponding assigned address.

Any packet arriving at NAAS from client1 to assigned1 will be sent from assigned2 to client2, and vice versa.

Assigned1 and assigned2 must be addresses assigned and not yet released by this NAAS instance.

Status is returned in Ok.

Ok dropRule(Sid sid, AddrPort client1, AddrPort assigned1, AddrPort client2, AddrPort assigned2)

The server requests that NAAS drop a rule mapping one client to another. Sid is the unique id of the session, client1 is the public address of the first client, assigned1 is the assigned address of the first client (per assignAddress), client2 is the public address of the second client, and assigned2 is the corresponding assigned address.

Any packet arriving at NAAS from client1 to assigned1 will no longer be sent from assigned2 to client2, and vice versa.

Assigned1 and assigned2 must be addresses assigned and not yet released by this NAAS instance.

Status is returned in Ok.

Further modifications and alternative embodiments of the embodiments described herein will be apparent to those skilled in the art in view of this description. It will be recognized, therefore, that the inventions described herein are not limited by these example arrangements. Accordingly, this description is to be construed as illustrative only, and it is to be understood that the embodiments shown and described herein are to be taken as example embodiments. Various changes may be made in the implementations and architectures and different embodiments can be implemented. For example, equivalent elements may be substituted for those illustrated and described herein, and features can be utilized independently of other features, all as would be apparent to one skilled in the art after having the benefit of this description.

What is claimed is:

1. An interactive music client system, comprising:
    an audio codec integrated circuit coupled to one or more audio inputs and configured to generate captured audio data;
    a network interface;
    a jitter queue receive buffer configured to store audio input packets;
    one or more integrated circuits including one or more processors configured to execute instructions embodied in one or more non-transitory computer readable mediums to:
        process the captured audio data to generate audio output packets,
        send the audio output packets through the network interface to one or more peer interactive music client systems within an interactive music session,
        receive audio input packets through the network interface from the one or more peer interactive music client systems,
        store the audio input packets in a jitter queue receive buffer;
        access the audio input packets from the jitter queue receive buffer;
        process the audio input packets to generate audio input data,
        combine the audio input data with the captured audio data,
        output the combined audio data; and
        adjust the jitter queue receive buffer such that the jitter queue receive buffer becomes empty at least once within a predetermined time duration.

2. The interactive music client system of claim 1, wherein the one or more processors are further configured to discard one or more audio input packets from the jitter queue receive buffer if the jitter queue receive buffer does not becomes empty at least once within the predetermined time duration.

3. The interactive music client system of claim 2, wherein the one or more processors are further configured to use an audio volume associated with the audio input packets to select the one or more audio input packets to discard.

4. The interactive music client system of claim 2, wherein the one or more processors are further configured to select the one or more audio input packets to discard using one or more of the following: randomly selected packets within the jitter queue receive buffer, proportionally spaced packets within the jitter queue receive buffer, or consecutive packets within the jitter queue receive buffer.

5. The interactive music client system of claim 1, wherein the one or more processors are further configured to adjust the predetermined time duration if no audio input packets are available to be accessed from the jitter queue receive buffer at least once within the predetermined time duration.

6. The interactive music client system of claim 1, wherein the one or more processors are further configured to adjust contents of the jitter queue receive buffer based upon input/output (IO) mismatch with one or more peer interactive music client systems.

7. The interactive music client system of claim 1, wherein the one or more processors are further configured to determine performance parameters associated with the interactive music sessions and to adjust one or more of the audio output packets or the audio input packets based upon the performance parameters.

8. The interactive music client system of claim 7, wherein the performance parameters comprise session packet rates for the interactive music session, and wherein the one or more processors are further configured to make adjustments to at least one of an audio output packet rate or an audio input packet rate based upon the session packet rates.

9. The interactive music client system of claim 8, wherein the one or more processors are configured to aggregate audio frames to lower the audio output packet rate.

10. The interactive music client system of claim 8, wherein the one or more processors are further configured to send one or more requests to the one or more peer interactive music client systems to reduce packet rates to lower the audio input packet rate.

11. The interactive music client system of claim 8, wherein the packet rate adjustments comprise a reduction in a bit-rate, and wherein the one or more processors are further configured to subsequently remove the packet rate adjustments to return to a normal bit-rate.

12. The interactive music client system of claim 1, wherein the audio codec integrated circuit is further configured to receive the combined audio data and to generate one or more audio outputs.

13. The interactive music system of claim 1, wherein the predetermined time duration is adjusted such that the jitter queue receive buffer becomes empty at least once within the predetermined time duration.

14. The interactive music client system of claim 13, wherein the predetermined time duration is adjusted such that the jitter queue receive buffer is empty within the predetermined time duration at least 50 percent or greater of an audio play out rate.

15. A method for an interactive music client system, comprising:
    receiving one or more audio inputs;
    generating captured audio data for the one or more audio inputs;
    processing the captured audio data to generate audio output packets;
    sending the audio output packets to one or more peer interactive music client systems within an interactive music session;
    receiving audio input packets from the one or more peer interactive music client systems;
    storing the audio input packets in a jitter queue receive buffer;
    accessing the audio input packets from the jitter queue receive buffer;
    processing the audio input packets to generate audio input data;

combining the audio input data with the captured audio data;

outputting the combined audio data; and adjusting the jitter queue receive buffer such that the jitter queue receive buffer becomes empty at least once within a predetermined time duration.

16. The method of claim 15, further comprising discarding one or more audio input packets from the jitter queue receive buffer if the jitter queue receive buffer does not become empty at least once within the predetermined time duration.

17. The method of claim 16, further comprising using an audio volume associated with the audio input packets to select the one or more audio input packets to discard.

18. The method of claim 16, further comprising selecting the one or more audio input packets to discard using one or more of the following: randomly selected packets within the jitter queue receive buffer, proportionally spaced packets within the jitter queue receive buffer, or consecutive packets within the jitter queue receive buffer.

19. The method of claim 15, further comprising adjusting the predetermined time duration if no audio input packets are available to be accessed from the jitter queue receive buffer at least once within the predetermined time duration.

20. The method of claim 15, further comprising adjusting contents of the jitter queue receive buffer based upon input/output (IO) mismatch with one or more peer interactive music client systems.

21. The method of claim 15, further comprising determining performance parameters associated with the interactive music sessions, and adjusting one or more of the audio output packets or the audio input packets based upon the performance parameters.

22. The method of claim 21, wherein the performance parameters comprise session packet rates for the interactive music session, and further comprising making adjustments to at least one of an audio output packet rate or an audio input packet rate based upon the session packet rates.

23. The method of claim 22, further comprising aggregating audio frames to lower the audio output packet rate.

24. The method of claim 22, further comprising sending one or more requests to the one or more peer interactive music client systems to reduce packet rates to lower the audio input packet rate.

25. The method of claim 22, wherein the packet rate adjustments comprise reducing a bit-rate, and further comprising subsequently removing the packet rate adjustments to return to a normal bit-rate.

26. The method of claim 15, further comprising using an audio codec integrated circuit to receive the combined audio data and to generate one or more audio outputs.

27. The method of claim 15, wherein the adjusting comprises adjusting the predetermined time duration such that the jitter queue receive buffer becomes empty at least once within the predetermined time duration.

28. The method of claim 27, wherein the predetermined time duration is adjusted such that the jitter queue receive buffer is empty within the predetermined time duration at least 50 percent or greater of an audio play out rate.

* * * * *